United States Patent [19]

Schroeder et al.

[11] Patent Number: 5,088,091
[45] Date of Patent: Feb. 11, 1992

[54] HIGH-SPEED MESH CONNECTED LOCAL AREA NETWORK

[75] Inventors: Michael D. Schroeder, Santa Clara County, Calif.; Roger M. Needham, Coton, United Kingdom; Charles P. Thacker, Santa Clara County, Calif.; Andrew D. Birrell, Santa Clara County, Calif.; Thomas L. Rodeheffer, Santa Clara County, Calif.; Edwin H. Satterthwaite, Jr., Santa Clara County, Calif.; Hallam G. Murray, Jr., San Mateo County, Calif.

[73] Assignee: Digital Equipment Corporation, Maynard, Mass.

[21] Appl. No.: 370,285

[22] Filed: Jun. 22, 1989

[51] Int. Cl.⁵ .......................... H04J 3/24; H04Q 11/04
[52] U.S. Cl. ........................ 370/94.3; 370/60; 370/85.13; 370/94.1; 340/825.02
[58] Field of Search ............... 370/94.3, 94.1, 85.13, 370/60, 60.1, 58.1, 58.2, 58.3, 13, 16, 85.1, 85.9; 340/825.02, 825.5, 825.51, 825.52; 371/11.1, 11.2, 11.3

[56] References Cited

U.S. PATENT DOCUMENTS

| | | | |
|---|---|---|---|
| 3,916,380 | 10/1975 | Fletcher et al. | 340/147 R |
| 4,271,506 | 6/1981 | Broc et al. | 370/89 |
| 4,439,826 | 3/1984 | Lawrence et al. | 364/200 |
| 4,556,972 | 12/1985 | Chan et al. | 370/60 |
| 4,598,400 | 7/1986 | Hills | 370/60 |
| 4,651,318 | 3/1987 | Luderer | 370/94 |
| 4,663,620 | 5/1987 | Paul et al. | 340/825.5 |
| 4,670,871 | 6/1987 | Vaidya | 370/60 |
| 4,679,189 | 7/1987 | Olson et al. | 370/60 |
| 4,696,000 | 9/1987 | Payne, III | 370/60 |
| 4,698,803 | 10/1987 | Haselton et al. | 370/60 |
| 4,706,080 | 11/1987 | Sincoskie | 370/85.13 |
| 4,736,363 | 4/1988 | Aubin et al. | 370/60 |
| 4,740,954 | 4/1988 | Cotton et al. | 370/60 |
| 4,754,451 | 6/1988 | Eng et al. | 370/60 |
| 4,811,337 | 3/1989 | Hart | 370/85.13 |
| 4,956,772 | 9/1990 | Neches | 340/825.02 |
| 4,962,497 | 10/1990 | Ferenc et al. | 370/94.1 |

OTHER PUBLICATIONS

"Distributed Star Network with Unrooted Tree Topology", F. Closs and R. P. Lee, IBM Technical Disclosure Bulletin, vol. 22, No. 12, May 1980.

Primary Examiner—Douglas W. Olms
Assistant Examiner—Alpus H. Hsu
Attorney, Agent, or Firm—Flehr, Hohbach, Test, Albritton & Herbert

[57] ABSTRACT

A mesh connected local area network provides automatic packet switching and routing between host computers coupled to the network. The network has a multiplicity of cut-through, nonblocking switches, each capable of simultaneously routing a multiplicity of data packets. Low host-to-host latency is achieved through the use of cut-through switches with separate internal buffers for each packet being routed. The switches are interconnected with one another and are coupled to the host computers of the network by point to point full duplex links. While each switch can be coupled to ten or more network members, i.e., switches and hosts, each link is coupled to only two network members and is dedicated to carrying signals therebetween. Whenever a new switch or link is added to the network, and whenever a switch or link fails, the switches in the network automatically reconfigure the network by recomputing the set of legal paths through the network.

32 Claims, 19 Drawing Sheets

HIGH-SPEED MESH CONNECTED LOCAL AREA NETWORK

This patent application is related to patent application Ser. No. 07/370,248, filed simultaneously herewith, entitled ROUTING APPARATUS AND METHOD FOR HIGH-SPEED MESH CONNECTED LOCAL AREA NETWORK, which is hereby incorporated by reference.

The present invention relates generally to computer communications networks for interconnecting computers and particularly to a mesh connected local area network for routing information packets between computers.

BACKGROUND OF THE INVENTION

Local area networks (LANs) are commonly used to transmit messages between relatively closely located computers. Referring to FIGS. 1A, 1B and 2, there are at least three basic types of organizational architectures for LANs: linear (shown in FIG. 1A), ring (shown in FIG. 1B), and mesh (shown in FIG. 2). Ethernet, for example, is a widely used linear LAN for interconnecting computer workstations, mainframes, and minicomputers.

For the purposes of this discussion linear LANs are defined to be single channel LANs in which message packets are broadcast so as be heard by all hosts (H) on the network, although usually only the host that is addressed by a packet will choose to listen to it.

The present invention solves the primary problems which have heretofore prevented mesh connected LANs from providing reliable high speed communications among a large number of interconnected host computers. For the purposes of this discussion, "a mesh connected network" means a network of switches connected in an arbitrary topology.

Before explaining the significance of the problems solved by the present invention, we will briefly consider the differences between mesh connected local area networks and linear and ring networks, and the motivations for building mesh connected networks even though such networks are generally more expensive and complicated than linear and ring LANs.

Linear and ring LANs have the advantage of architectural simplicity and well known solutions to most of the problems required for successful commercial application—and have well established records of reliability. However, linear and ring LANs have at least two major technological limitations—both the number of hosts (i.e., workstations and other computers) and the quantity of data that can be transmitted through such LANs are limited by the availability of only a single data transmission path. As more and more hosts are added to a linear or ring LAN, the amount of traffic on the single data path will increase and the average amount of time that each host must wait to send a message will also increase. Eventually, if enough hosts share a single LAN the delays will become unacceptable.

It can be shown that simply increasing the rate of data transmission on linear and ring LANs does not completely solve the problem of network congestion because some of the delays in such networks are related to the length of time that it takes for a message to traverse the length of the network—i.e., some delays are proportional to the physical length of the network, regardless of the rate of data transmission.

For instance, it has been shown that the maximum usable data transmission rate in linear LANs is inversely proportional to the physical length of the network's channel. As a result, it would appear that useful linear LANs cannot use data transmission rates much higher the 10 Megabaud rate currently used by Ethernet—because the use of substantially higher data rates will restrict the length of the network. In addition, linear LANs have the problem that, since only one data packet can be sent at a time, there must be a mechanism for deciding who (i.e., which host on the LAN) will have control of the LAN at any one time. A simple consideration of signal speed limitations imposed by the speed of light indicates that the length of linear LANs must be fairly limited (e.g., to several kilometers), and that network performance will degrade as more hosts are added to the LAN because of contention for control of the LAN.

While ring LANs can run at arbitrarily high data rates, rings LANs suffer from high latency—the delay between transmission and receipt of a message, which is proportional to the length of the network and the number of nodes which must be traversed. Ring LANs are also not very fault tolerant, and are very limited in terms of their configuration.

While the above noted problems with linear and ring LANs have not overly hampered their usefulness so far, the growing need for LANs with hundreds of hosts and for data transmission rates in the range of 100 Megabits per second exceeds the capability of the presently existing linear and ring LANs.

The primary advantage of using a mesh connected LAN is the availability of many parallel communications paths. This allows the simultaneous transmission of messages between different pairs of network hosts. Thus a mesh connected network can achieve much higher bandwidth than a comparable linear or ring network—because the throughput of the network is not limited by the throughput limitations of the network's links.

Another advantage of mesh connected networks over ring LANs is that mesh networks can have relatively low latency. Latency is generally proportional to the number of nodes that must receive and retransmit a message packet. A well designed mesh LAN can have a relatively small number of nodes between any selected pair of hosts in comparison to a ring LAN with a similar number of hosts.

Another advantage of mesh connected networks is that a well designed mesh connected network will provide several potential communication paths between any selected pair of hosts, thereby reducing the amount of time that hosts must wait, on average, before transmitting a message. In other words, contention for use of the network can be greatly reduced because many hosts can use the network simultaneously.

Traditionally, while mesh networks have been discussed in computer science literature and a few patents, mesh networks have never achieved commercial success due to several well known and relatively intractable problems. In particular, the most difficult problems have been (1) deadlock, (2) handling broadcast messages, (3) how to reconfigure the network when a network component fails, and (4) how to organize the routing of messages through the network so that the network throughput exceeds the throughput of a single link. These problems, and their solutions by the present invention are described below.

SUMMARY OF THE INVENTION

In summary, the present invention is a high-speed mesh connected network with high host-to-host bandwidth, low host-to-host latency, and high aggregate bandwidth. The mesh connected network consists of a number of interconnected switches which are coupled, in turn, to the hosts that are members of the local network. The switches are cut-through, nonblocking switches that are coupled to each other and to the hosts by a multiplicity of point to point links.

The switches are organized as a spanning tree with one switch being denoted the root node of the tree. Using a node ranking rule which will be described below, every switch is ranked in terms of how "close" it is to the root node.

Every link in the network is denoted as an "up" link in one direction and as a "down" link in the other direction. The up direction is the one for which the switch at one end of the link is closer to the root than the switch at the other end of the link.

In addition, each switch has a routing mechanism for automatically routing a received message packet toward its target host. In particular, the routing mechanism of the present invention allows numerous packets to be routed simultaneously through the network, and prevents deadlock by ensuring that all message packets follow a sequence of one or more up links, followed by one or more down links. No up links are traversed after the message packet has been routed down even a single down link.

High aggregate bandwidth is achieved by simultaneously routing many data packets through the network. Low latency is achieved, in part, by providing switches which start retransmitting (i.e., forwarding) packets well before receiving the ends of those packets. This is knows as cut-through switching.

A packet buffering scheme prevents node starvation and enables the routing of broadcast messages. In addition, the flow control and data buffering of the present invention compensates for any mismatches between the clock rates of neighboring switches.

The present invention includes a number of self-management features that overcome problems which have previously prevented commercial application of mesh connected networks. The switches in the network automatically detect any changes in the configuration of the network, such as the addition of switches and links as well as the removal or failure of network components. Upon detecting a change in the network configuration, all of the switches participate in a distributed reconfiguration process which automatically and quickly reconfigures the network by recomputing all the legal paths for routing message packets through the network. The reconfiguration process is sufficiently fast that it has minimal impact on the performance and operation of the network.

Important aspects of the reconfiguration process include automatic identification of the root of the spanning tree and automatic detection of the completion of the distributed reconfiguration process.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1A:
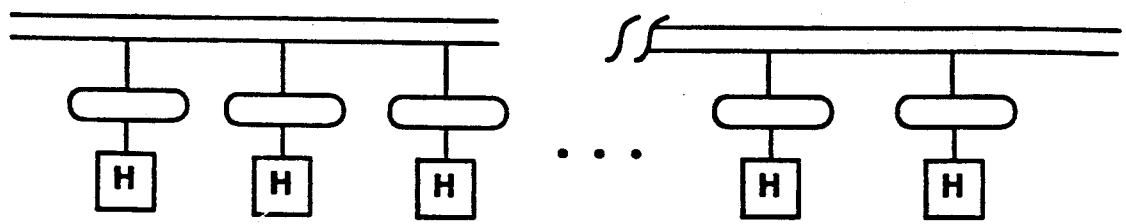
FIG. 1A is a block diagram of a linear local area network.
Figure 1B:
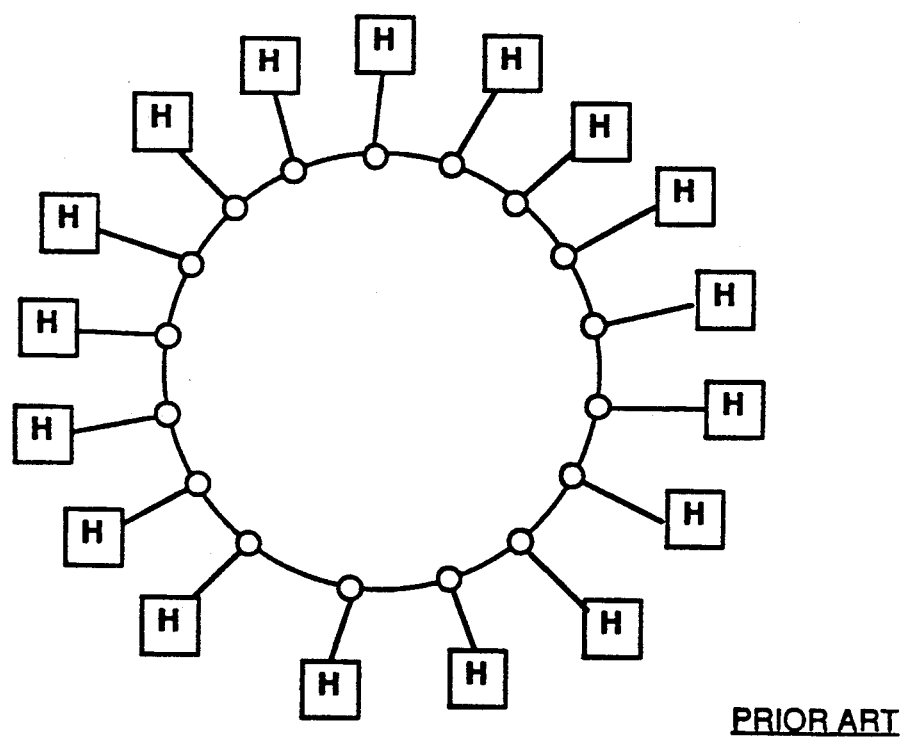
FIG. 1B is a block diagram of a ring local area network.
Figure 2:
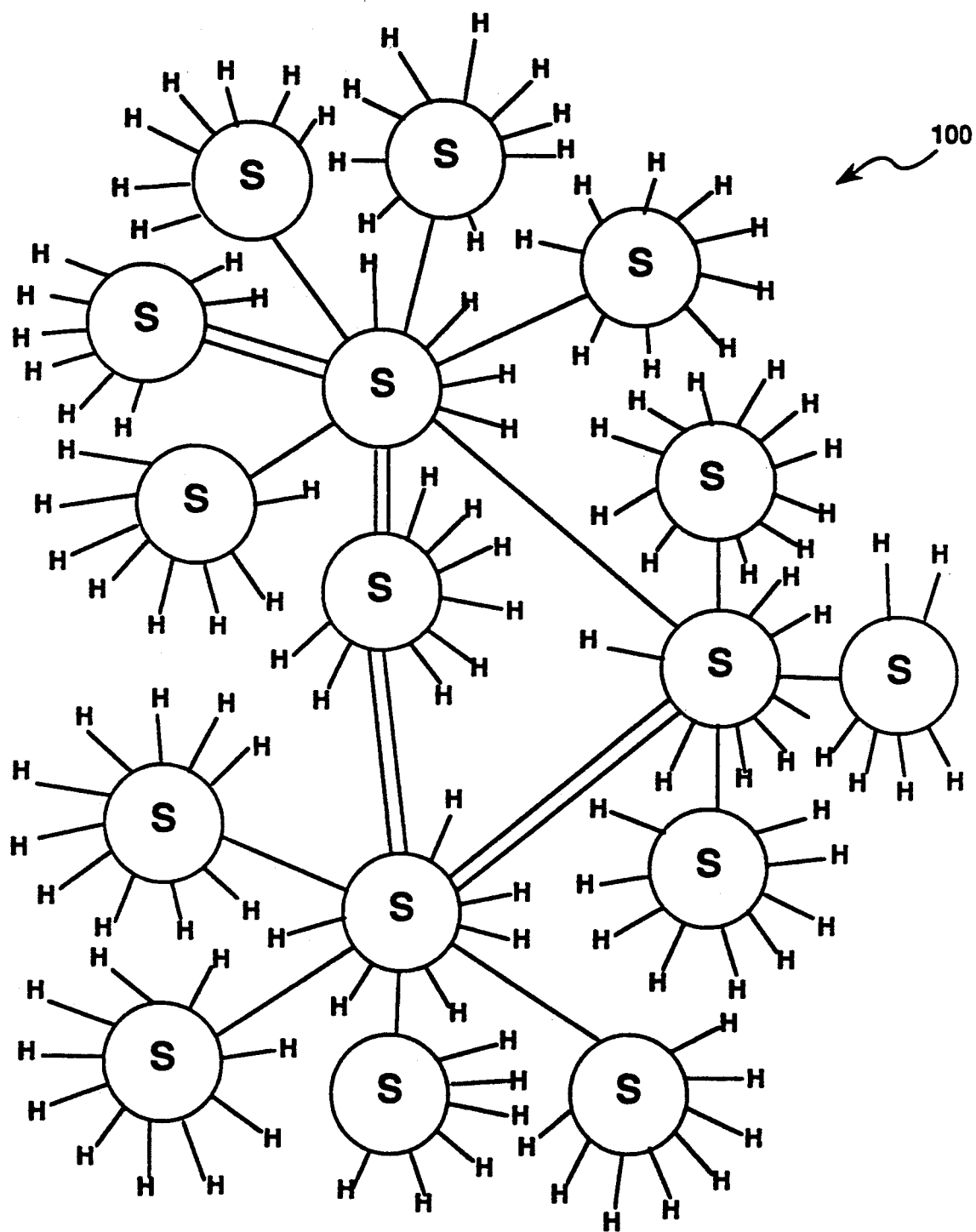
FIG. 2 is a block diagram of a small mesh connected local area network in accordance with the present invention.

FIG. 2 shows a conceptual representation of a mesh connected local area network 100 in accordance with the present invention, although many important features of the present invention are not shown in this Figure. Unlike the prior art mesh networks, there is no particular hierarchy of nodes and no requirements as to how the nodes of the network are interconnected. The nodes of the network could be randomly interconnected and the network would still function properly, although a well thought out set of interconnections will provide somewhat better performance.

In FIG. 2 the host computers which use the network are labelled H, and the nodes which comprise the local area network (LAN) are called switches and are labelled S. In this conceptual diagram sixteen switches are used to interconnect about eighty hosts. It should be noted that the switches S are multiported, cut-through nonblocking switches which can simultaneously couple a multiplicity of incoming links to various selected outgoing links. These switches enable numerous data packets to be simultaneously routed through the network.

GLOSSARY

To clarify the following discussion, the following definitions are provided.

"Channel" is the term used to refer to one half of a link, as defined below. In general, each channel is a single direction communication channel for transmitting data packets between two members of a network. In some contexts a channel is called an "up link" or "down link" to identify the direction of data flow in the channel.

A "host" is any computer or workstation that is connected to the network and which can be used to send and receive messages. Each letter "H" in FIG. 2 represents one host.

A "member of the network" or "network member" is either a host or a switch.

A "mesh connected network" is a network of switches connected in an arbitrary topology.

A "message" is any set of information or data which is transmitted from one member of the network to another. As will be explained in detail below, most messages are sent from one host to another, but occasionally, network control messages are sent from one switch to another.

"Packet", "data packet" and "message packet" all mean the basic unit of information which is transmitted through the network. Basically, any set of information that is sent through the network is first packaged into one or more packets. Each packet includes a header that specifies the destination of the packet, and a tail which declares the end of the packet. Thus a short message (e.g., less than 10,000 bytes) will be typically transmitted as a single packet, whereas a long message (e.g., a long document or data file) will be broken into a stream of consecutively transmitted packets.

"Retransmitting" a packet means forwarding a packet that has been received or partially received by a switch.

A "port" is the circuit in a switch (or host) which couples the switch (or host) to a link.

A "switch" is a physical device that is used to receive and route packets through the network. In the preferred embodiment switches can be connected to at least a dozen hosts and/or other switches. Each circle in FIG. 2 labelled "S" represents one switch.

A "link" is the apparatus which physically connects any two members of the network. In FIG. 2 each straight line between a host H and a switch S, or between two switches, represents a link. In the context of the present invention, each link between two network members is a full duplex, two way channel, which allows simultaneous communications in both directions. Both ends of each link are terminated by a "link circuit" which is also called a "port".

A "network address" is a value, assigned to each network member, used to index into a "routing table". The entry in the routing table specified by the network address provides information corresponding to legal routes through the network to the network member.

"Reconfiguration" is the process of determining all the legal data transmission paths for data packets being transmitted by the network. Every time that a new switch of link is added to the network, and every time that a switch or link is removed from the network or fails to work properly, a network reconfiguration takes place. An important feature of the present invention is that not all of the physical multi-link paths between two hosts are legal transmission paths.

"Spanning tree," as used herein, means a representation of the interconnections between the switches in a mesh connected network. Technically, a spanning tree is a non-cyclic connected subgraph which represents a portion of the network, excluding the host computers and certain links between switches. The excluded links make the network an acyclic graph rather than a tree because the nodes of the spanning tree can have interconnections within each level of the graph.

A "Netlist" is a representation of the switches and links between switches in a network.

The "root", "root node" or "root switch" of a network is a switch S which is designated as the root of the spanning tree representation of the network. The root node has several special responsibilities during reconfiguration of the network, and also for retransmitting broadcast messages, i.e., messages that are sent to all of the hosts in the network.

NETWORK CONNECTIONS AND ROUTING

Figure 3:
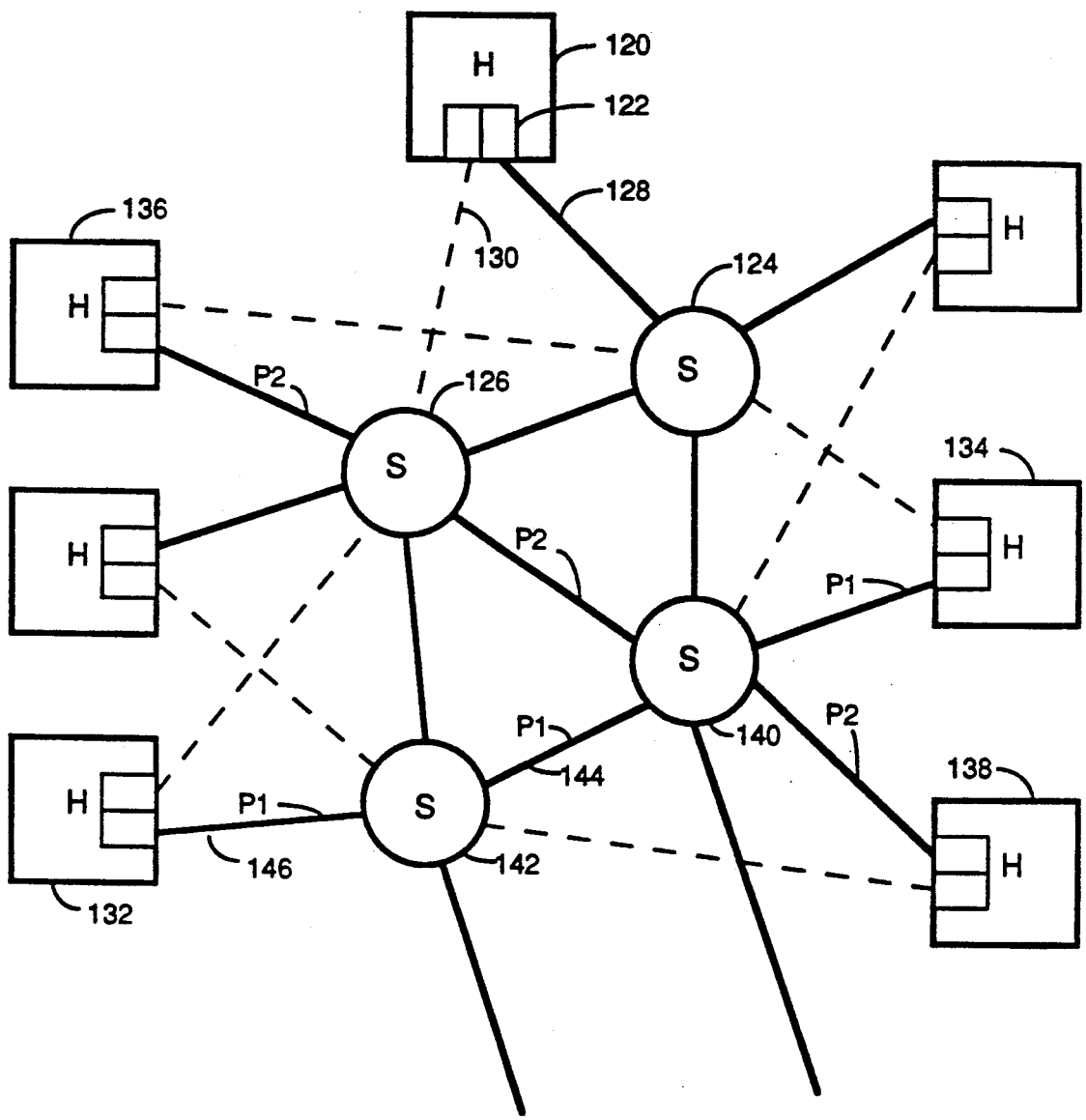
FIG. 3 is a more detailed diagram of a section of a local area network in accordance with the present invention.

Referring to FIG. 3, there is shown one section of a mesh connected network in accordance with the present invention. In the preferred embodiment, each host 120 in the network has a network controller 122 which couples the host 120 to two distinct switches (e.g., switches 124 and 126 in the case of host 120). The two links 128 and 130 which couple the host 120 to switches 124 and 126 are identical, except that only one of the two links is active at any one time. For this reason link 130 is shown as a dashed line to indicate that it is inactive.

Whenever the active link between a host computer and a switch fails, the host's network controller 122 automatically activates the other link 130—thereby reconnecting the host to the network. In addition, it is strongly preferred that the two links 128 and 130 for each host be coupled to two different switches so that if an entire switch fails all the hosts coupled to that switch will have alternate paths to the network. Generally, the provision of two alternate paths or channels from each host to the network provides sufficient redundancy that no single hardware failure can isolate a host from the network.

It is noted here that each "link" between network members is actually two communications channels which simultaneously carry data in opposite directions. In the preferred embodiment, each link 128 in the network can be up to 100 meters in length when coaxial cable is used, and up to 2 kilometers miles in length when fiber optic cabling is used.

When using coaxial cable, the amount of wiring needed by the network can be reduced by using a single line of cable to simultaneously transmit signals in both directions over the link. At each end of the cable there is a transmitter and a detector. The detector regenerates the signals sent by the transmitter at the other end of the cable by subtracting the output of the transmitter at the same end of the cable from the signal received by the detector at its end of the cable. Such full duplex, single wire communication channels are well known, and are not essential to implementing the present invention.

Numerous data packets can be simultaneously transmitted through the network. For example consider the example of a first packet being sent from host 132 to host 134 while a second packet is sent from host 136 to host 138. FIG. 3 shows a route P1, comprising three links coupled by two switches which can be used for sending the first packet from host 132 to host 134. Route P2 shown in FIG. 3 can simultaneously be used to send the second packet from host 136 to host 138. In this example, both data packets are simultaneously routed through switch 140. This is possible because the switches used in the present invention are multiported nonblocking switches. Each switch contains a crossbar circuit which can simultaneously couple a multiplicity of incoming links to distinct outgoing links.

While packets are generally sent from one host H in the network to another host H, it is noted that during reconfiguration of the network data packets are sent to computers in the switches themselves. This aspect of data packet routing will be discussed below in the sections entitled Routing Tables and Reconfiguration Process.

Deadlock

Figure 4:
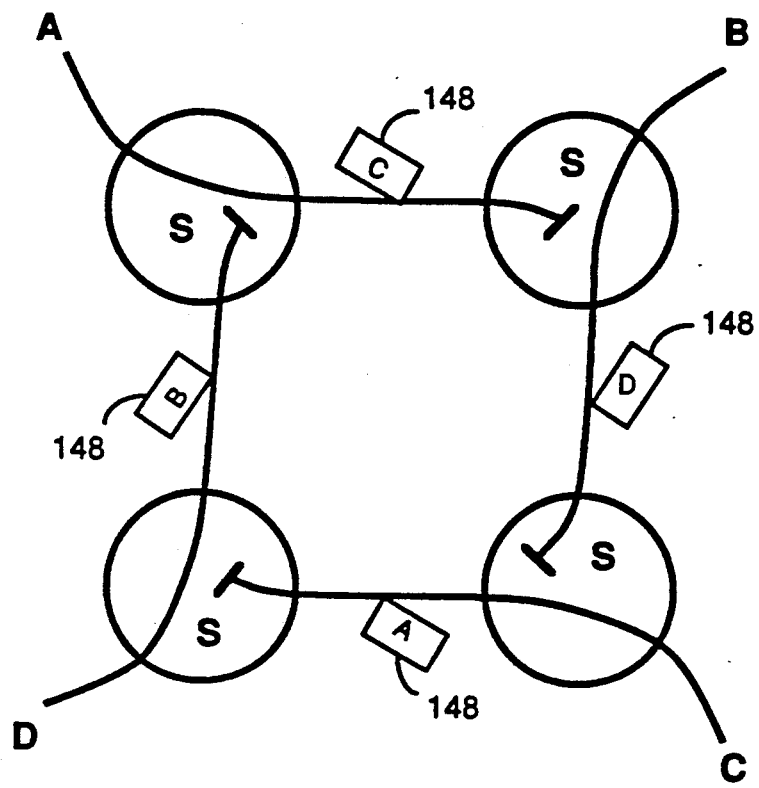
FIG. 4 depicts an example of deadlock in a mesh connected LAN.

One of the features of the present invention is that it provides a mesh connected network that cannot suffer from "deadlock". Deadlock in a network can be thought of as the electronic analog of gridlock at a traffic intersection. FIG. 4 shows four host computers A, B, C and D and four switches S. Each host is trying to send a data packet 148 to another host that is separated from the transmitting host by two switches. The destination of each packet is denoted by the label in the box 148 which symbolizes the packet. For instance, the packet 148 being sent by host A has a destination of host C.

For the purposes of this example it is assumed that the data packets being sent are larger than the data buffers in the switches, and that therefore the data packets will occupy a chain of two or more links during the transmission of the packet. As shown in FIG. 4, the progress of each data packet is blocked because the link needed for the next step of the transmission is blocked by another one of the packets.

As will be appreciated by those skilled in the art, deadlock can also occur with small data packets. In particular, the data buffer in a switch can become filled with two or more data packets, thereby preventing any more data from being sent through the link that is connected to the filled data buffer. Thus in FIG. 4 each blocked packet 148 can be replaced by a sequence of two or more packets, the first of which is being blocked because the link needed for the next step in its route is blocked by another one of the packets.

Clearly this deadlocked condition will not happen very often because it requires four hosts to initiate the sending of new data packets virtually simultaneously. However, it is unacceptable for deadlock to ever occur because it will cause the network to "crash" and messages to be lost.

Up/Down Routing

The present invention completely prevents deadlock by using a new type of routing procedure which automatically routes messages so that they will not deadlock one another. Referring again to FIG. 4, the implication of the data paths shown is that one could, at least theoretically, have a "cycle" in which a data packet is sent into an endless loop through the four switches. While cycles are not, by themselves, usually a problem, the availability of data paths which form a cycle is a symptom of mesh networks which can suffer deadlock.

Figure 5:
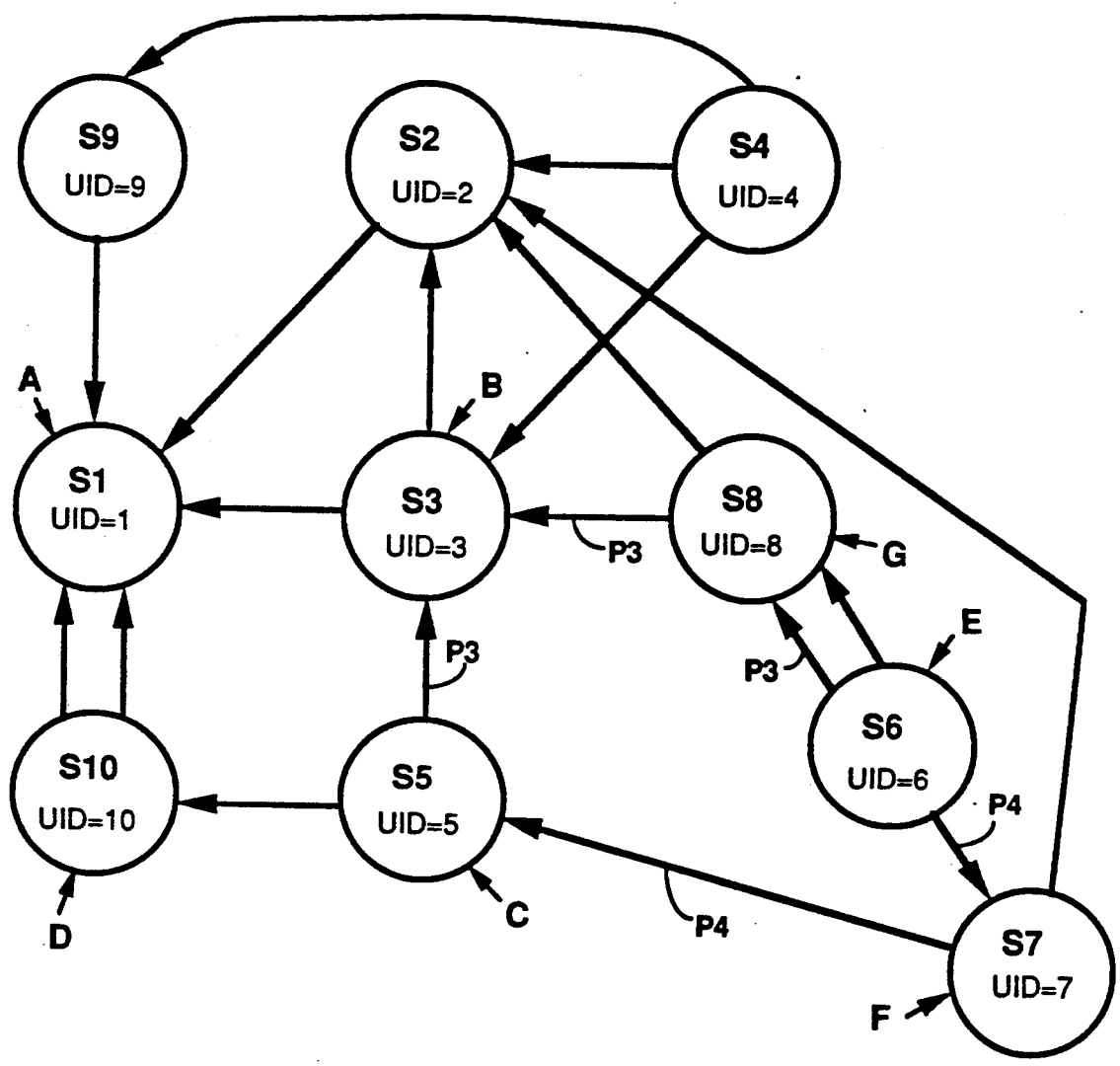
FIG. 5 is a conceptual diagram of the concept of up and down links in a mesh connected LAN.

Referring to FIG. 5, there is shown a somewhat complicated example of a ten node network of switches S1 to S10. All lines between the switches represent bidirectional links.

For reasons which will soon be explained, every link between the switches has been assigned a direction, as indicated by the arrows on the links. The arrows on the links are said to point "up" toward the root node of the network. More specifically, when a data packet is transmitted through a link in the same direction as the arrow on that link, the data packet is said to be going on an "up link" or, more correctly, an "up channel". When a data packet is transmitted through a link in the opposite direction as the arrow on that link the data packet is said to being going on a "down link" or "down channel".

The basic routing rule used in the present invention is that all legal routes for a data packet comprise zero or more up channels, followed by zero or down channels. Once a data packet has been transmitted through a down channel it cannot be transmitted through an up channel.

The basic routing rule as just stated defines the legal routes for a packet from a "global perspective"—that is from the viewpoint of someone looking at the network as a whole. From the perspective a single switch, when a packet travels on an "up link" to the switch, that packet is received on a down link. Thus, from the "local switch perspective", packets received on "down links" can be forwarded on either an up or down link; packets received on "up links" can be forwarded only on down links.

In addition, it should be understood that for all links between hosts and switches, the up direction is toward the switch. The channel from a host computer to a switch is always an up link or channel, and the channel from a switch to a host is always a down link or channel. Thus when a host computer transmits a data packet, the first channel that the data packet goes over is always an up channel. Similarly, the last channel that a data packet goes over as it is received by a host computer is always a down channel.

The lower left portion of FIG. 5 comprising switches S1, S3, S5 and S10 will now be used to show why deadlock is impossible using the up/down routing mechanism. If one tries to impose the data paths from FIG. 4 onto these switches in FIG. 5, one will see that all of the data paths in FIG. 4 are legal except one: the data path from host B to host D through switches S3, S5 and then S10 is not legal. This is because the path from S3 to S5 is a down channel while the path from S5 to S10 is an up channel. This contradicts the rule that up channels cannot be used after down channels. The solution is that message from host B to host D must first go from S3 to S1 (which is an up channel) and then from S1 to S10 (which is a down channel).

The directionality of each link between switches in the network is determined as follows. Every switch (and host computer) is permanently assigned a unique 48-bit identifier, called the UID. Such UIDs are used in Ethernet networks to uniquely identify every member of the network. As will be discussed later, every switch in the network is assigned a 7-bit SHORT ID, and every host computer is assigned an 11-bit network address.

The first rule is that the switch with the lowest UID in the entire network is called the root node and is assigned a network level of zero. A corollary of the first rule is that all links to the root node are directed upwards toward the root.

In FIG. 5 it is assumed that each switch is assigned a UID equal to its reference numeral S1 is assigned a UID of 1, then S2 is assigned a UID of 2, and so on. Thus switch S1 is the root and the links to S1 from switches S2, S3, S9 and S10 are directed upwards toward switch S1.

The second rule is that switches are assigned network levels based on the minimum number of links between the switch and the root, and that links between switches at different network levels are directed upward toward the lower network level. For instance, switch S3 is at network level 1 and switch S8 is at network level 2, and thus the link from S8 to S3 is upward toward S3.

The third and final rule for assigning directionality to links is that links between switches at the same network level are upward toward the switch with the lower UID. Thus, since switches S2 and S3 are both at network level 1, the link between them is upward toward S2.

Another example of a legal route through the network is as follows: to send a packet from host C to host E, the packet could go via path P3 or path P4. Path P3, which goes through switches S5, S3, S8 and S9, is legal because it follows up channels and then down channels. Path P4, which goes through switches S5, S7 and then S8, is legal because it follows two down channels.

While path P4 is shorter than path P3, path P3 might be preferred if the first link of P4 is blocked while the first link in path P3 is available. Thus, the preferred path through the network will depend on which links are already being used by other data packets, and the preferred path will not always be the shortest legal path.

An example of an illegal route for a packet being sent from host F to host G is switches S7 to S6 (down link), followed by S6 to S8 (up link). That route is illegal because it has an up link (S6 to S8) after a down link (S7 to S6)—which is not allowed. A legal route from F to G would be S7 to S5 (up), S5 to S3 (up) and S3 to S8 (down).

The above described method of assigning directionality to the links in the network, and to defining legal routes through the network has been found by the inventors to eliminate not only the deadlock problem, but to also provide a convenient mechanism for handling broadcast message packets, as will be described in detail below.

PACKET FLOW CONTROL

In order to understand many of the features of the preferred embodiment, it is first necessary to understand how "flow control" works. Referring to FIG. 3, consider the example of a 16,000 byte packet being sent from host 132 to host 134. For the purposes of this example, we will assume that each switch port contains a 4k byte FIFO buffer for temporarily storing a portion of an incoming data packet.

Initially, the packet is transmitted by host 132 along path P1 to switch 142. If link 144 is already being used to transmit another data packet, the 4k buffer in switch 42 will soon overflow—unless host 132 can be instructed to temporarily halt transmission of the data packet.

In the preferred embodiment data is continuously transmitted in both directions over every link, such as link 146 between host 132 and switch 142. If there is no data which needs to be sent, then synchronization bytes are sent. Synchronization bytes are simply null data.

At the same time that data is being transmitted, flow command signals are also sent by a simple form of time multiplexing: every 256th byte that is transmitted is a flow control command. The transmission of flow commands is not synchronized with packet boundaries; a flow command is on every link once every 256 byte cycles regardless of what data the link may be carrying. Thus if a 700 byte message were being sent over a link, the data stream representing the message might look like this: the first 200 bytes of the message, followed by a one-byte flow command, followed by the next 255 bytes of the message, followed by a second one-byte flow command, and then the remaining 245 bytes of the message. The end of the packet would be followed by 10 synchronization bytes, and then another flow control command.

To distinguish data from commands, every eight bit byte is logically encoded in the network's switches using nine bits. The ninth bit is a flag indicating whether the byte is data or a command. As just explained, usually only one command is sent every 256 bytes. During normal operation of the network there two frequently used flow commands are: stop data flow and start data flow. During certain circumstances the normal flow of data is interrupted with other commands.

In the preferred embodiment, the nine-bit data/command values that are used in the switches are encoded for serial transmission by standard TAXI transmitter and receiver chips (model Am7968 and Am7969 integrated circuits made by Advanced Micro Devices).

A third frequently used "command" is called a "synchronization byte". Synchronization bytes are simply null data and are considered to be "commands" in that they instruct the receiver that no data is being sent.

Figure 6:
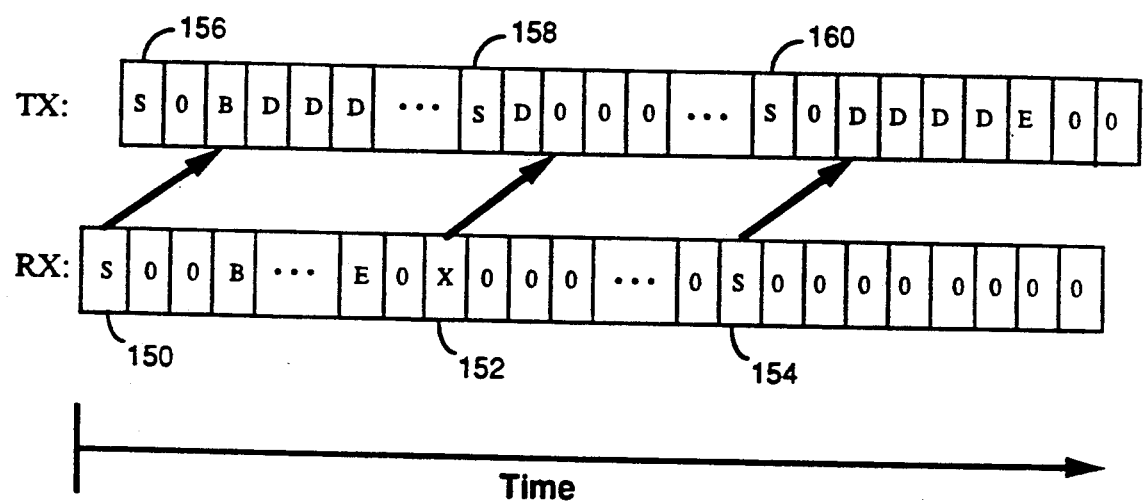
FIG. 6 is a timing diagram depicting the transmission of a data packet and the corresponding flow control signals.

FIG. 6 represents the signals being sent (TX) and received (RX) by host 132 over link 146. As noted above, each "link" between network members is actually two communications channels which simultaneously carry data in opposite directions. Thus FIG. 6 shows two data streams. For example, referring to FIG. 3, these data streams could represent the data streams on link 146 between host 132 and switch 142. For the purposes of this example, the TX data stream transmitted by host 132 contains a fairly long message packet, the beginning and end of which are denoted by a "B" byte and an "E" byte. The "B" byte represents the "begin packet command" that precedes every packet, and the "E" byte represents the "end packet command" that follows every packet.

"D" bytes represent the data in a message packet, and "0" bytes represent synchronization bytes which are sent when either there is no data to be transmitted or the flow of a packet has been temporarily halted.

The RX data stream sent by switch 142 to the host 132 contains flow control signals S (for start) and X (for stop) for controlling the flow of the packet being sent by the host 132. Stop commands sent by the switch 142 temporarily stop the flow of the packet being sent by the host, and start commands sent by the switch 142 cause the host 132 to resume sending the packet. The RX data stream sent by the switch 142 also contains a small data packet as denoted by the "B" and "E" bytes at the beginning and end of that packet.

As shown in FIG. 6, a short time after the first start flow command 150 is sent by switch 142 (in the RX data stream), the host begins to transmit its data packet. The host continues to transmit the data packet until a stop flow command X 152 is received. As will be explained in more detail below in the section entitled Switch Flow Control, the primary reason this might happen would be to prevent the data buffer in the receiving port of the switch from overflowing. When the switch is ready to receive more data it sends a start flow command S 154 and the host responds by resuming transmission of the data packet.

The flow control signal which is sent as every 256th byte is normally a "start flow" command, unless the packet buffer in the network member sending the command has less than a certain amount of free space left—which means that it is in danger of having a buffer overflow unless the flow of data is stopped. Thus, when no data is being received by a switch on a particular link, it continues to send "start flow" signals. It should be noted that each switch sends flow control signals at a particular time slot which is unrelated to the flow control time slots used by neighboring switches.

Host controllers 122 use the same flow control mechanism as the switches, except that host controllers 122 never send "stop flow" commands. Thus a host controller will always send "start flow" control signals to the switch that it is coupled to (i.e., every 256th byte). An example of this is shown in FIG. 6 where the TX data stream contains "start flow" control signals 156, 158 and 160.

Host Network Controller

Next, we will describe in detail the primary hardware components of the network: the host controllers which couple host computers to the network, and the switches which handle the routing of data packets.

Figure 7:
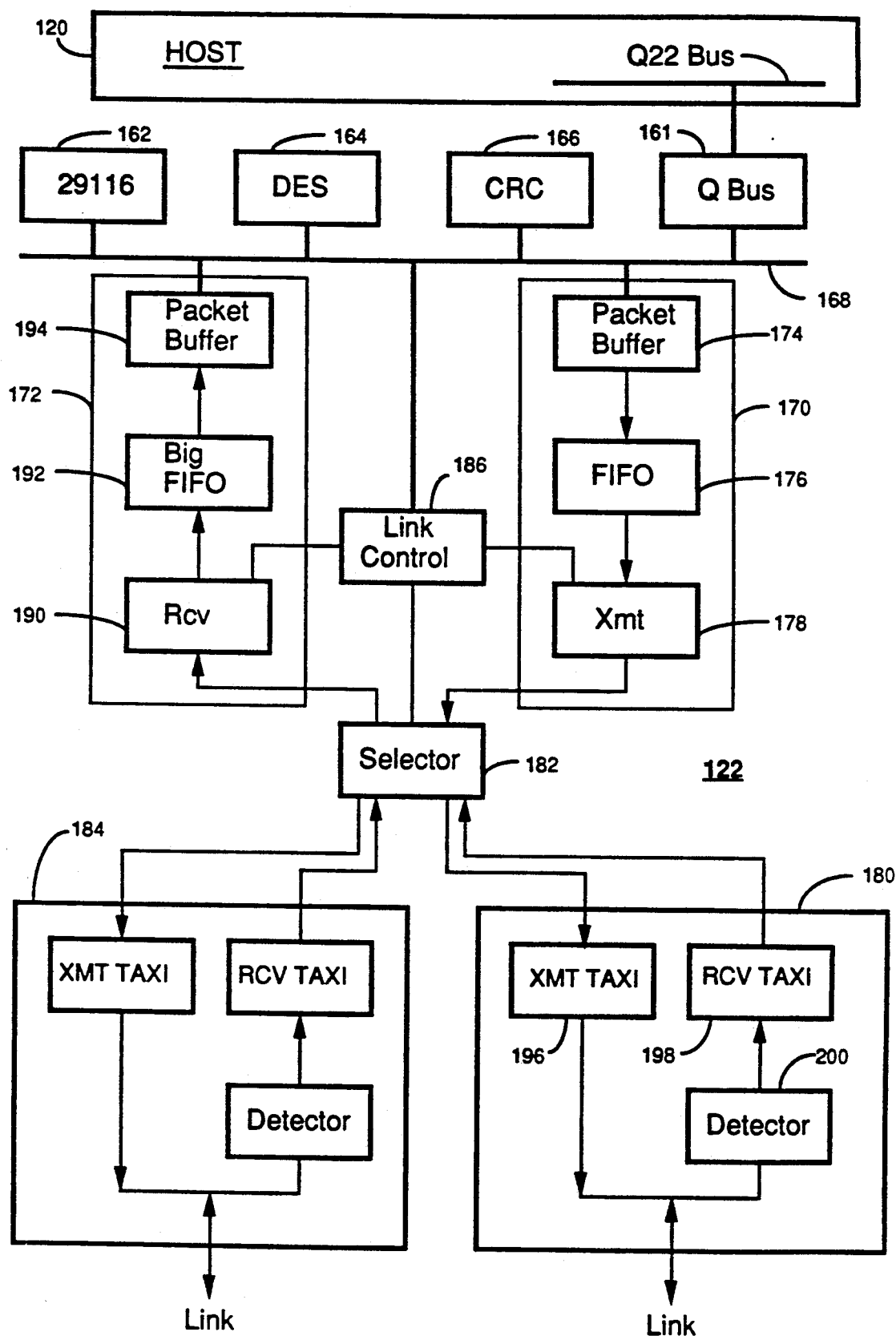
FIG. 7 is a block diagram of a network controller for one host computer.

Referring to FIG. 7, there is shown a block diagram of the network controller 122 for one host computer 120. Functionally, the network controller 122 is a port on the host computer for connecting the host to the network. This particular controller employs what is known as a Q22-Bus Control Protocol, using a Q-Bus control circuit 161 to couple the host computer to the controller 122. A description of the Q22-Bus protocol can be found in "Microsystems Handbook", Appendix A, published by Digital Equipment Corporation (1985). For host computers using other computer buses, different bus interface circuits would be used.

A microprocessor 162, an encryption circuit 164, and a error correction circuit 166 are used in normal fashion for encrypting messages and for generating error correction codes. All of these components of the controller 122 are coupled to a common data bus 168. Generally, the microprocessor 162 deposits a data packet received from the host 120 in the packet buffer 174 via the Q-Bus interface 161. The data packet from the host includes a command block that instructs the microprocessor 162 in the controller 122 on how to handle the packet. In particular, the controller 122 may be instructed to encrypt the packet using encryption circuit 164 with a specified encryption key. In addition, an error detection code is calculated using CRC circuit 166 and then appended to the end of the packet in the buffer 174.

Coupled to the data bus 168 are a data transmitting circuit 170 and a data receiving circuit 172. The data transmitting circuit 170 includes a packet buffer 174 that is used to store an entire packet before it is transmitted. The packet in the buffer 174 is transferred to a 1k byte FIFO (first in first out) buffer circuit 176 before being transmitted by transmitter 178 to a link interface circuit 180 via a link selector 182.

Link selector 182 selectively activates either link interface circuit 180 or link interface circuit 184. In the preferred embodiment, the link selector 182 under the control of the link control 186 automatically selects a predefined one of the two link interface circuits, such as circuit 180, unless the link coupled to that circuit is found not to be working (i.e., if no flow control commands are received on that link). If the normally selected link is not working, the link control circuit 186 causes the selector 182 to enable the other link interface circuit 184.

More specifically, the link control circuit 186 monitors the flow commands received by the receive path 172, and it detects the absence of flow control commands when flow commands are not received from the network on a regular basis. The circuit 186 informs the microprocessor 162 of the lack of flow control commands, and then the microprocessor 162 takes a number of steps to try to reestablish the controller's connection to the network. If these measures do not work, the microprocessor 162 sends a signal to the link control 186 to try the controller's other link interface circuit.

The following is a simplified explanation of how the flow control signals are used by each host controller 122 to select link interface 180 or 184 as the active link. A more detailed explanation of this process is described below in the section entitled "Reconfiguration Phase One".

Upon power up, the host controller 122 begins transmitting synchronization signals on the initially selected link, and monitors the initially selected link for the receipt of flow control signals. If no flow control signals are received for a predefined period of time, the selector 182 is instructed to select the other available link. The process of looking for flow control signals on the currently selected link and switching links if none are detected continues until flow control signals are consistently received on one of the two links.

Link control circuit 186 monitors the flow control signals received by the currently active link interface 180 or 184. For the purposes of this initial explanation, it can be assumed that there are only two types of flow control signals: stop command signals and start command signals. When a start command signal is received, transmitter 178 is enabled and the data stored in packet buffer 174 is transmitted until either the packet buffer 174 is empty or until a stop command signal is received. When a stop command signal is received, the link control circuit 186 "disables" the transmitter 178 so that synchronization signals (i.e., null data commands) are transmitted instead of new data from the packet buffer 174.

In the preferred embodiment, once the transmission of a packet is begun by the controller 122, the host controller 122 must always be ready to transmit all of the data in the packet on demand. In the preferred embodiment packets can be as small as about ten bytes, and as large as 16000 bytes.

Each complete packet that is to be transmitted is first stored in packet buffer 174 before transmission of the packet can begin. Then, link control circuit 186 enables the transmission of the packet in accordance with the flow control signals received on the active link, as described above.

The receive path includes a data receiver 190, a large (e.g., 4K byte) FIFO buffer 192, followed by a received packet buffer 194. As data packets are received from the active link, the data is initially stored in the FIFO buffer 192. From the FIFO buffer 192, which can hold many small packets, data is transferred into the packet buffer 194. When the end of a complete packet is detected, the packet in the buffer 194 is then processed (i.e., transferred to the host computer) and cleared from the packet buffer 194.

In the preferred embodiment the host controller 122 never sends out stop flow signals and must be prepared to receive a sequence of several packets. While one packet in the buffer 194 is being processed, other packets may be received and stored in the same buffer 194. Thus buffer 194 is a large dual ported circular buffer, with sufficient capacity (e.g., 128k bytes) for holding several large packets. Data is read out through one port of the buffer 194 for processing by the microprocessor 162 and transfer to the host 120, and new data packets are written via the other port of the buffer 194.

Using a large FIFO buffer 192 is generally preferred so that packets will not be lost due to slow processing by the host controller. If the FIFO buffer 192 does overflow, causing a packet to be lost, higher level protocols which require the acknowledgement of received packets cause the lost packets to be retransmitted.

The primary components of the link interface circuit 180 are two "TAXI" chips 196 and 198 (model Am7968 for the transmitter 196 and model Am7969 for the receiver 198, both integrated circuits made by Advanced Micro Devices) which are standard "transparent" asynchronous transmitter and receiver interface circuits. These circuits handle high speed data transmissions over point to point links, and thus are suitable for the 100 Megabit data transmission rates used in the preferred embodiment.

Detector 200 is a signal booster which helps the receiver circuit 198 handle weak input signals.

CUT-THROUGH, NONBLOCKING SWITCH

Figure 8:
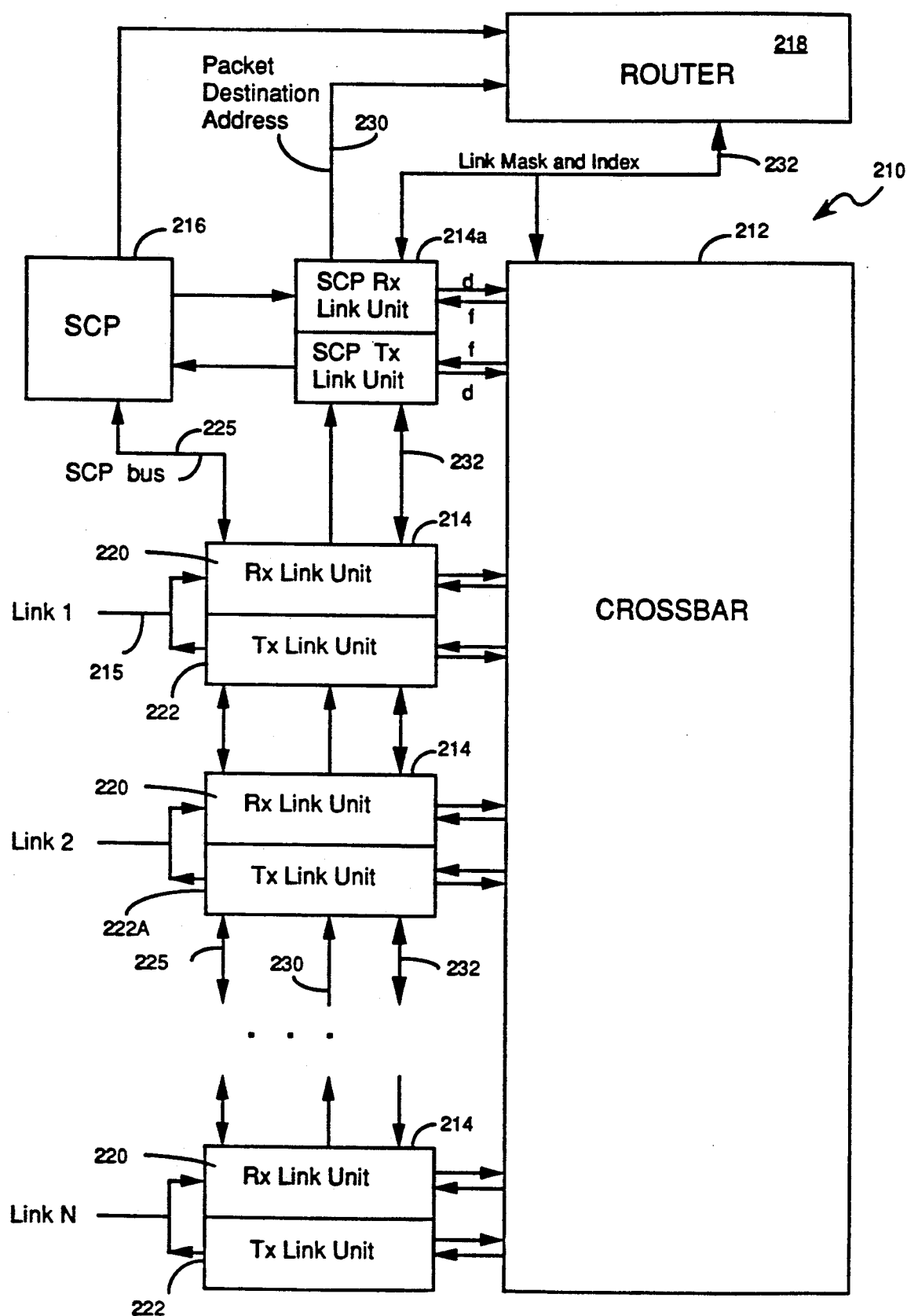
FIG. 8 is a block diagram of the switch used in the preferred embodiment.
Figure 9:
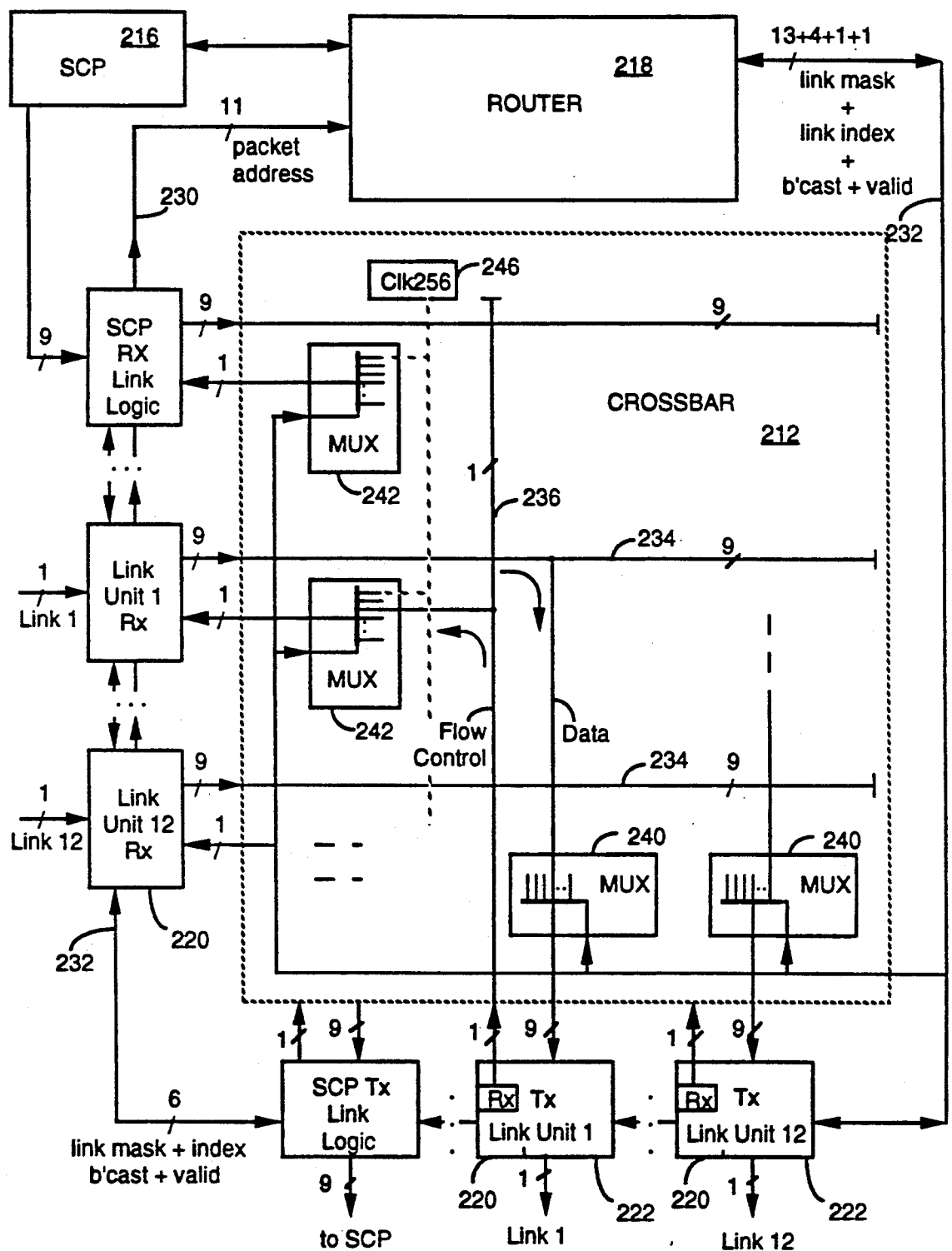
FIG. 9 is a block diagram of the crossbar switch used in the preferred embodiment.

The switch 210, shown in FIGS. 8 and 9, is the key component of the entire network. The switch 210 is called a nonblocking switch because it can simultaneously interconnect several pairs of selected links. It is also called a cut-through switch because it can begin retransmitting (i.e., forwarding) data packets well before the complete packet has been received.

There is no central controller or intelligence which controls the network of the present invention. Rather, the network's intelligence and control logic, which makes routing decisions and handles various other network management tasks, is distributed over all of the switches in the network. For instance, each switch independently makes routing decisions, without knowledge as to the previous links used to transmit each data packet. However, the switches are designed so that each facilitates the efficient and error free routing of packets.

Referring first to the block diagram in FIG. 8, the primary components of the switch 210 are a nonblocking crossbar switch 212, a number (twelve in the preferred embodiment) of switch ports 214 which are also called link control units 214, a switch control processor (SCP) 216, and a router 218 which is also called the routing logic circuit 218. There is also a special link circuit 214a for coupling the SCP 216 to the crossbar 212.

Each link unit 214 couples the crossbar 212 to one full duplex link 215. Each link 215 has two data channels so that data can be simultaneously transmitted in both directions over the link 215. Therefore each link unit 214 has two components: an input link unit 220 (Rx) and an output link unit 222 (Tx).

When a new data packet is received by the switch 210, the input link unit 220 which receives the data packet is coupled by the crossbar 212 to an output link unit 222A (for a different link than the input link). The output link unit 222 transmits the received data packet over another link, and thereby forwards the packet towards its destination.

As will be described in more detail with respect to FIG. 9, the crossbar 212 is designed so that it can simultaneously couple any or all of the input link units 220 to distinct sets of output link units 222.

The purpose of the router 218 is to determine which output link unit 222 should be coupled to each input link unit 220. When a new data packet is received by an input link unit 220, the input link unit 220 sends a routing request to the router 218. The routing request specifies the destination of the packet, as well as the identity of the input link unit. As shown in FIG. 8, the link unit 220 sends the packet's destination address to the router 218 over bus 230.

It is noted that the destination of the packet is stored in a few bytes at the beginning of each packet which specify the network member to which the packet is being sent.

The Router Bus 232 includes a link mask with one bit corresponding to each of the link units, plus a four bit link index, a broadcast bit and a valid flag. Each of the lines of the link mask portion of bus 232 can be thought of as a single bit communication line between the router 218 and one of the link units 214.

An availability flag is periodically sent by each output link unit 222 to the router 218. The availability flag is ON when the output link is not busy and is "not blocked" and is therefore available for routing a new data packet. An output link unit is blocked when the switch on the other end of the link (i.e., the link coupled to the output link) unit has sent a Stop flow command. The Stop flow command indicates that the switch on the other side of the link is not ready to receive more data. When the output link unit 222 is busy or blocked, its availability mask is OFF. The thirteen availability mask bits from the output link units 222 are periodically sampled by the router 218 and then used to make a route selection.

Using the information sent by the input link unit 220, the router 218 determines which output link unit(s) 222 should be used to retransmit the data packet. The routing selection made by the router 218 is transmitted over the router bus 232 to the link units 214 and crossbar 212 which use the routing selection to set up the appropriate connections in the crossbar 212.

The router 218 is described below in more detail with respect to FIGS. 13-16. A preferred embodiment of the circuitry for the router 218 is described in patent application Ser. No. 07/370,248, filed simultaneously herewith, entitled ROUTING APPARATUS AND METHOD FOR HIGH-SPEED MESH CONNECTED LOCAL AREA NETWORK, which is incorporated by reference.

It is noted that while the initial preferred embodiment has only a dozen switch ports (i.e., link units) 214, it is anticipated that future units may have larger numbers of such ports.

The SCP 216 is a standard microprocessor (e.g., a 68010 microprocessor made by Motorola is used in the preferred embodiment) which is programmed to initialize the router 218 whenever the switch 210 is powered up or reset, and to perform a reconfiguration program whenever a component of the network fails or a new component is added to the network. The SCP is coupled to all the link units 214 by SCP bus 225 so that the SCP can monitor the status of the link units and can identify units which are not connected to a link and units which are malfunctioning.

Link unit 214a couples the switch control processor (SCP) 216 to the crossbar so that the SCP 216 can send and receive data packets via the crossbar 212 using the same communication mechanisms as the host computers in the network. During reconfiguration of the network, the SCP 216 sends data packets to the SCPs in the neighboring switches to determine the topology of the network, and to generate a new set of routing tables for the routers 212 in the network's switches.

Connections between input link units 220 and output link units are made by the crossbar 212 as follows. Generally, each time that the router 218 issues a new link selection, two multiplexers inside the crossbar will be set so that a selected input link unit is coupled to a selected output link unit. Two multiplexers are needed because one transmits data from the input link unit to the output link unit, while the other multiplexer transmits flow control signals back to the input link unit. When broadcast packets are transmitted, the number of multiplexers set up by the link selection signals will depend on the number of output links being used.

Crossbar Circuit

In FIG. 9, the input and output portions 220 and 222 of each link unit have been separated so as to show their logical relationship to the crossbar 212. The input link units 220 are shown along the left side of the crossbar 212 while the output link units 222 are arrayed along the bottom of the crossbar 212. However, as will be explained below, the circuitry of these two units 220 and 222 is interconnected and the control logic for the two is not entirely separate. In addition, solely for the purposes of this one drawing, each input link unit 220 is shown a second time at the bottom of the crossbar 212 for reasons which will soon be explained.

As shown in FIG. 9, each input link unit is coupled to a 9-bit wide data path 234 and 1-bit wide flow control line 236. The data path 234 carries data from data packets, and the flow control line 236 carries flow control information.

The crossbar 212 includes two multiplexers 240 and 242 for each link unit 214. The first multiplexer 240, called the data transmission multiplexer, couples a corresponding output link unit 222 to a selected one of the data paths 234. Since there are as many data transmission multiplexers 240 as there are link units 214, several or even all of the output link units 222 can be simultaneously coupled to corresponding selected ones of the input link units 220. In other words, the switch 212 is a nonblocking switch which can simultaneously route many packets.

In addition, it can be seen that two or more of the transmitting link units 222 can be coupled to the same data path 234 simply by causing their data transmission multiplexers 240 to select the same data path. This latter capability is used when broadcasting data packets to all the hosts on the network.

The second multiplexer 242, called the flow control multiplexer, couples a corresponding input link unit 220 to a selected one of the flow control lines 236. In other words, the flow control commands received by one input link unit 220 are transmitted via the crossbar 212 to the control circuitry in another one of the input link units. Since there are as many flow control multiplexers 242 as there are link units 214, each input link unit 220 can be simultaneously coupled to a corresponding selected one of the other link units 214.

Each multiplexer 240 and 242 has an associated selection register (not shown) which is used to store a four-bit selection value that is sent to it by the router 218. These selection values determine which data path and flow control lines will be coupled to each of the link units.

In summary, the crossbar has one multiplexer 240 or 242 for directing data or flow commands to each of the input and output link units 220 and 222.

The selection signals for the multiplexers 240 and 242 are generated and output on router bus 232 by the router 218. Every time that the beginning of a new packet reaches the front of the FIFO buffer in an input link unit 220, the input link unit 220 transmits a routing request to the router 218 via bus line 230. The router responds to routing requests by generating and transmitting a multiplexer control signal over the router bus 232. The router bus 232 has the following components:
link mask
link index
broadcast flag
router bus valid flag.

Note that the operation of the router 218 and how it generates these values will be discussed below in the section entitled "Router Circuit".

The output link mask contains a separate ON/OFF flag for each of the output link units 222. Each output link 222 having a mask flag with a value of "1" will be coupled to a specified input link unit. The broadcast flag is set when a broadcast packet is being simultaneously routed to a plurality of network members. The router bus valid flag is set whenever the router 218 is asserting a route selection on the bus 232, and is reset otherwise.

The link mask portion of the router bus 232 is used to transmit bits corresponding to the selected output links, and the link index is a four-bit value that identifies the input link unit. The crossbar uses the four-bit link index as the multiplexer selection signal for the data transmission multiplexer(s) 240 coupled to the selected output link unit(s). For example, if the link mask has a "1" flag for output link unit 5 and the input link selection has a value of 0011 (i.e., 3), the value 0011 will be used as the selection signal for the multiplexer 240 associated with the fifth output link unit 222. If the output link mask has a "1" flag for several output link units, then the input link selection value will be used for each corresponding multiplexer.

The link index value that is transmitted by the router 218 is also used for setting up the flow control multiplexers 242. To do this, when the valid bit is ON, the crossbar circuit 212 remembers the link mask and link index which were sent by the router 218 and then sets up the flow control multiplexer 242 for the input link specified by the link index value. When the broadcast bit on the router bus is OFF, the selection value loaded in the flow control multiplexer 242 corresponds to the output link identified on the link mask portion of the bus.

When the data packet received by the input link unit 220 is being broadcast to more than one output link mask, the broadcast bit on the router bus is ON, and the selection value loaded into the flow control multiplexer 25 is a special value (e.g., 15). This causes the input link unit to use a special clock signal from a clock generator 246, called Clk256, in place of the normal flow control signals. As explained earlier, a broadcast packets are transmitted without regard to the normal flow control signals.

In summary, the router 218 transmits link selection values over bus 232 which is used by the crossbar circuit 212 to store corresponding values in the selection registers of the crossbar's multiplexers 240 and 242, and thereby causes the crossbar to couple the selected input and output link units.

The link selection values sent on the router bus 232 are also monitored by the input and output link units so as to coordinate the transmission of data packets through the crossbar 212 and then through the output link unit to another network member.

The operation of the router 218 and the signal protocols used on the router bus 232 are discussed in more detail below with reference to FIGS. 13-15.

Switch Flow Control

Figure 10:
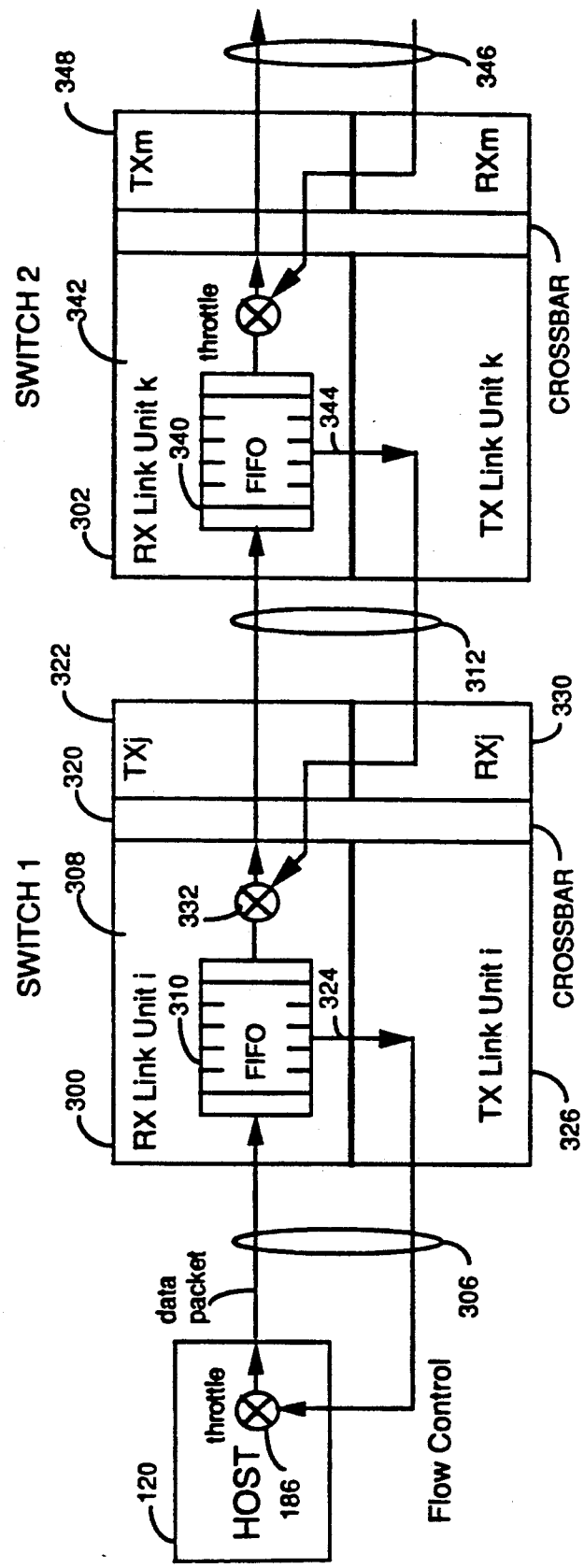
FIG. 10 is a block diagram of the data flow control circuitry for a chain of connected network members.

Referring to FIG. 10, the basic mechanism for flow control between switches, and between switches and hosts is as follows. Every input link unit has an internal FIFO buffer which is used to temporarily store received data. Ideally, data should be read out of the FIFO buffer about as fast as it stored. But numerous factors, such as a blocked (i.e., busy) link, can cause data to back up in a FIFO buffer. When the FIFO buffer reaches a certain degree of fullness it sends out a stop flow command to the network member ("transmitter") that is sending it data. When the transmitter receives the stop flow command, it temporarily stops sending data until a start flow command is received. The receiving FIFO buffer sends out start flow commands whenever enough data has been read out of the FIFO buffer so that it is less than a specified amount full.

Flow commands for any particular channel are transmitted in the opposite direction as the reverse channel of the same link, multiplexed with data that is transmitted on that reverse channel.

Of course, when a stop flow command is received by a switch, data will start to back up in a FIFO buffer in that switch, too. Thus there will be a chain reaction of stop flow commands that are generated as FIFO buffer's in each of the chain of switches becomes filled. Eventually, if the data packet is long enough, the host that is sending the packet may receive a stop flow command to temporarily stop it from sending out the rest of the packet.

There is also a chain reaction of start flow commands that is generated when the cause of the logjam goes away and the FIFO buffer which generated the first stop flow command is able to transmit the data that it has stored.

FIG. 10 shows some of the details of the link units used in the preferred embodiment that are particularly relevant to the flow of data packets through the network. FIG. 10 depicts the flow of a data packet from a host computer 120 through a sequence of two switches 300 and 302. When a data packet is received by link unit i in switch 300, it routes the packet by coupling the input link unit i to an output link unit TXj via its crossbar. The data packet then travels through a second switch 302, which routes the packet again. If the FIFO buffer 310, 340 in any of the Rx link units reaches half full, it forces the previous network member in the data transmission chain to stop transmitting data until the data already in the FIFO buffer can be processed.

As the host 120 begins to transmit a data packet over link 306, an input link unit 308 in switch 300 temporarily stores the received data in a FIFO buffer 310. Using the data in the packet's header (not shown), the switch 300 determines which of its links are proper links for forwarding the data packet towards its destination. In this example, link 312 is selected.

If link 312 is not busy, the switch connects the input link unit 308, through crossbar 320, to the output link unit 322 that is coupled to selected link 312. Usually, the switch 300 can select an output link and can connect the input link unit 308 to the output link unit 322 in less than the time that it takes to receive the first twenty-five bytes of a data packet.

However, if the link 312 is busy, the switch 300 will continue to store the data packet in the FIFO buffer 310 and will wait for an appropriate link to become available. In the preferred embodiment, the FIFO buffer 310 can store 4k bytes of packet data and has built-in circuitry which generates a half-full flag on line 324 when the buffer is at least half full. When the FIFO buffer 310 is less than half-full, this flag is interpreted as a "start flow" command; when the FIFO buffer is more than half-full, the flag is interpreted as a "stop flow" command.

The current value of the half-full flag from the FIFO buffer 310 is transmitted as a flow control value back to the host 120 by the output link unit 326 which is coupled to link 306. When the flow control value is "0", the data "throttle" 186 (i.e., the link control in FIG. 7) in the host enables the transmission of data packets by the host 120. When the FIFO buffer 310 reaches half full, however, the "stop flow" command generated by the FIFO buffer causes the throttle 186 in the host computer 120 to temporarily stop the transmission of data by the host. When the switch 300 transmits enough data for the FIFO buffer 310 to become less than half full, the FIFO buffer 310 puts out a "start flow" command which enables the host's throttle 186 to resume transmitting the data packet.

As will be explained below with reference to FIG. 11, there are some built in transmission delays and packet handling requirements which result in a requirement that the FIFO buffer 310 have about 2k bytes of room left in it when it first generates a "stop flow" command. In general, the minimum required size of the FIFO buffer 310 is a function of the maximum link length, and the maximum broadcast packet size. As a result, it has been found to be convenient to use a 4k×9 FIFO buffer, such as the IDT 7204, which already includes circuitry that generates flags indicating whether the FIFO buffer is empty, and whether it is at least half full.

As shown in FIG. 10, when the first switch 300 routes the data packet onto link 312, the data packet is received by another switch 302. There, it is once again stored in a FIFO buffer 340 inside an input link unit 342 while the switch decides where to route the packet. If there are no available links on which the data packet can be routed, the FIFO buffer 340 will generate a "stop flow" command on line 344 when it is half-full. This stop flow command is sent over link 312 to switch 1. In particular, it can be seen that the stop flow command is received by input unit 330 of switch 300, and that the flow command is then routed through the output link unit 332 and then the crossbar 320 to the input link unit 308 which is receiving the data packet. There, the flow command controls a throttle circuit 332, which enables the transmission of the data stored in FIFO buffer 310 when it receives a start flow command and disables transmission when it receives a stop flow command.

When link 346 becomes available, switch 302 begins transmitting the data in the FIFO buffer 340 over that link, via output link unit 348. When the FIFO buffer 340 becomes less than half-full, it sends out a start flow command over line 344, thereby enabling switch 300 to resume transmission of the data packet.

Link Units

Figure 11:
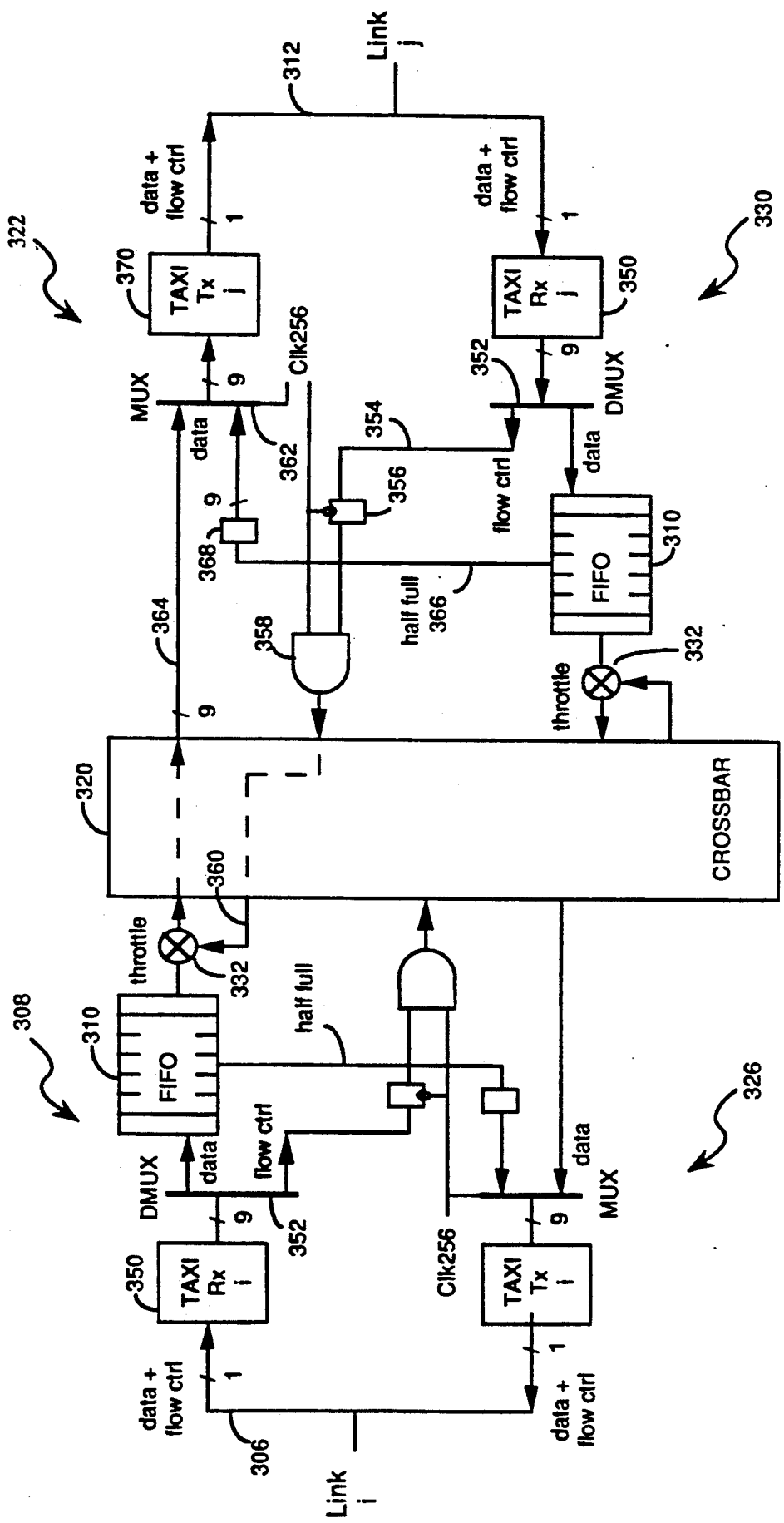
FIG. 11 is a block diagram of two connected link units in a switch.

FIG. 11 provides a more detailed picture of the input and output link units of switch 300, previously shown in FIG. 10. Each input link unit 308 and 330 includes a TAXI receiver chip 350 that converts the bit serial data received over an incoming link 306 or 312 into a 9-bit parallel signal that is transmitted over a 9-bit wide bus to a demultiplexer 352. Each byte of data contains a data type-flag, indicating whether the byte is data or a command, which comprises the ninth bit of each byte.

The demultiplexer 352 monitors the type-flag of the signals received from the TAXI Rx circuit 350, and splits off commands in the data stream from data. Data signals, as well as end of packet "command bytes", are stored in the FIFO buffer 310. Flow control commands received over the link 306 are converted into an ON/OFF (i.e., 1/0) binary signal which is transmitted on line 354. The flow control command on line 354 is latched in a latch 356 that is clocked with the transmission clock Clk256 of the corresponding output link unit 322. The latched flow control signal is then ANDed by AND gate 358 with the transmission clock CLk256, and the resulting signal is sent through the crossbar 320 for transmission to another input link unit 308. The output of the AND gate 358 is coupled by the crossbar 320 to throttle control line 360 in input link unit 308.

The latch 356 and AND gate 358 cause the flow control signals sent to the input link unit 308 to be synchronized with the transmission clock of the output link unit 322. In addition, the AND gate 358 causes the transmitted flow command to be OFF once every 256 bytes so as to stop the transmission of data through the crossbar 320 for one byte, during which time the output link unit 322 transmits a flow control signal instead of data. In essence, the output link unit 322 puts out a "stop flow" command on throttle control line 360 every 256th byte cycle, as determined by clock Clk256, so that the throttle 322 of the corresponding FIFO buffer 310 will not send data during the flow control cycle of the switch.

Thus, as described above, flow control signals received by an input link unit are latched and synchronized by the corresponding output link unit, and are then used to start and stop the flow of data through that output link unit.

Each output link unit 322 converts the 9-bit parallel signals received from the crossbar 320 into bit serial signals that are transmitted over an output link 312. More specifically, the output link unit 322 contains a multiplexer 362. The multiplexer 362 is coupled to clock Clk256, which alternately enables the transmission of data from line 364 for 255 data byte cycles, and then enables the transmission of one flow command byte. A clock with the same period as Clk256 is coupled to the demultiplexer 352 so that the FIFO buffer 310 does not, on average, fill faster than it can be emptied.

The multiplexer 362 derives the flow commands that it sends from the status of line 366. Line 366 carries the half-full flag generated by the FIFO buffer 310 in the input link unit 330. Generally, when the FIFO buffer 310 is at least half-full, an ON (i.e., STOP) signal will be sent on line 366, and otherwise an OFF (i.e., START) signal will be sent on line 366. The signal on 366 is converted by an encoder circuit 368 into a nine-bit "stop flow" or "start flow" command for transmission by the Taxi Tx circuit 370.

The data and flow commands output by the multiplexer 362 are converted into a bit-serial data stream by TAXI transmitter 370, which transmits the multiplexed data and commands over link 312.

Figure 12:
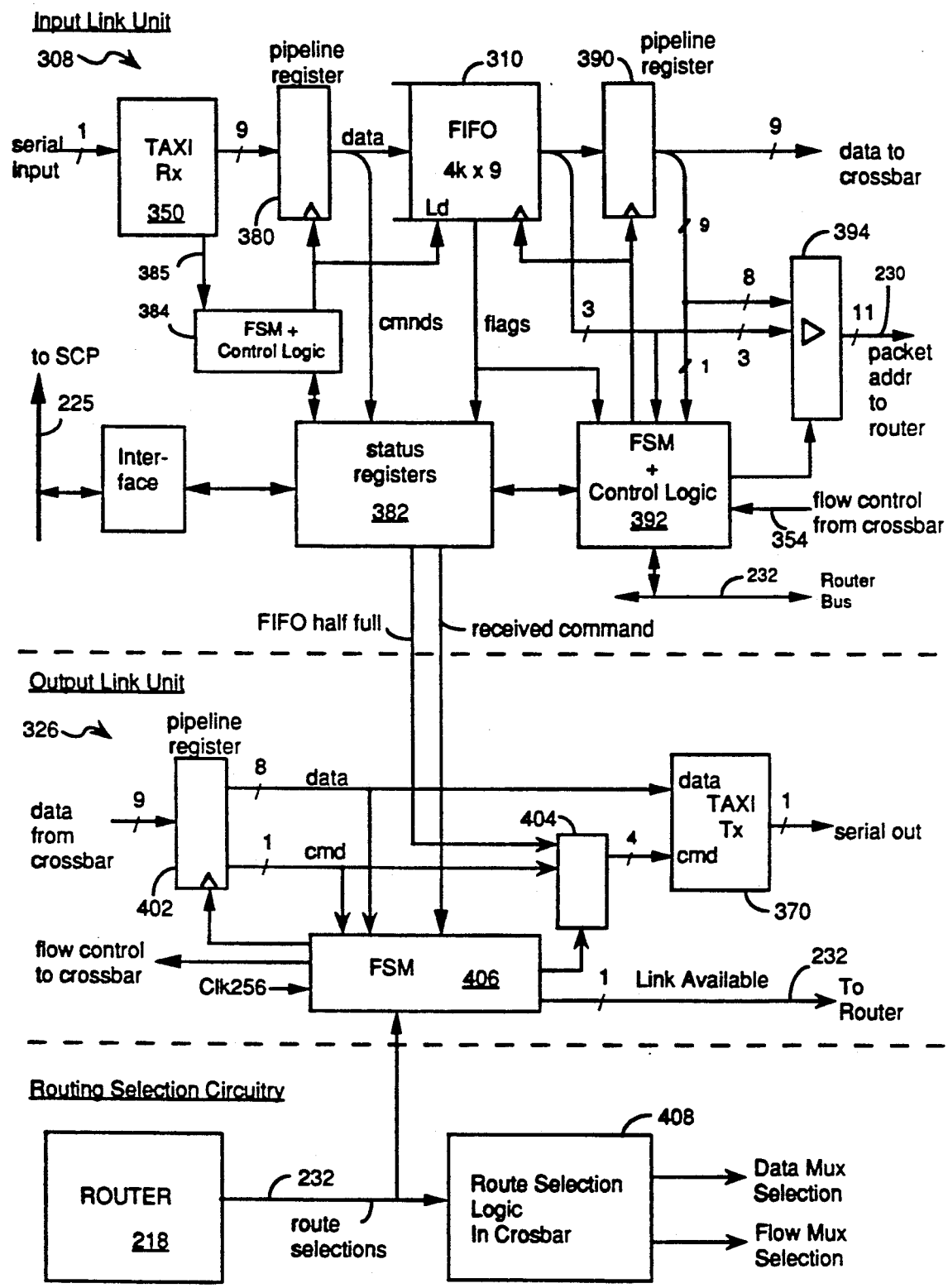
FIG. 12 is a detailed block diagram of a link unit.

FIG. 12 shows additional details of the link unit circuitry. The demultiplexer 352 in input link unit 308 as shown in FIG. 11 is shown in FIG. 12 to be implemented using a pipeline register 380, status registers 382, and control logic 384. All received data is stored for one byte cycle in the pipeline register 380, which gives the control logic 384 time to determine whether each byte should be loaded into the FIFO buffer 310. Flow commands are decoded and stored in the status registers 382. The control logic 384 receives a clock signal on line 385 that is synchronized with the data being received. This clock signal is generated by The Taxi Rx circuit 350. The control logic 384 reads the status registers 382 and disables the loading of data into the FIFO buffer 310 when certain commands are received. More generally, the control logic 384 is a finite state machine which generates a set of clocks signals that used to control the flow of data through the part of the input link unit up to and including the input port of the FIFO buffer 310.

It should be noted that the input side of the FIFO buffer 310 is clocked by signals synchronized with the data being received by TAXI Rx circuit 350, while the output side of the FIFO buffer 310 is clocked by a different clock signal generated by an independent clock circuit in the switch. The two clock rates are approximately equal, within about 0.02%, but are not synchronized.

With the assistance of a sequence of pipeline register 390 at the output of the FIFO buffer 310, a second control logic circuit 392 identifies the beginning of each new packet, which contains the packet's destination address. The packet's destination address is sent to the router via buffer 394.

The throttle 332 shown in FIG. 11 is implemented by the control logic 392 which generates the output clock signals for the FIFO buffer 310 and pipeline register 390. The control logic 392 receives flow control signals from line 354. Note that the received flow control signals were transmitted through the crossbar by another input link unit. When a stop flow command is received, the control logic 392 simply disables the output clock signal for the FIFO buffer 310 and pipeline register 390, thereby halting the flow of data out of the FIFO buffer 310.

The control logic 392 also monitors the data/command bit of each 9-bit byte of data as it is read out of the FIFO buffer 310 so as to identify the end of each packet. Only data and end of packet command bytes are stored in the FIFO buffer 310. Therefore the end of a packet is detected by the control logic 392 when an enabled command bit is read from the FIFO buffer 310. After the end of each packet, the control logic 392 waits until the current packet has cleared the pipeline, and then begins looking for a new data packet to be forwarded.

The control logic 392 interacts with the router 318 via the router bus 232. When the beginning of a new packet is detected, the control logic 392 sends a routing request signal on the link mask portion of the router bus 232 and receives a "grant" signal on the same link mask portion of the router bus during a later time slot. When a grant signal is received, the packet destination address for the new packet is asserted by buffer 392 on bus 230. The control logic 392 also synchronizes the transmission of a new data packet with routing selection signals sent by the router on bus 232.

Both logic circuits 384 and 392 store status signals in the status registers 382 indicating the current status of the input link unit 308. The switch control processor (SCP) periodically reads some of the status values stored in the status registers 382 to determine which link units are coupled to a live link and which link units are working properly.

The output link unit 326, as shown in FIG. 12, consists of a pipeline register 402, a decoder 404, a finite state machine (FSM) 406, and a TAXI transmitter 370. Data from the crossbar is held for one clock cycle in the pipeline register 402 to allow setup of decoder 404, as required by the TAXI timing specifications. Whenever an end of packet command byte is received in the pipeline register 402, the FSM 406 recognizes that command and changes its internal state. Thereafter, if the corresponding output link is not blocked by STOP flow control signals received by the input link unit 308, the FSM 406 then sends out a "link available" signal to the router 218 so that the router will know that this link is available for routing a new packet. The FSM 406 also commands the TAXI Rx circuit 370 to send out an end of packet command byte and then commands the TAXI 370 to transmit synchronization bytes until the router 218 reconnects the output link 326 to an input link for transmitting another packet.

The decoder 404, in conjunction with the FSM 406, acts as the multiplexer 362 of FIG. 11. In particular, the FSM 406 uses the Clk256 clock signal to determine when the TAXI transmits data from the crossbar and when it transmits flow commands. The decoder 404 receives the FIFO half-full status signal from the input link unit. During each time period for transmitting a flow control signal, the decoder 404 decodes the FIFO half-full signal so as to form an appropriate command for the TAXI 370. At the beginning of each packet it forms a BEGIN command and at the end of each packet the decoder 404 forms an END command. If the output link unit is blocked by a STOP flow command, or if the output link unit is idle, the decoder 404 forms a SYNC command. During all other time periods, the decoder 404 sends a "data transmission" command to the TAXI 370. The FSM 406 determines the status of the output link unit 326 and what command the decoder 404 should send to the TAXI 370.

The output link FSM 406 also synchronizes the transmission of a new data packet with routing selection signals sent by the router on bus 232. The same routing selection signals are used by the route selection logic 408 in the crossbar to set up the data and flow multiplexers for coupling a specified input link unit to one or more specified output link units.

Flow Control for Broadcast Packets. As will be described below in the section on broadcast packets, the transmission of broadcast packets cannot be stopped in the middle of a packet. Since there is a predetermined maximum size for broadcast packets (e.g., 1528 bytes), there must be room in the FIFO buffer 310 (shown in FIG. 11) to absorb an entire broadcast packet that is just starting to be sent when a stop flow command is generated by the switch receiving the packet.

To determine the amount of room which must be left in the FIFO buffer 310 when it sends out a stop flow command in order to be able to receive a complete broadcast packet, the following factors must be included: the maximum delay before the stop flow command is sent, the maximum amount of data that may have already been transmitted when the transmitting network member receives and acts on the stop command, and the maximum size of a broadcast packet. The maximum delay before the stop flow command may be sent is 256 bytes. In addition, for a 2 kilometer fiber optic cable with a 100 megabits/sec transmission rate, the amount of data that may have already been transmitted when the transmitting network member receives the stop command is about 260 bytes. Adding the above delay factors, the FIFO buffer 310 needs at least 2044 (256+260+1528) bytes of unused storage when it generates a stop flow command so that it can absorb a broadcast packet that it is about to be sent without losing any of the data in the packet. To account for miscellaneous delays and to provide an additional safety margin, the FIFO buffer 310 generates a stop flow command when it has 2k (i.e., 2048) bytes of storage left.

In the preferred embodiment, each input FIFO buffer 310 is large enough to store 4k bytes of data. These FIFO buffers 310 are designed to generate start flow commands as long as they are less than half full (i.e., with more than 2k bytes left unused) and to generate a stop command when they are at least half full (i.e., with 2k bytes or less unused).

Packet Continuity. A packet or data underrun occurs when a switch that has partially transmitted a message is ready to receive more of the message from a previous switch, but the previous switch is not ready to transmit the rest of the message. Several aspects of the present invention include features which make packet underrun impossible. In terms of the circuitry of FIG. 10, these features are designed so as to guarantee that until the end of a packet is received, there will always be data in the FIFO buffer 310 to be transmitted.

First, the host controller of FIG. 7 is programmed so that the transmission of a packet is not started until the entire packet is stored in packet buffer 174. This ensures that the host controller can transmit the remainder of a packet upon request.

Second, referring now to FIG. 8, whenever a switch receives a new data packet, it takes a period of time for the router 218 to process the routing request for that data packet and to determine which output link should be used to retransmit the packet. During the time that the router 218 is working on this, at least twenty-five bytes of data are stored in the FIFO buffer 310.

The only remaining requirement to prevent packet underrun is that it must be impossible to read all the data in the FIFO buffer 310 before more data reaches it from the previous network member. Basically, this means that there is a limit on the amount of the clock rate mismatch for the data transmitters in each of the switches. For instance, if the transmitter in a switch is slightly faster than the transmitter in the previous network member, the amount of data in the FIFO buffer 310 will slowly decrease as the packet traverses the switch. Therefore, to prevent packet underrun the maximum amount of time that it takes to transmit the largest legal data packet multiplied by the maximum clock rate discrepancy must be less than the amount of data stored in the FIFO buffer 310 before the transmission of new packet is enabled.

In the preferred embodiment, the maximum length packet is 16k bytes long, and the maximum clock skew is about 0.02 per cent. As a result, the amount of data which initially needs to be stored in the FIFO buffer 310 to prevent packet underrun is approximately 4 bytes. In the preferred embodiment, it takes the router 218 at least twenty-five byte cycles (at 100 Megabits/second) to make a route selection, and it takes the switch at least one more byte cycle to couple the input link unit to the selected output link unit. Thus at least twenty-five bytes will be stored in the FIFO buffer 310 before the retransmission of the packet can begin.

It is noted that one benefit of the flow control system used by the present invention is that it avoids the need for the control logic 392 in the input link units to examine the FIFO buffer 310 to detect packet underruns, and therefore avoids the need to synchronize the output side of the FIFO buffer 310 with the input side. While synchronized FIFO access circuits are available and would solve any clock rate mismatches between switches, such circuits are much more expensive than the buffering scheme of the present invention.

ROUTER CIRCUIT

Every switch in the network is assigned a unique seven-bit SHORT ID in addition to its 48-bit UID. SHORT IDs are assigned during configuration of the network and the SHORT ID for any particular switch may change when the network is reconfigured. Each host computer is assigned an eleven-bit "network address". The network address of a host computer is generated by concatenating the SHORT ID of its switch with the four-bit value of the link port which couples the host to the switch. The network address of each switch is its SHORT ID plus a predefined four-bit value (e.g., zero) corresponding the link number of the SCP link unit.

Network addresses are the address values used to specify the destinations of packets transmitted through the network.

The reason that each network member is assigned a network address as well as a UID is that a shorter value was needed to facilitate the routing of packets through the network. The seven-bit SHORT ID allows for up to 128 switches. Since each switch has at most twelve external ports, at least one of which must be used to connect the switch to another switch in the network, there can be at most 1408 hosts. This is expected to be more than sufficient for all anticipated applications of the present invention. Of course, the allowed number of network members could be doubled simply by using a 12-bit network address.

When a data packet is first transmitted, the network address of the network member to which the data packet is being sent is stored in the first few bytes of the packet. The router 218 uses the value of the short address, as well as the input link on which the packet is received, to determine which output link(s) should be used to retransmit a data packet.

Generally, the purpose of the router 218 is to allocate system resources (i.e., output links) on a fair and equitable basis to data packets. It is also the job of the router 218 to prevent packet starvation. The router uses a first come, first considered routing priority wherein requests for resources are compared with the set of available resources in the order that the requests were received. The first request to match the available resources is selected and allocated the resources that it needs. Then the process repeats.

Using the first come, first considered routing discipline, later requests can be allocated resources before an earlier request as long as the allocation doesn't conflict with the needs of the earlier request. This routing discipline maximizes the rate at which available resources can be allocated to resource requesters. For broadcast data packets, this routing discipline means that requested resources are reserved by broadcast requests, thereby preventing later requests from impeding the progress of broadcast data packets.

Figure 13:
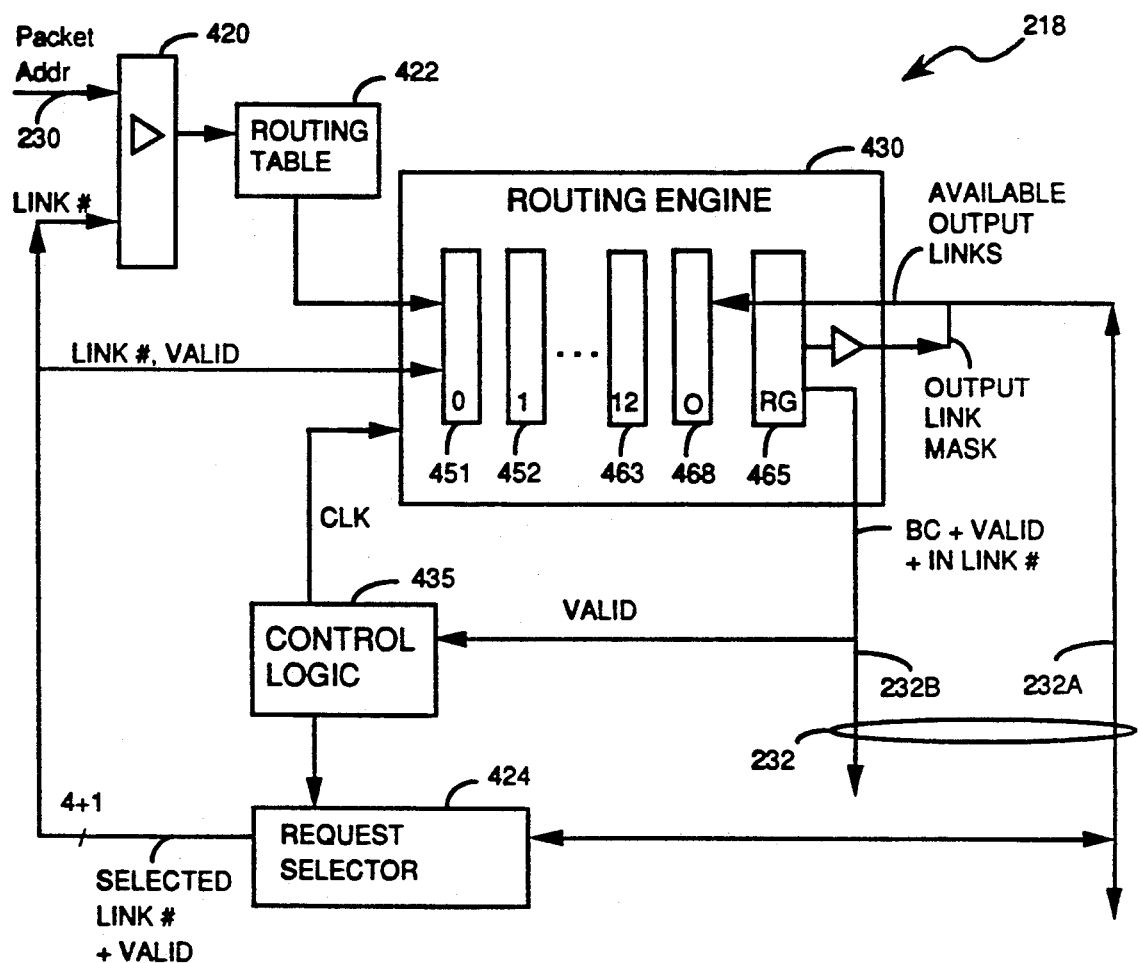
FIG. 13 is a block diagram of the router used in the switch of FIG. 8.

FIG. 13 shows the basic components of the router circuit 218 used in the preferred embodiment. As was shown in FIG. 9, the router 218 receives packet destination addresses on bus 230. Routing requests and output link availability signals are time-multiplexed on router bus 232 along with the transmission of link selection values by the router 218.

Each "routing address" includes an eleven-bit packet address and a four-bit input link number. The routing address is stored in a register 420. A routing table 422 is a look up table which is indexed by routing address values. The routing table 422 contains an entry, for every possible routing address value, which specifies the output links which could potentially be used for routing the packet that corresponds to the routing address.

Whenever an input link unit detects the receipt of a new packet at the output of its FIFO buffer, it sends a request signal on the link mask portion 232A of the router bus 232.

A routing request selector circuit 424 monitors bus 232A to see if any routing requests are being asserted. If one or more routing requests are asserted during any one routing engine cycle, the selector 424 selects one of the requests. The selected request is acknowledged by sending an ON signal on bus 232A to the selected link unit at an appropriate time. This acknowledgment signal instructs the signaled link unit that it has been selected to transmit its routing request over bus 230, and then the selected input link unit sends the packet destination address for its routing request to buffer 420 via bus 230.

The request selector circuit 424 is a cyclic priority encoder, which bases the priority for selecting among competing requests on the last link unit whose request was selected. This ensures that all requests are accepted within a short period of time and helps to prevent packet starvation.

Each routing table address includes an eleven-bit packet destination address received on line 230, and its associated four-bit input link number, which is provided by the request selector circuit 424. The routing table address is stored in a register 420 for use by a routing table 422. The routing table 422 is stored in a random access memory and the fifteen bit value in register 420 is used as the address for retrieving a value (called a routing mask) from the routing table 422. The selected routing mask output by the routing table 422 is latched in by the routing engine 430 at the beginning of the next routing engine cycle, as will be explained in more detail below.

Figure 14:
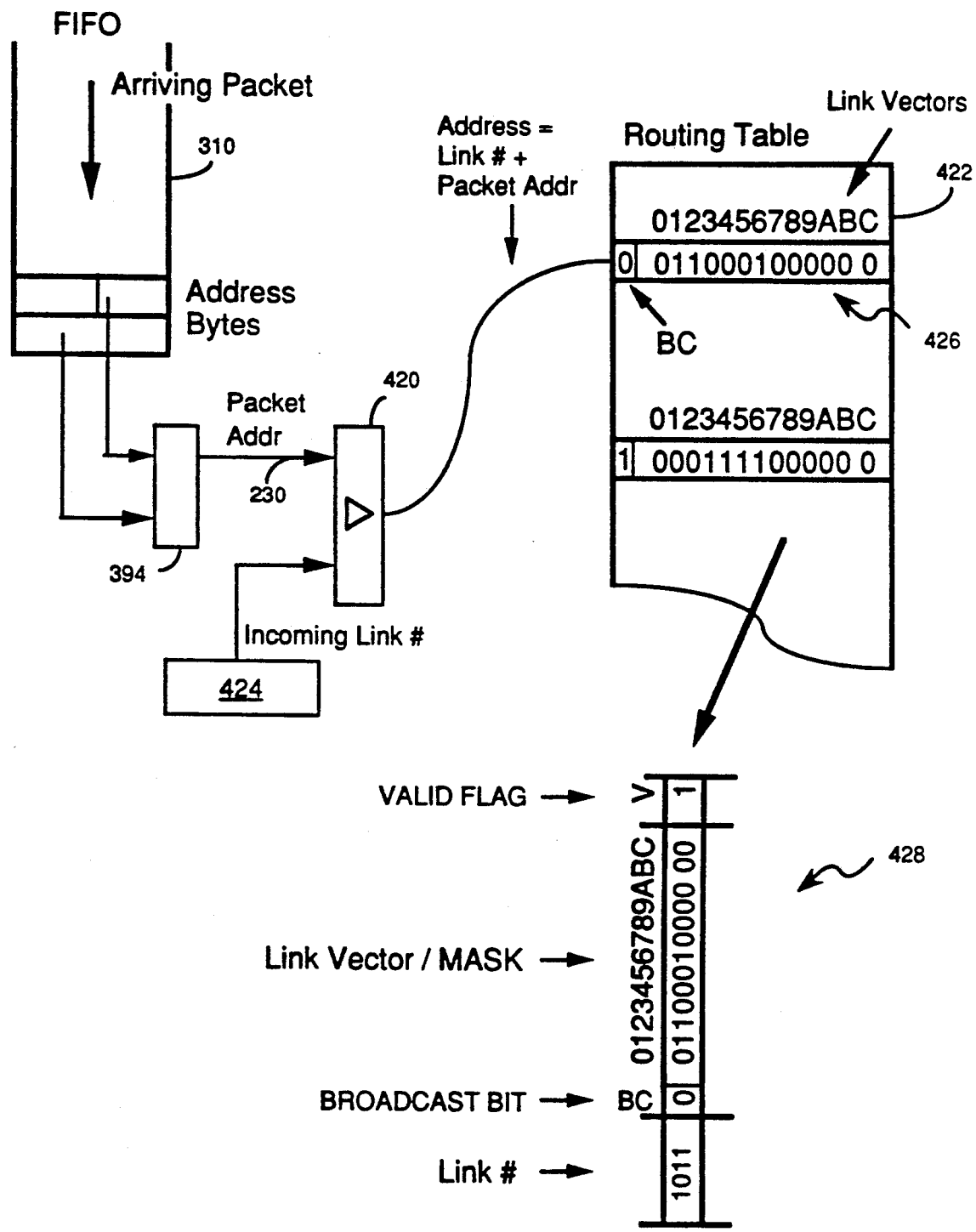
FIG. 14 schematically depicts the process of selecting a link vector from a routing table using the network address as part of the lookup address.

FIG. 14 shows how a packet address, sent on line 230, is derived from the first two data bytes of an arriving packet, and how that data is combined with the input link number generated by request selection circuit 424. See also FIG. 12. Note that in the preferred embodiment, the packet address is fifteen bits long. In future embodiments, the number of bits used for the packet address or the input link number may be increased.

Routing table 422 contains an entry 426 for every possible routing address. In other words, it has an entry for every possible combination of a 4-bit input link number with an 11-bit packet address. Since these two values occupy fifteen bits, the number of entries in the table 422 will be $2^{15}$, or 32,768. Each entry occupies two bytes of storage, and therefore the table 422 requires 65,536 bytes of storage. Typically, only a small number of the entries in the routing table will represent "legal" routing requests, and all the others will represent corrupted or otherwise illegal request values. The table entry for illegal requests is BC=1, with the remaining portion of the mask equal to all zeros. If a data packet generates an illegal routing request, the data packet is purged from the switch.

It may be noted that the reason that the routing table 42 is indexed by input link number and network address, rather than being indexed only by network address is as follows. If the network addresses in packets were never corrupted, the routing table could be indexed by network address. The entries in the routing table would still follow the up/down routing rule. This is possible because from any given position in the network there will always be at least one path to a specified network address which will not violate the up/down routing rule, assuming that the packet traveled on a legal route to its current position in the network. That legal path can be stored in switch routing tables that are indexed only by network address. However, if a network address in a packet were corrupted, and routing tables were not indexed by input link number, it would possible to have deadlock. This is because a packet could "take a wrong turn" after its destination network address was corrupted.

In a network with eighty network members there will be a total of only eighty-one or so legal packet addresses, including one address for each network member and one or more "broadcast" addresses for sending packets to all hosts on the network. Also, some combinations of input link numbers and packet addresses will be illegal because they correspond to routes which take packets away from their destination or create possible deadlocks. Therefore, in a eighty member network the routing table 422 for any particular switch would be likely contain between 320 and 750 legal entries.

Each entry in the routing table 422 contains a link vector, which is also called a routing mask. An example of a outing mask entry is:

| ADDRESS VALUE | ROUTING MASK |
|---|---|
| Input Link, Packet Address | BC 0123456789AB (Link #) |
| 0110 11001100110 | 0 001110000000 |

Each address in the routing table represents one of the possible routing request values that can be received from an input link, and is therefore represented here by the concatenation of an input link number and a packet address.

The routing mask in each routing table entry 426 contains thirteen mask bits, one for each of the output links of the switch including the SCP. Each mask bit which is ON (i.e., equal to "1") represents an output link which may be used to route the packet. The routing mask also contains a broadcast bit BC which indicates whether the packet address is a broadcast address or a normal address. An example of a routing mask 425 is shown in FIG. 14, which also shows a valid bit above the routing mask and a link number below it for reasons that are explained below.

If the broadcast bit BC is ON (i.e., equal to "1"), the packet is called a broadcast packet. Broadcast packets must be simultaneously forwarded to all of the output links specified by the routing mask.

If the broadcast bit is OFF (i.e., equal to "0"), the packet is called a non-broadcast packet. For a non-broadcast packet the routing mask has a mask bit equal to "1" for each output link which could be used to route the packet toward its destination (i.e., the packet may be routed on any single one of the output links specified by the routing mask). In many instances, several different alternate output links can be used to route a packet toward its destination, which is one of the advantages of mesh connected networks. The routing engine 430 selects just one of the output links specified by the routing mask for routing the packet.

The bit values in the routing mask of each routing table entry 426 are determined by the up/down routing rule, discussed above. In accordance with the up/down routing rule, the set of legal routes for a data packet depends on whether the last link used (i.e., the link used to get to the current switch) was an up link or a down link. If the previous switch transmitted the packet on a down link, only down links may be used by the next switch. However, if the previous switch used an up link, both up and down links may be legally used by the next switch. In addition, the set of usable links denoted in each routing mask only includes those links which will move the data packet closer to its destination.

FIG. 14 shows the format of a "routing request" 428 as it is read into the routing engine 430. The top bit, called the valid flag is set to "1" whenever a routing request is being loaded into the routing engine, and is reset to "0" when no new routing requests are being processed. The next fourteen bits are the link vector obtained from the selected entry of the routing table 422, as discussed above. The last four bits are the input link number for the packet being routed.

Routing engine 430 compares a link availability mask, which represents the currently available output links, with routing requests. More particularly, the purpose of the routine engine 430 is to match the output link needs of each new packet with the available output links of the switch. The routing selection value generated by the routing engine 430 is used by the crossbar 212 (shown, for example, in FIGS. 8 and 9) to set up its multiplexers and thereby connect a specified input link to one or more specified output links. The routine engine is the subject of a separate patent application, entitled ROUTING APPARATUS AND METHOD FOR HIGH-SPEED MESH CONNECTED LOCAL AREA NETWORK, Ser. No. 07/370,248, filed simultaneously herewith, previously incorporated by reference.

As described with respect to FIG. 12, each output link unit 326 transmits a "link available" signal which indicates whether that output link is available for routing, or is already either in use or blocked. Bus 232 carries the link available signal lines from all the output links. The routing engine 430 samples the link available signals on bus 232 at the beginning of each new routing engine cycle. The routing engine 430 then uses the available link mask for making routing selections.

When the routing engine 430 is able to match a routing request with one or more available links, it generates a routing selection value which it outputs on bus 232. The routing selection value consists of the four bit input link number, the broadcast bit and the valid bit from the satisfied routing request, and an output link mask which identifies the output link or links that are to be coupled to the input link. The input link number, the broadcast bit and the valid bit are transmitted on the portion of the router bus labelled 232B, and the output link mask is transmitted on the portion of the router bus labelled 232A. The route selection values transmitted on router bus 232 are used by the input and output link units 220 and 222, and crossbar 212 (shown in FIG. 9) to connect a specified input link to one or more specified output links.

The "valid" output bit is ON only in cycles during which the routing engine 430 outputs a new route selection. Thus the "valid" bit output by the routing engine 430 is OFF in cycles during which the routing engine 430 is unable to match any of the pending routing requests with the available output links.

Control circuit 435 generates clock signals for the routing engine 430 and request selection circuit 424. These clock signals also control the use of the packet address bus 230 and the router bus 232. That timing protocol will be described below with reference to FIG. 16.

The control logic 435 is also used by the SCP 216 to reload the routing table 428 during reconfiguration of the network, to keep track of the status of the router 218, and to load certain firmware in the routing engine 430 upon power up or resetting of the entire switch.

Routine Engine

Figure 15:
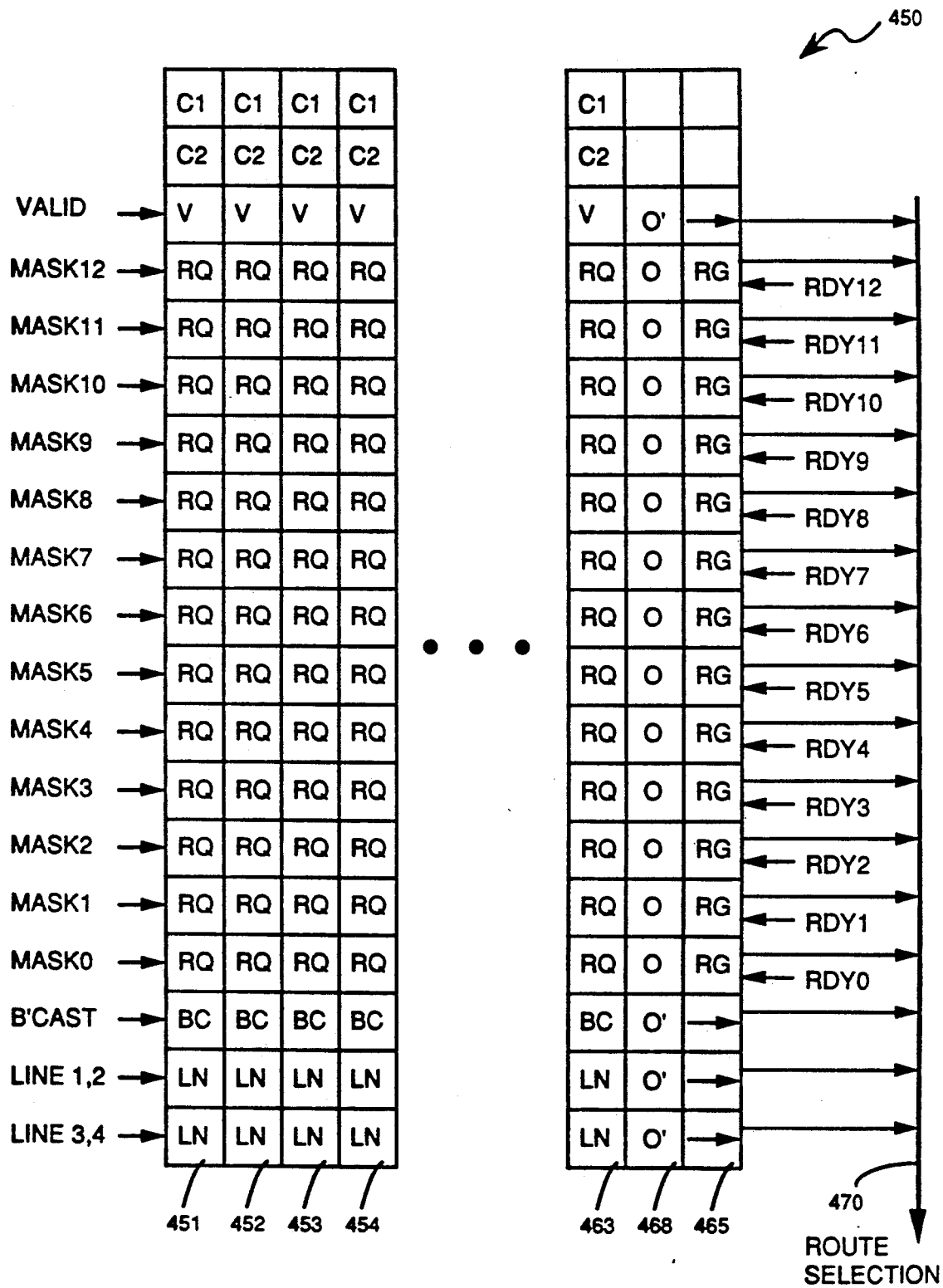
FIG. 15 is a block diagram of the route selection mechanism of the router in FIG. 13.

FIG. 15 shows a preferred embodiment of the routing engine 430. In this embodiment, the routing engine is formed from an array 450 of computational components, each of which is represented by a box in FIG. 15. The array shown represents a programmable gate array called the Xilinx 3090 array, made by Xilinx Corp. The Xilinx 3090 contains sixteen columns with twenty combinational logic blocks (CLBs) in each column. The CLBs can be electrically programmed to perform a variety of logic and storage functions. Each CLB contains two flip-flops and two function units. Each function unit is capable of calculating any boolean function of up to four input variables. The CLB produces two outputs, which can come directly from the function blocks or from the flip flops. There are also two tri-state drivers near each CLB. These drivers can be connected to horizontal metal traces that cross the chip, allowing the construction of buses. In addition to providing programmable logic, the Xilinx 3090 array provides programmable interconnections between neighboring CLBs, as well as a number of pad cells which provide an interface to circuits outside the array. Thus, the behavior and function of the array is determined by a pattern of control bits which is loaded into the array from an external source (e.g., the SCP in each switch). No customization is done as part of chip manufacturing.

The routing engine array 450 uses thirteen columns 451–463, each with nineteen logic blocks. Each of these columns 451–463 stores and processes a single routing request. In addition, on the right side of the array there is a column 465 of thirteen ready signal generators (RG) and a column 468 of thirteen output signal generators (O).

Routing requests are received on the left side of the array. The signal symbols shown of the left side of the array match the format of the routing request shown in FIG. 14.

An output link availability mask is received on the right side of the array 450. The output link availability mask is represented by signals RDY0 through RDY12, and is received from buffer 440 as shown in FIG. 13.

Outputs from the array 450, which are the routing selections made by the routing engine, emerge on bus 470 from the right side of the array. As described above with reference to FIG. 13, the routing selection contains nineteen bits: a valid bit, indicating a routing selection has been made, a thirteen bit output mask, and the broadcast bit and the four bit input link number from the routing request.

The thirteen columns 451–463 of the array act as a queue which implements the first come, first considered routing discipline of the router. The columns at the right side of the queue hold the oldest unsatisfied routing requests, while those on the left hold more recent requests.

The entire array works on a periodic clock cycle. The routing engine accepts one routing request per clock cycle and makes one attempt to make a routing selection during each clock cycle.

Figure 16:
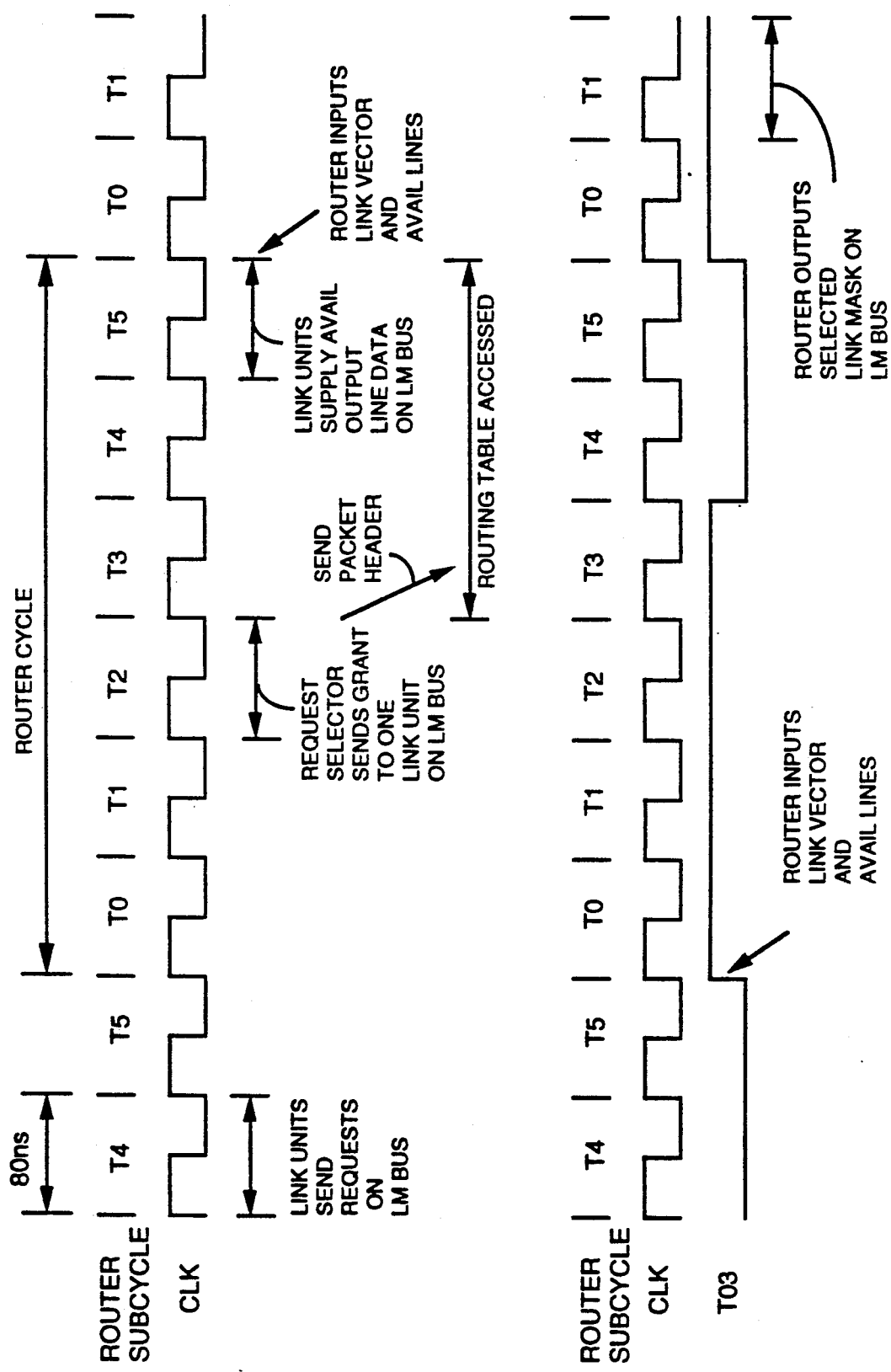
FIG. 16 is a timing diagram for the router of FIG. 13.

Referring to FIG. 16, each router clock cycle has six phases labelled T0 through T5. Each phase lasts 80 nanoseconds, for a total router clock cycle of 480 nanoseconds. The router clock cycle has two major subphases represented by clock signal T03. During the first subphase T03=1 and during the second subphase T03=0.

As will now be described, it takes three router cycles to send a routing request to the router 218, to process the request, and then to send a routing selection to the link units and crossbar.

Routing requests are sent to the router 218 as follows. During T4, each input link unit which has a routing request that needs to be sent to the router asserts a ON signal on its corresponding line of router bus 232. The routing selection circuit 424 monitors the router bus 232 during T4 to see if any routing requests are being asserted. If only one request is asserted, it is acknowledged. If more than one routing request is asserted during any one clock cycle, the routing selection circuit 424 selects just one of the requests, as was described above.

The selected request is acknowledged by sending an ON signal on bus 232 to the selected link unit during T3 of the next router cycle. This acknowledgment signal instructs the signaled link unit that it has been selected to transmit its routing request over bus 230. During clock phases T3 through T5 the selected input link unit sends the packet address for its routing request to the routing table 422 via buffer 420. During phases T3 through T5 the routing table 422 is accessed and the link vector corresponding to the routing request is ready at its output by the end of T5.

During phase T5 all the output link units assert their availability flag values on the router bus 232 so that these signals will be ready for the routing engine at the beginning of the next router cycle.

At the beginning of T0, the routing engine 430 latches in the link availability flags from router bus 232 and the current routing request, if any. The current routing request comprises the link vector output by the routing table 422, and the link number and valid bit output by the request selection circuit 424.

During the rest of the router cycle, T0 through T5, the routing engine 430 compares the latched in link availability data with all the unsatisfied routing requests stored in the data columns of the routing engine 430. The result of that comparison is latched in the output column 468 of the routing engine at the end of T5. However, the routing selection generated by the routing engine is not asserted on the router bus 232 until T1 of the following router cycle. During T1 through T5 of this router cycle, if the Valid bit of the routing selection is ON, the link units and crossbar process the routing selection output so as to couple the specified input link unit with the specified output link unit(s). The link units also prepare to begin transmitting the data in the specified input link unit's FIFO 310.

During T3 of this router cycles the crossbar circuit 212, which remembers the input link number asserted by the routing engine and the specified output link(s), asserts an output link number on the link index portion of the router bus for setting up the flow control multiplexer corresponding to the specified input link number. If the broadcast bit in the routing selection is ON, however, the output link number asserted during T3 is set to a predefined number (e.g., 15 or F).

In summary, each portion of the router 218 performs a distinct task during each six part router cycle. In addition, the router bus 232 is time multiplexed for sending routing requests to the routing request selector 424 and for sending routing selections to the link units.

Used in a three stage pipeline with six 80 ns clock cycles per stage, the router 218 can route slightly more than two million packets per second, and adds a latency of about 1.44 microseconds per switch in the path of each packet. The three stages of the router pipeline are (1) input link selection and routing table lookup to generate a routing request mask, (2) the routing engine cycle, and (3) transmission of routing selections to the crossbar 212 and the link units.

The following is a more detailed description of the operation of the routing engine during each phase of the router cycle. At the beginning of each router cycle, at the beginning of T0, a routing request and the available output link mask are read in. The routing request is latched into the leftmost column of the array 451, and the link availability mask (RDY0 to RDY12) is latched into the ready signal column 465. In addition, each unsatisfied routing request which is already stored in the array is shifted one column to the right in the array if there is at least one column to its right in the array which is not occupied by an unsatisfied request.

During the first subphase of the router cycle several sets of signals propagate across the array. First, the link availability mask propagates across the array from right to left. The circuitry in each of the request handling columns 451–463 compares the routing request stored in that column with the link availability mask. In those columns which store non-broadcast requests (with BC=0) a MATCH signal is generated if at least one enabled MASK bit matches an enabled RDY bit.

In those columns which store broadcast requests (with BC=1), a MATCH signal is generated only if all of the enabled MASK bits match the corresponding RDY bits (i.e., only if all output links needed by the request are available).

Columns which store broadcast requests (with BC=1) also block the propagation of those RDY signals which match the MASK bits of the broadcast request. In effect, broadcast requests "reserve" the available output links needed by that request. If this were not done, the routing of a broadcast packet could be permanently stymied by subsequent requests which match and use individual ones of the output links needed by the broadcast packet.

The MATCH signals are propagated upwards through those columns where a match is found. Thus the MATCH signals are the second set of signals which propagate during the first phase of the clock cycle.

It is quite possible for two or more columns to generate MATCH signals. In order to give the oldest unsatisfied requests first consideration it is necessary to select the rightmost column in which a match was found. To do this a signal called ANSWERED propagates through the C1 cells at the top of the array from the right side of the array to the left. The ANSWERED signal has a value of "0" until it encounters a valid column (i.e., VALID="1") with an enabled MATCH signal, at which point ANSWERED is set equal to "1".

The ANSWERED signal is the third type of signal which propagates during the first subphase of the router cycle.

At the end of the T3, an output enable signal ND_ENABLE is generated for the rightmost column with an enabled MATCH signal that receives an ANSWERED signal of "0" from its right-hand neighbor. Of course, during many clock cycles none of the columns will match the available link mask, and no output enable signal will be generated. For the moment, consider the case in which an output enable signal is generated for one selected column.

Only one column, at most, will have an enabled ND_ENABLE signal during any one clock cycle. If none of the columns have an enabled ND_ENABLE signal, that means that the routing engine failed to find any routing requests which matched the available output links.

During the second subphase of the router cycle, the following data values from the column with the enabled ND_ENABLE signal are propagated to the output column 468 of the array: all the matched routing mask bits (i.e., enabled mask bits for which there is an available output link), the broadcast bit, link number bits and the valid bit.

The circuitry in the output column 468 works as follows. For non-broadcast requests (BC=0), only the lowest of the enabled mask bits is output, and all the other mask bits are disabled. For broadcast requests (BC=1), all the enabled mask bits are output. For both types of request, the broadcast bit, link number bits and valid bit are also output by the output column 468.

The resulting routing selection value will have an enabled valid bit, one enabled mask bit (unless it is a broadcast packet), and the broadcast bit and input link number of the routing request.

It will be clear to those who consider the matter that some packets cannot be routed immediately because sometimes the output link or links that a packet needs will be busy. Therefore columns 451–463 of the routing engine array 450 act as a queue in which unsatisfied routing requests are stored and periodically compared with the available output links.

When the routing engine fails to match the available output links with any pending routing requests, the data output by the array has a disabled VALID bit. The link units and crossbar circuit in the switch ignore outputs of the routing engine during cycles in which the VALID bit is disabled.

As new requests are entered into the array 450, request handling columns containing unsatisfied or invalid requests must shift to the right to make room for the new routing requests. The data values stored in all the request handling columns 451-463 in the array will be shifted to the right during each cycle, except for columns at the right side of the array which hold unsatisfied requests.

More specifically, each column 451-463 loads in the data from the column to its left (and the leftmost column loads from the routing request buffer 428) if certain conditions are met:

(1) if the column contains an invalid request, the column will be overwritten with the data from the column to the left, or
(2) at least one column to the right will load data from the column to its left, or
(3) the routing request in the column has been satisfied and selected for output.

If a column supplies the result and no column to its right shifts, the request will be overwritten by the contents of the column to its left. If, on the other hand, the array contains an invalid request to the right of a column that supplies a result, then the already-satisfied request will shift right by one column and will remain in the array.

To ensure that such a request does not supply a result in a subsequent cycle, the inputs of the registers which store the BC and VALID values in each column are ANDed with the ND_ENABLE signal from the column to the left. This means that if a column supplies a result and shifts in the same cycle, the request will be invalidated and its BC bit cleared when it shifts into the next column to the right.

The final outputs generated by the output column 468 are stored in latches (not shown) in the output column 468 at the end of each cycle. The output signals stored in the output column are transmitted on the router bus 232 during the T1 subcycle of the next routing engine cycle.

The RDY signals supplied by the output link monitoring subsystem (i.e., via latching buffer 440 in FIG. 13) cannot be used directly by the routing engine. This is because the router 218 is part of a pipelined circuit. If the routing engine 430 supplies an output that uses a particular output link, then that output link must be made to appear not ready (i.e., not available) for use during the following clock cycle of the router. This is accomplished by ANDing the incoming RDY mask with the complement of the output mask before delivering it to the queue of routing requests in columns 451-463 of the routing engine.

Broadcast Packet Handling

Broadcast packets are generally messages sent by one host computer to all the other hosts in the network. While other types of broadcast packets are possible, including broadcast packets initiated by a switch and limited distribution broadcasts, the same routing and starvation prevention considerations apply to all types of broadcast packets.

Broadcast packets are typically the most difficult type of packets to handle in mesh connected networks because of the need to simultaneously transmit broadcast messages over many network links. It is also necessary to ensure that broadcast packets proceed quickly to all destinations because of the important functions served by broadcast packets.

A typical use of a broadcast packet is as follows. Host A wants to send a message to Host B. However, Host A does not know Host B's network address—i.e., the eleven-bit address that is stored in the first two bytes of every packet. Therefore Host A needs a mechanism for obtaining the network address of Host B. This is a well known problem in local area networks with a well known solution. The solution is to send a "broadcast message" or packet to all the hosts in the system. The content of the broadcast message is: "Host B, please send a message containing your network address to Host A at network address X". The broadcast message is sent to every host computer in the network, but only Host B (if there is one) will respond by sending the requested information to Host A. Then Host A can send its message to Host B. In a well designed local area network, this entire transaction will typically take a very small fraction of a second.

Another time that broadcast messages are used is when Host A tries to send a packet to Host B, but Host B does not acknowledge receipt of the packet. A typical protocol for this situation is for Host A to resend the packet. Then if no acknowledgment is received, Host A concludes that it does not have the correct address for Host B (e.g., because the address has become corrupted, or because, unbeknownst to Host A, the address of Host B has been changed). Then Host A uses the broadcast packet protocol just described to find out Host B's current network address.

While many of the situations in which broadcast packets are useful are well known, it is not well known how to route a broadcast packet in a mesh connected network. The following is how it is done in the present invention.

Figure 17:
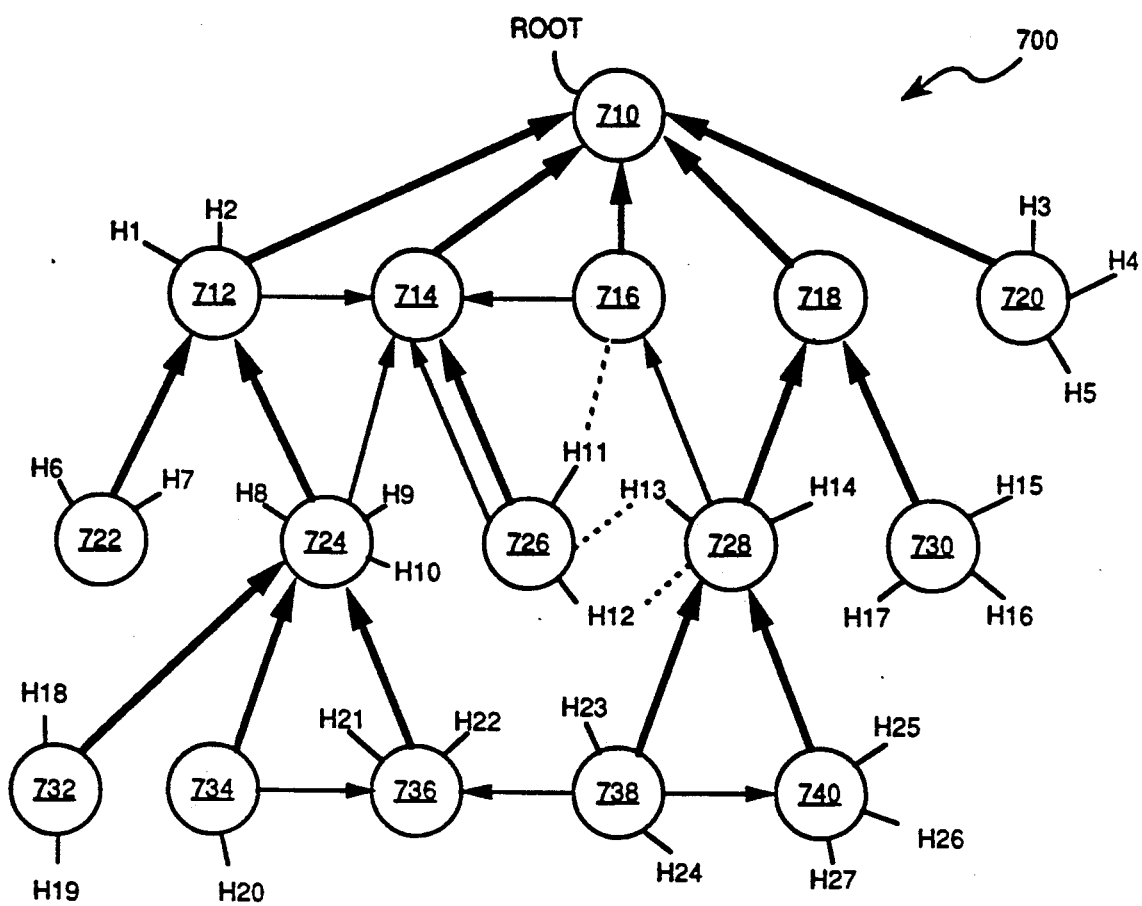
FIG. 17 depicts a mesh network as a spanning tree.

Referring to FIG. 17, there is shown a schematic representation of a mesh connected network 700. The network has sixteen switches 710-740, and twenty-seven hosts H1-H27. Switch 710 is called the root node of the network, for reasons that will be explained below. This Figure is different from FIG. 2 primarily in that the links between switches have two characteristics assigned to them: (1) a primary direction known as "up", and (2) so-called "spanning tree" links are shown with darker lines than "additional" links. The switches 710-740 and the spanning tree links collectively form a "spanning tree".

Consider the path followed by a broadcast packet initiated by host H19. The packet is given a unique eleven-bit "broadcast packet address", such as "8FF". First the packet travels up the network tree to the root, through switches 732, 724, 712 and then 710. To do this, the routing table in each of these switches will have a link vector entry corresponding to the input link used and the broadcast packet address. The link vector in each of the switches 732, 724 and 712 will indicate that the only route available to the packet is along links which move the packet up toward the root of the tree 710.

When the packet reaches the root switch 710, the broadcast packet will be rerouted down all the spanning tree links (shown in FIG. 17 with bolder lines than the additional links) to all the hosts in the network. The routing table in the root has the same broadcast link vector value for the broadcast packet, regardless of the input link on which it arrives. In particular, the broadcast link vector specifies that received broadcast packets are simultaneously transmitted over all the spanning tree links coupled to the switch. Note that this is the only case in which a received data packet may be retransmitted over the same link as it was received on.

In the network 700 shown in FIG. 17, the broadcast packet will be simultaneously transmitted from the root switch 710 to switches 712, 714, 716, 718 and 720. Also at the same time, the broadcast packet will be sent to any hosts coupled to the root switch (although none are shown in FIG. 17). This transmission will occur when all of the required links become available.

At each of the receiving switches, the broadcast packet will be retransmitted to (1) all hosts coupled the switch, and (2) to all neighboring switches which are coupled to the transmitting switch by a down spanning tree link. In other words, the broadcast packet is sent down the spanning tree until every host in the network has received the broadcast packet.

In summary, broadcast packets are first routed up the network's spanning tree to the root, and then are transmitted down the tree to all the hosts in the network.

The process for determining which links are "spanning tree" links, identifying the root node of the network, and generating the routing tables for the switches is described below.

RECONFIGURATION PROCESS

The reconfiguration process of the present invention comprises a distributed process that has three phases. The first phase of the process determines when a network reconfiguration is needed. The second phase identifies the current topology of the network, i.e., it identifies all the functional switches, links and hosts in a network. In phase three, the switches in the network create routing tables which define all the legal routes for data packets in the network.

Failed Network Component Handling

A potential problem with mesh connected networks is the potential for a failed switch or link to isolate one or more hosts from the network. The present invention provides two mechanisms for preventing a host from being isolated from the network. First, as shown in FIG. 3, every host is connected to two switches by distinct links. If one of the links or the switch coupled to one of the links fails, the other link can be activated. Similarly, every switch is preferably connected to the rest of the network by at least two links so that the failure of one link will not cause a whole branch of the network to become isolated from the rest of the network.

The second failure handling mechanism is a reconfiguration program that resides in the SCP 216 of every switch. The reconfiguration program continually monitors the link units in the switch and automatically detects the failure of any part of the network. Once a failure is detected (or a new network component is detected), the reconfiguration programs in all the switches automatically reconfigure the network—which means that all the legal paths between hosts on the network are recomputed and then stored in the routers in the switches. As a result, no host can be isolated from the network by a single hardware failure.

Reconfiguration Phase One

Initiating Reconfiguration

Referring to FIG. 17, whenever a switch or link is added to or removed from the network 700, the routing tables in the network's switches no longer accurately reflect the topology of the network. For instance, if switch 726 fails or is removed from the network, the routing table entries in all the switches in the network will contain incorrect values that no long accurately reflect the configuration of the network. To reestablish proper routing through the network it is necessary to "reconfigure" the network—i.e., to recompute the set of legal paths for packets transmitted through the network.

As shown in FIG. 17, host H11 has a second link to switch 716 and host H12 has a second link to switch 728. If switch 726 fails or is removed, the hosts H11 and H12 will activate their secondary links. As a result, after the network is reconfigured, these hosts will have new network addresses.

Similarly, if a new switch or link is added to the network, the routing tables for all the switches must be recomputed so as to include the new network members and the new legal paths in the network.

Figure 18:
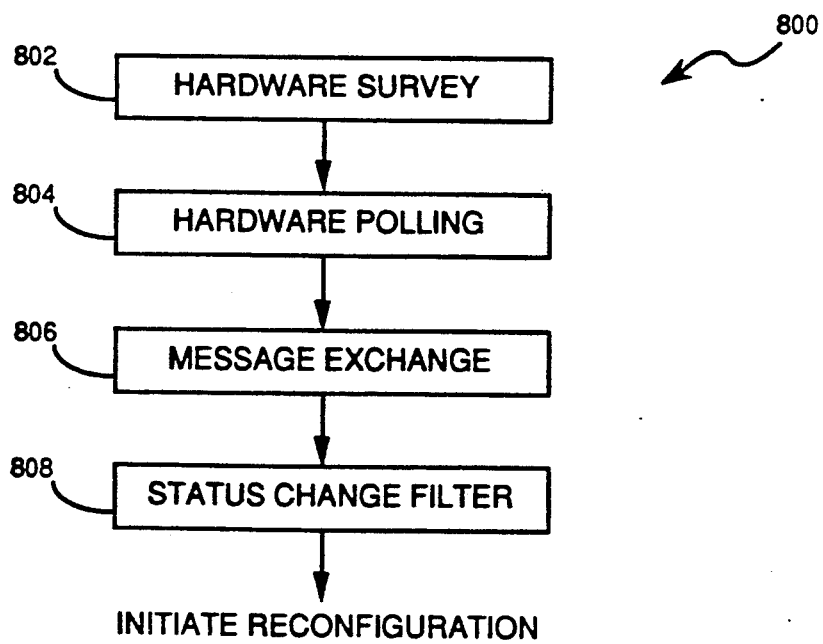
FIG. 18 is a flow chart of the first phase of the network reconfiguration process.

Referring to FIG. 18, the process for detecting changes in the network's configuration works as follows. The same process is run in every switch in the network, and for every link unit in each switch. The reason for this is that any change in the network's topology will be reflected by a change in the status of a link unit: an addition to the network is detected as a new connection to a link unit, and the removal of a network member is detected as the loss of a connection to a link unit. The flow chart shown in FIG. 18 represents the process for determining a change in status for a single link unit of a single switch.

It should be noted that the process for detecting changes (which is phase one of the reconfiguration process) continues at all times, even during phases two and three of the reconfiguration process.

The link status checking process is a multilevel process, in which each level passes its results to the next level up the hierarchy. The levels of the status checking process 800 are as follows. The Hardware Survey level 802 is an error checking process run by the hardware in each link unit. The Hardware Polling Level 804 is a routine in each switch which periodically reads the outputs of the Hardware Survey Level 802, and makes a determination whether data and flow control signals are being successfully sent both directions over a particular link.

The Message Exchange Level 806 is a software routine which reacts to changes in the status of a link, as determined by the Hardware Polling level 804. When a link is reported by Hardware Polling to be ALIVE (i.e., there is another network member at the other end of the link which is successfully receiving and sending signals over the link), the Message Exchange Level 806 periodically sends a short message over the link to confirm that the link is in sufficiently good working order to send and receive messages.

The Status Change Filter 808 prevents the status of a link unit from changing from DEAD to ALIVE too frequently.

Hardware Survey Level. Besides detecting new network connections and the removal of network components, the first phase of the reconfiguration process deals with the problems of intermittent errors and random noise. For instance, a loose link connection or an improperly operating component in a switch or host controller may vacillate between proper and improper operation. In addition, noise may occasionally corrupt the data being transmitted on an otherwise properly working link.

The second and third phases of the reconfiguration process are relatively expensive, because they shut down the entire network for a short period of time. It is the role of the first phase of the reconfiguration process to make sure that the full reconfiguration process is run only when necessary.

Referring to FIG. 12, the status registers 382 for each link unit and the corresponding control logic 384 play an important role in determining when the network's configuration has changed. There are three types of status checks performed by the hardware in each link unit: code violation checks, flow control checks, and round trip flow control checks. The results of these three hardware status checks are stored in the status registers 382.

The TAXI Rx 350 and TAXI Tx 370 chips actually transmit 10 bits for every byte of data and every flow control command, even though data bytes and commands are represented by nine bits inside the switches. The reason for this is that it would be unacceptable to have a long string of "zero" bits with no up/down transitions on the link, because that would allow the TAXI circuits to become unsynchronized with the flow of data over the link. By using ten bits, it can be assured that there will be at least one up/down (or 0/1) transition during every ten-bit byte.

Even though ten bits are used to represent each data byte and flow control command, there are only two-hundred fifty-six valid data values, and only sixteen valid flow control commands. As a result, there are two-hundred seventy-two valid ten-bit transmission codes and seven-hundred fifty-two invalid transmission codes. Whenever an invalid transmission code is received by an input link unit, it sets a bit in the status registers 382 which denotes the receipt of a coding violation.

Clearly the receipt of a single code violation does not necessarily mean that a link has failed, and conversely the receipt of a single valid code does not necessarily mean that a link is working. The use of the denoted coding violation is discussed below.

As explained above in the section entitled Flow Control, a flow control command is transmitted by each output link unit once every 256 byte cycles. This happens even if there isn't a network component coupled to the link for that link unit. As a result, each input link unit's hardware expects to receive a valid flow control command once every 256 byte cycles. The set of valid flow commands includes: start and stop flow commands from a switch, and start and stop flow commands from a host. Note that the start flow commands for hosts are distinct from those received from a switch. Another flow command is called IDHY ("I don't hear you"). These commands and their uses by the Hardware Survey Level are discussed next.

Failure to receive a valid flow command during any 256 byte cycle is denoted in the status registers 382.

Round trip flow control checking works as follows. If a link unit consistently detects code violations in the data being received, or fails to receive flow control commands, the link unit transmits a special flow command herein called the IDHY ("I Don't Hear Your") command. This can be considered to be a special version of the standard "start flow" command.

Consider the situation in which a link unit is receiving valid codes and flow control signals, but for some reason is sending out corrupted signals. For instance, its TAXI Tx circuit may not be working properly. The "remote" link unit which receives the corrupted signals will start transmitting IDHY flow control signals, which informs the link unit that signals are not being successfully sent on a "round trip" over the link. Thus the IDHY flow commands allow a link unit to find out that it is not working properly.

Whenever an IDHY flow command is received, that fact is denoted in the Status Registers 382 for the link unit.

In summary, the Hardware Survey Level comprises hardware in each link unit which can set three error flags. A code violation flag is set if any invalid codes are received, a flow control error flag is set if flow control commands are not received once every 256 bytes, and a round trip error flag is set if any IDHY flow commands are received.

Hardware Polling Level. Approximately once every millisecond, the SCP 216 in each switch polls and resets the three error flags in the status registers 382 for each of its link units. The time between polls should preferably be between ten and twenty five times as long as the intervals between flow control commands during normal operation. A single "error" of each type is sufficient to set the corresponding error flag. The polling process for one link unit is as follows.

Appendix 1 contains a pseudocode representation of a Hardware Polling Routine which is executed by the SCP for each of the link units in the switch. The pseudocode programs in Appendices 1 through 9 at the end of this specification are written using universal computer programming conventions and are designed to be understandable to any computer programmer skilled in the art. Comments and unexecutable statements begin with a double asterisk "**". These pseudocode programs in the Appendices provide details of the reconfiguration program and the interactions between its pieces than the Figures.

The three error flags for the link unit are read and reset. As a result, the link unit hardware begins it search for errors anew once each polling period. In addition, the values of the flags are integrated for five polling periods before any action is taken by the Hardware Polling Level 804. If there is a code violation in three out of five polling periods, or there is a flow control error in three out of five polling periods, the polling routine designates the link as DEAD. It also sets a flag in the link's status registers which causes the link unit to transmit IDHY commands in the place of the normal flow control commands so as to inform the network member at the other side of the link that it is not receiving valid signals.

If IDHY commands have been received in three out of five polling periods, the link is designated as DEAD by the Hardware Polling Routine, regardless of the status of the other error flags. Thus any problem which consistently prevents the successful round trip transmission of signals over a link causes the Hardware Polling Routine to designate the link as being DEAD.

Message Exchange Level. Even if valid codes and flow control commands are being received, it is possible that the switch on the other side of a link is incapable of receiving and responding to messages. If so, the link is considered dead. Note that Message Exchange level 806 only tests links to switches. Distinct start flow commands are used by hosts and switches, and the type of network member coupled to each link port is determined by the type of start flow commands received on that port.

Appendix 2 contains a pseudocode representation of the Message Exchange routine.

For links to other switches that are denoted as being ALIVE, a "keep alive message" is used to verify the proper operation of the link. About every five seconds, a "keep alive message" is sent to the remote network member on the other side of the link. Referring to FIG. 9, the "keep alive message" 850 is a data packet which denotes the transmitting switch's UID (i.e., unique 48-bit identifier) 851, the port number for the link 852, and a reply flag 859 which indicates that the receiver respond by identifying itself. The keep alive message also includes the UID (R_UID 856) last reported by the switch on the other side of the link network and the port number (R_PORT 858) last reported by that switch.

If the remote network member is truly alive, it will respond with an acknowledgement message that uses the same format as the keep alive message 850. Thus the acknowledgement message denotes not only its UID, and port number, but also it will echo the UID and port number received in the keep alive message.

Finally, if an acknowledgement message is received, the switch sends out an acknowledgement message to the remote network member so that both switches will have had their messages acknowledged. Thus the message exchange for confirming the status of ALIVE links uses a sequence of three messages. Note that these messages are created and processed by the SCP in each switch.

If an acknowledgement record is not received in a reasonable period of time, the original keep alive message is resent to the remote network member several times. If acknowledgment is still not received, this means that there either is no remote network member or that it is not working properly. Therefore the link is declared to be DEAD.

It should be noted that if the acknowledgment message received indicates that the link is coupled to two link ports on the same switch, both of these link ports are denoted as DEAD, because such links are not useful.

If the Hardware Polling Level 804 reported the link to be DEAD, that status is passed on to the Status Change Filter Level 808. A keep alive message is not sent over links that are DEAD. Also, if Hardware Polling level 804 previously reported the link to be ALIVE and then reports it to be DEAD, the Status Change Filter Level will immediately initiate the second phase of the Reconfiguration Routine. Thus, newly detected dead links cause an immediate reconfiguration of the network.

However, if the Hardware Polling Level 804 previously reported a link to be DEAD and then reports it to be ALIVE, certain precautions are taken. In particular, the Message Exchange Level 806 will accept a change in status from DEAD to ALIVE from the Hardware Polling Level 804 only once every fifteen seconds. Therefore if a link goes from DEAD to ALIVE, back to DEAD and then ALIVE again, the last transition to ALIVE is ignored until at least fifteen seconds have passed from the last time that a DEAD to ALIVE transition took place. This filtering helps to prevent frequent reconfigurations that could be caused by an intermittently working network component, and tends to declare such improperly working components to be DEAD.

Status Change Filter Level. This level 808 calls the Reconfiguration routine immediately if the Message Exchange Level 806 reports that a link has made a transition from ALIVE to DEAD.

However, transitions from DEAD to ALIVE are filtered. In particular, the Status Change Filter Level 808 will accept a change in status from DEAD to ALIVE from the Message Exchange Level 806 only once every thirty seconds. This filtering helps to prevent frequent reconfigurations caused by intermittently working network components.

Appendix 3 contains a pseudocode representation of the Status Change Filer routine.

Reconfiguration Phase Two

Generating a Spanning Tree

In the context of the present invention, a spanning tree is a tree of nodes (i.e., switches) which encompasses the entire local area network. The spanning tree only includes those links which are needed to link each parent node to its children. The links in the spanning tree are herein called spanning tree links, and all other links are called additional links.

Spanning tree links have two special roles in the present invention. First, broadcast messages are transmitted on spanning tree links so as to ensure that these messages are transmitted in a predictable and efficient fashion. Second, spanning tree links are used during reconfiguration for transmitting information about the topology of the network up to the root of the network, and then back down to all the switches below the root. Other than these two special functions, all links in the network perform the same functions. Parallel links between switches at different depth levels, and additional links between switches at the same depth enhance the operation of the network and expand the network's ability to simultaneously transmit numerous data packets.

Overview of Phase Two

Figure 19:
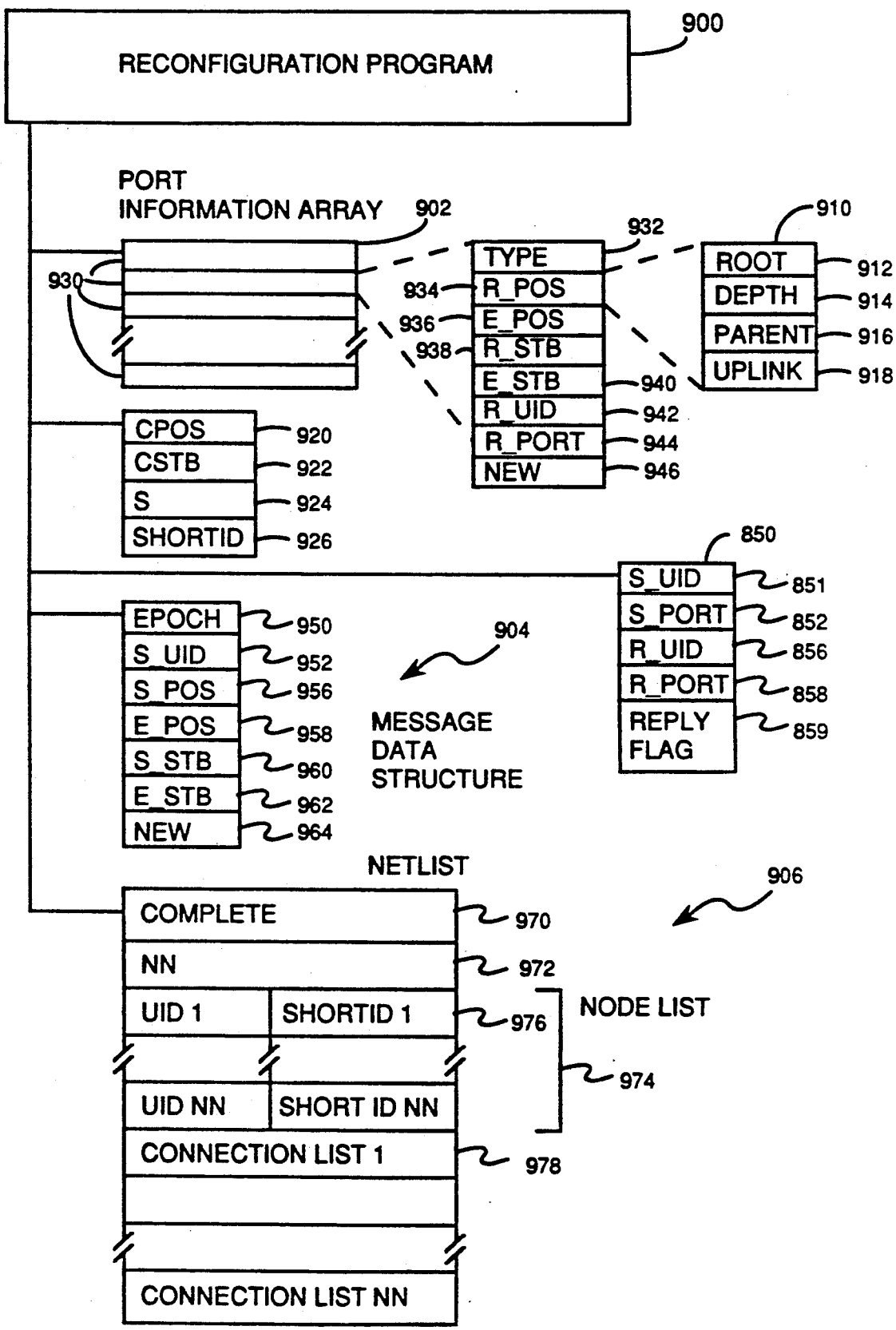
FIG. 19 depicts the primary data structures used during the second and third phases of the network reconfiguration process.
Figure 20:
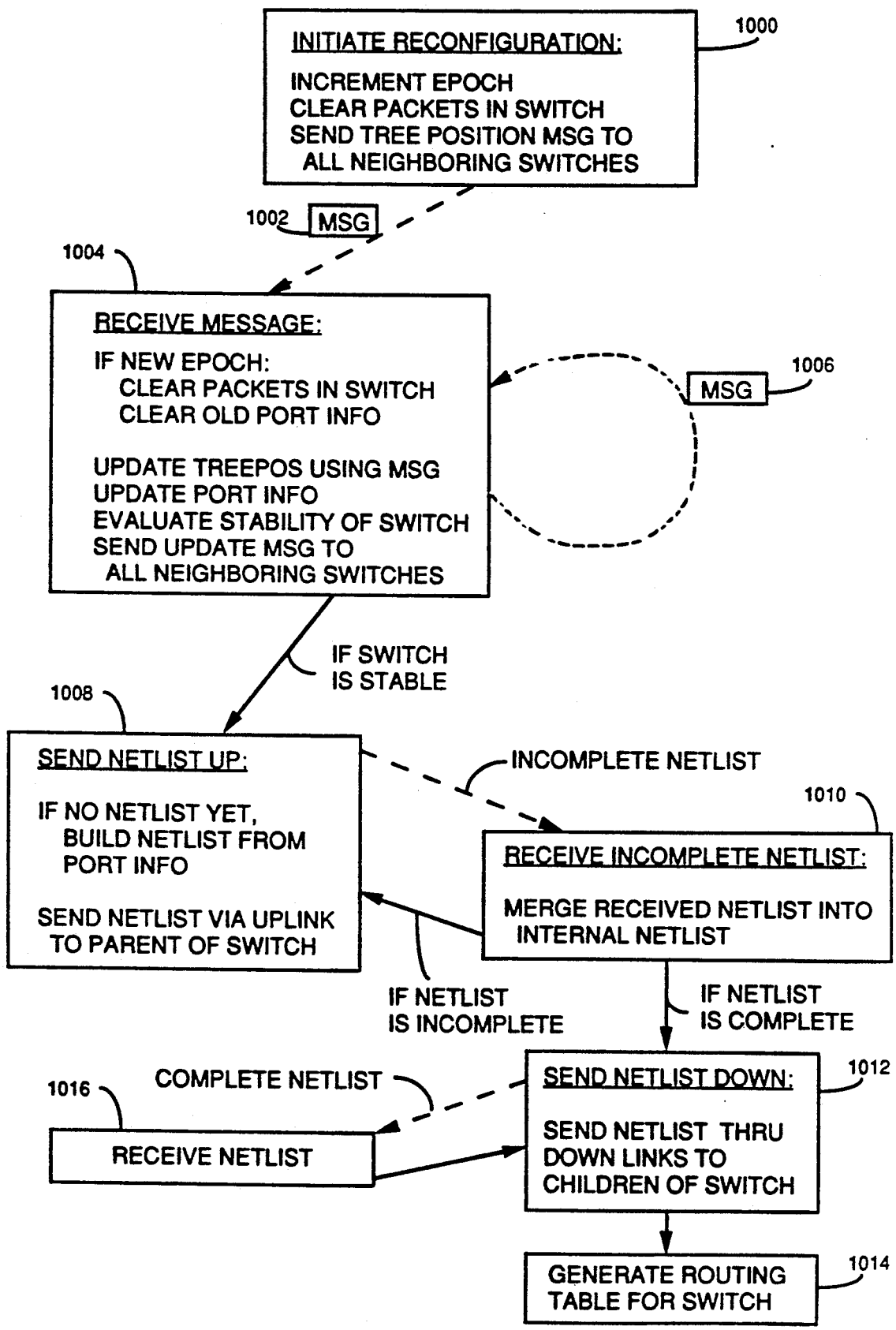
FIG. 20 is a flow chart of the second and third phases of the network reconfiguration process.

Referring to FIGS. 19 and 20, the following is a brief overview of how the second phase of the reconfiguration process works. The reconfiguration process 900 uses three important data structures 902-906 during phases two and three. A port information array 902 stores information regarding each of the switch's immediate neighbors, such as the UID of the neighbor and the position in the network reported by each neighbor.

A message data structure 904 is used to store the information which is sent to neighboring switches during phase two of the reconfiguration process.

The netlist 906 is used to build up a complete description of the topology of the network, and is used in both phase two and phase tree of the reconfiguration process.

During normal operation of the network, all the switches store the same "configuration version number" which is called the Epoch. For instance, the switches may all store an Epoch value of 1225. If one switch or link is added to the network, the Epoch value after reconfiguration will be at least 1226.

When a switch detects a change in the network's makeup it declares a new epoch by increasing its Epoch number, and stopping the flow of all data packets. It deletes all stored information about the configuration of the network, and then sends a message to all immediately neighboring switches that there is a new Epoch and that it thinks that it is the root of the network.

The switches which receive this message compare the received Epoch number with their stored Epoch number. If the received Epoch number is higher, they delete all stored information about the configuration of the network and adopt the new Epoch number. They also use the information in the received message to start building a new set of information about the network. Using a set of predefined criteria, described below, each switch develops a "tree position" by determining its position in the "spanning tree" relative to its known neighbors. Then it sends a message to all its neighbors reporting on the new Epoch and its tree position. Every time that a switch receives a reconfiguration message it updates its information about the topology of the network, updates its tree position based on what it knows so far about the network. If there was any new information in the message, the switch then sends a new message to its own to all its neighbors to inform them of its new tree position.

In this way, messages about the new epoch quickly spread through the entire network. Also, messages continue to be exchanged between neighbors until all the switches agree on the identity of the root node, and on a set of spanning tree links which defines all the switches' positions in the network. This will be described in detail below.

The reconfiguration process is called a "distributed process" because all of the switches in the network simultaneously perform calculations which eventually lead to the generation of a common result—the spanning tree.

The reconfiguration process is also called a "competitive process" because every switch in the network initially attempts to designate itself as the root node of the network, and only alters its tree position when it obtains information to the contrary from its neighbors. Each switch sends messages to its neighbors specifying that switch's asserted tree position, and each receiving switch then compares that information with its own information and determines which set of information better meets the criteria for a proper spanning tree.

An important aspect of the present invention is the ability of the reconfiguration process to determine when it is complete. In other words, the reconfiguration process within each switch knows when to stop sending reconfiguration messages to its neighbors and the root node knows when the second phase of the process is complete. This is believed to be unique to the present invention.

Data Structures

Referring to FIG. 19, the "tree position" of a switch in the network is represented by a tree position array 910. The elements of the array 910 are the UID 912 of the root of the tree, the depth 914 of the switch in the spanning tree (i.e., the number of links between the switch and the root node), the parent 916 of the switch, and the link number of the switch's up link 918 to the parent switch.

It is important to note that during reconfiguration the switches do not yet know their true position in the spanning tree, and that the tree position array 910 is used to represent the switch's current belief as to its position in the spanning tree. It should also be noted that the root node in the network does not have a parent 916 nor an up link to the parent 918. For the root node, these elements of the tree position are given special "place holder" values.

The "current" tree position of a switch is stored in a tree position array called CPOS 920.

A switch is considered to be "stable" when the switch knows the identities and positions of all neighboring switches, all neighboring switches have been informed of the switch's tree position, and (1) there are no neighboring switches below this switch in the spanning tree, or (2) all neighboring switches below this switch in the spanning tree are stable. The current stability value of a switch is called CSTB 922, and is equal to either .FALSE. or .TRUE.

"S" 924 is the UID of the switch, and SHORTID 926 is the 7-bit SHORT ID that was previously assigned to the switch. Note that if the switch S was just added to the network and turned on, then no SHORT ID has been previously assigned to the switch.

The Port Information Array 902 contains a set of port information records 930. Each port information record 930, stores information regarding the network member coupled to each of the switch's ports. Each of the records are identified by the term

INFO[P]

where "INFO" is the identifier of the port information array 902, and "[P]" identifies which one of the records 930 according to the value assigned to P. The elements of each port information record 930 are as follows.

INFO[P].TYPE 932 identifies whether the neighbor is a switch ("S"), host computer ("H"), or DEAD ("D"). The TYPE values are generated by the Hardware Polling Layer 804 on a continuing basis, and therefore are available to phase two of the reconfiguration process. Switches and hosts use distinct sets of flow control commands. The Hardware Survey Level 802 discussed above with reference to FIG. 18 detects which flow control commands are being received, and stores a TYPE value in the status registers 382 to indicate whether the neighbor coupled by the link is a switch or a host computer. When a port link is confirmed to be ALIVE by the Hardware Polling Level 804, this TYPE value is then stored in the INFO[P].TYPE elements of the port information array 902 for each port P. Similarly, DEAD links are also denoted in the INFO[P].TYPE elements of the array 902.

The TYPE information is not deleted during the second phase of the reconfiguration process. More generally, at the beginning of reconfiguration, status information regarding the switch's own ports is retained; only derived information regarding the status and tree positions of other switches is discarded.

The other elements of the port information array 902 are used only for ports which are coupled to switches, i.e., have INFO[P].TYPE="S".

INFO[P].R_POS 934 is the tree position last reported by the network member on port P. Note that a "tree position" is always the set of four values shown in array 910.

INFO[P].E_POS 936 is the tree position, if any, that the neighbor on port P last echoed back to the switch. In this discussion, all "echoed" values are values sent to another network member, and which the network member has since acknowledged receiving.

INFO[P].R_STB 938 is the stability value last reported by the neighbor on port P. INFO[P].E_STB 940 is the stability value last echoed by the neighbor on port P.

INFO[P].R_UID 942 is the UID of the neighbor on port P.

INFO[P].R_PORT 944 is the port of the neighboring switch which is coupled to port P of this switch.

INFO[P].NEW 946 is TRUE when a message with allegedly new information has been received from the neighbor on port P, and that message has not yet been acknowledged.

In summary, the port information array 902 contains all the information needed by the switch S during phase two of the reconfiguration process to participate in that process.

The Message Data Structure 904 contains the following elements. Each element of a message is denoted "M.element". In addition, it should be noted that the information in the message data structure is always for a message that is being sent from one particular switch to the neighbor on a particular port of that switch.

M.EPOCH 950 represents the Epoch number (i.e., the last configuration version number) known to the switch S.

M S_UID 952 is the UID of switch S.

M.S_POS 956 is current tree position (i.e., equal to CPOS) of switch S. M.S_STB 960 is the current stability value (i.e., equal to CSTB) of switch S.

M.E_POS 958 is the tree position last reported by the switch to which this message is being sent, and is called the echoed tree position. In other words M.E_POS is a copy of R_POS 932 for the port on which the message is being sent. Similarly, M.E_STB 962 is the stability value last reported by the switch to which this message is being sent (i.e., is equal to R_STB for the port on which the message is being sent), and is called the echoed stability value.

M.NEW 964 indicates whether the information in the message M is believed to be "new"—i.e., to contain new information. A message may not contain any new information if the purpose of the message is only to acknowledge the receipt of an earlier message. Thus M.NEW is true if M.S_POS is unequal to INFO[P].E_POS, or if M.S_STB is unequal to INFO[P].E_STB.

The NETLIST data structure 906 is a variable length structure which represents the network members and connections between network members in at least a branch of the spanning tree. Each element of the NETLIST is denoted "NLST.element".

NLST.COMPLETE 970 is TRUE only when the root of the spanning tree has been identified and all the switches in the network have sent their partial netlists up to the root. This happens at the end of phase two of the reconfiguration process.

NLST.NN 972 is the number of network members (i.e., switches and hosts) that are listed in the NETLIST 906.

NLST.NODELIST 974 is a list of the network members in the NETLIST 906, sorted by UID values. The node list 974 contains NN items 976. Each item 976 in the node list includes the UID value of one network member, and the SHORT ID of the member, if one has been previously assigned.

The remainder of the NETLIST are NN connection lists. Each connection list 978 identifies, for one network member, which other switches are coupled to each of the ports of the first network member. When a new NETLIST is first generated by a switch, the only switches included in the NETLIST 906 are the switch's immediate neighbors, as identified by the Port Information Array 902. When a partial netlist is received from another switch, the information in the partial netlist is merged with the information in the switch's own netlist to form a more complete netlist.

While only switches are denoted in the connection lists 978 of the preferred embodiment, in other embodiments of the invention connections to hosts could also be denoted. The additional information regarding hosts would then be used to develop netlists which include all network members, not just the switches in the network. However, a netlist containing only switches is sufficient to generate the routing tables needed by the switches, as will be explained below in the discussion on the third phase of the reconfiguration process.

Detailed Explanation of Phase Two

Pseudocode representations of the data structures and routines used in Phase Two are included in Appendices 4 through 8 at the end of this specification. See also FIG. 20.

When phase one of the reconfiguration process detects a change in the network's configuration, the switch which detects the change takes the following actions (box 100 in FIG. 20). Appendix 6 contains a pseudocode representation of the process followed by the switch which initiates reconfiguration. First, it clears all packets which the switch may be in the process of transmitting, and sets the link units to send "stop flow" signals to all hosts that are coupled to the switch. Packets interrupted in the middle of transmission must be retransmitted after reconfiguration. Second, the reconfiguration program clears all the information in its port information array 902 except for the TYPE information, which denotes whether the port is coupled to a switch, host, or is DEAD. The TYPE values are locally generated by the switch and therefore known to be accurate.

The reconfiguration program also erases the old version of the netlist 906. When phase two begins, all information about the network's topology that is derived from external sources of information is discarded because it may be incorrect.

Next, the reconfiguration program sets up an initial default tree position CPOS which defines the switch as the root node of the spanning tree, and with CSTB equal to FALSE to indicate that the switch is not stable. It then sets up an initial reconfiguration message reporting this tree position, using the Message data structure 904 shown in FIG. 19, and sends that message 1002 to all its switch neighbors.

The messages sent during the reconfiguration process are only sent between switches. Host computers do not participate in the reconfiguration process. In addition, it should be noted that there is a "universal, predefined SCP network address" which is used for all reconfiguration messages. This predefined SCP address is used to route messages to the SCP of the switch on the other end of whatever link the message is sent on.

Note that dashed lines in FIG. 20 represent the transmission of messages from one switch to another. Thus the process at the beginning of a dashed arrow takes place in a different switch than the process at the end of the dashed arrow. Solid arrows, on the other hand, represent progress by a switch from one part of the reconfiguration processes to the next part of the process. Thus the processes at both ends of solid arrows are executed by the same switch.

When a switch receives a reconfiguration message from another switch (box 1004), the following process takes place. Appendix 7 contains a pseudocode representation of this process.

Epochs. First, the receiving switch tests the epoch value received. M.EPOCH with its own epoch value. If the received epoch value is larger than it own epoch value, the switch performs the same clearing out process followed by the switch that started the reconfiguration process. Then it adopts the new epoch value as its own, and sets up an initial tree position denoting itself as the root of the spanning tree.

If the epoch number in the received message is smaller than the switch's own epoch number, it disregards the entire message.

To understand the remainder of the process for processing a received reconfiguration message, we must first explain the process for determining whether one tree position is better than another.

Comparing Tree Positions. When one switch reports its tree position to a neighboring switch, the receiving switch must decide whether the tree position reported by its neighbor is "better" than the switch's current tree position CPOS. If the received position is better, the receiving switch will identify the sending switch as its "parent", and the port on which the message was received as its "up link". Therefore, the comparison process is actually a determination of whether the receiving switch will achieve a better tree position than CPOS if it were to be the "child" of the reporting switch.

The tree position reported in a received message is denoted M.S_POS. The first step, then, in processing a received tree position, M.S_POS is to compute a "derived tree position"—which is the tree position of the receiving switch if it were the child of the sending switch. The derived tree position is calculated as follows:

T.root = M.S_POS.root

T.depth = M.S_POS.depth + 1

T.parent = M.S_UID

T.uplink = P where P is the port on which the message was received.

The next step is to see if the derived tree position T is better or worse than the switch's current tree position CPOS. The criteria for comparing two tree positions T and CPOS are as follows:

(1) If the root UID in T (i.e., T.root) is smaller than the root UID in CPOS (i.e., CPOS.root), then T is a better tree position. If CPOS.root < T.root, then CPOS is a better tree position. If CPOS.root = T.root, we use the second comparison test.

(2) If the depth of T (i.e., T.depth) is smaller than the depth of CPOS (i.e., CPOS.depth), then T is a better tree position. If CPOS.depth < T.depth, then CPOS is a better tree position. If CPOS.depth = T.depth, we use the third comparison test.

(3) If the parent UID of T (i.e., T.parent) is smaller than the parent UID of CPOS (i.e., CPOS.parent), then T is a better tree position. If CPOS.parent is less than T.parent then CPOS is a better tree position. If CPOS.parent = T.parent, we use the last comparison test.

(4) If the up link of T (i.e., T.uplink) is smaller than the up link of CPOS (i.e., CPOS.uplink), then T is a better tree position. If CPOS.uplink is less than T.uplink then CPOS is a better tree position. If CPOS.uplink = T.uplink, the two tree positions are identical, and thus equal.

The comparison of two tree positions is herein denoted using less than symbols ("<") and greater than symbols (">"). If tree position T is better than tree position CPOS, then T < CPOS. In other words, the better tree position is less than the worse tree position.

Note that this comparison process automatically selects "up links"—which are the spanning tree links shown in FIG. 17. When there are two or more parallel links between switches, such as the parallel links between switches 726 and 714 in FIG. 17, the comparison process selects the link with the lowest port number as the up link (i.e., the spanning tree link).

Another important point is that the tree position of every switch improves monotonically during reconfiguration. That is, a switch's tree position never gets worse, because it will only adopt a tree position which is better than its current position.

Processing a Message. First, a received message is checked to make sure that the message was received on an ALIVE link for a switch. Messages from DEAD links and the links for host computers are ignored. Then the message's Epoch number is checked to see if a new Epoch is being declared by the neighboring switch.

Next, it makes sure that the reported tree position of the sender M.S_POS is not worse than the last tree position INFO[P].R_POS reported by the switch on port P. Since tree positions improve monotonically, a worse tree position M.S_POS indicates a corrupted message or a problem with the reconfiguration program in the neighboring switch, and therefore the message is ignored. Similarly, the echoed tree position M.E_POS must not be worse than the echoed tree position INFO[P].E_POS last reported by the switch on port P.

Next, all the information in the message is deposited in the port information array 902. That is:

INFO[P].R_UID = M.S_UID

INFO[P].R_POS = M.S_POS

INFO[P].E_POS = M.E_POS

INFO[P].R_STB = M.S_STB

INFO[P].E_STB = M.E_STB

INFO[P].NEW = M.NEW

Then the receiving switch generates a derived tree position XPOS from the reported tree position. See the above explanation for computing a derived tree position. If XPOS is better than CPOS, then XPOS is adopted as the new value of CPOS and an internal flag called NEW is set to TRUE; otherwise NEW is set to FALSE. NEW indicates whether the switch has adopted a new tree position.

Evaluating Stability. Next, the switch evaluates whether it is "stable". Stability is defined as follows: a switch is stable when (1) the switch's current tree position matches all of the positions last echoed by the switch's neighbors, and (2) all neighbors which are the children of this switch (i.e., which consider this switch to be their parent) are stable. Based on these criteria, CSTB is set to TRUE if the switch is stable, and FALSE if it is not stable.

As will be explained in more detail below, when the root switch becomes stable, the root's program will know that the second phase of the reconfiguration process is done.

It should be noted that a switch which claims to be stable can later revoke that claim. This can happen if after claiming stability, the switch receives a new message which causes it to update its tree position. Whenever the switch updates its tree position, it revokes any previous claims to stability, and sends new messages to all of its neighboring switches denoting its revoked stability.

Sending New Messages. Whenever the switch receives a message, after processing that message it runs a message sending routine if (1) the switch's tree position CPOS changed, (2) the switch's stability value CSTB changed, or (3) the received message contained allegedly new information (M.NEW was TRUE) and therefore requires an acknowledgment message.

The message sending routine, when called, sends a reconfiguration message (box 1006) to all neighbors which don't know or haven't acknowledged the switch's current tree position (i.e., INFO[P].E_POS # CPOS). Acknowledgment messages are sent to any neighbors from which new information has been received since the last message was sent to it (i.e., INFO[P].NEW=TRUE). In addition, a message is sent to the parent of the switch if the last stability value echoed by the parent INFO[P].E_STB is not equal to the switch's current stability value CSTB.

The format of the message is always the same:

M.EPOCH = current EPOCH

M.S_UID = S

M.S_POS = CPOS

M.S_STB = CSTB

M.E_POS = INFO[P].R_POS

M.E_STB = INFO[P].R_STB and M.NEW is set to TRUE if either CPOS or CSTB does not match the echoed value from the switch that the message is being sent to. Using these values, the message M is sent to the neighboring switch on port P.

After a message is sent to a neighboring switch, the INFO[P].NEW value for that switch is set to FALSE, denoting that the last message from that switch has been acknowledged.

Next, a special "message timer" is used to make sure that all messages with new information in them are received and acknowledged. This is important because messages may be occasionally lost or corrupted, in which case it is important to resend the message. In the preferred embodiment, the usual turn around time for a message to be acknowledged is about one millisecond. The message timer is a software timer which has a period of twice the normal turn around time, i.e., about two milliseconds.

The timer is started when a message with new information is sent, unless the timer is already running. A special message timing routine then waits for the timer to expire, at which time it calls the same message sending routine being described here. If the message timer has already been started, it is not restarted with each new message. If a message has not been acknowledged when the message sending routine is called by the timer routine, the message will be resent and the message timer will be restarted.

In summary, every time that a switch receives a message, if the message causes it to change its tree position or stability status, it will send update messages to its neighbors. As a result, a chain of messages is quickly sent through the entire network, from switch to switch, until all the switches have directly or indirectly heard from all the other switches.

Generating a Netlist. As the message passing between switches progresses, some of the switches will attain positions at the top of the spanning tree and some will attain positions at the bottom of the spanning tree.

The switches at the bottom of the spanning tree, with the largest depth values, will be the first to "claim" stability. It is said that stability is only "claimed" because new information may be received later which will cause the switch to revoke its claim of stability.

The criteria for claiming stability were described above in the subsection entitled "Evaluating Stability".

Whenever a switch claims stability, and it has not already sent that claim to its parent, it invokes a routine for sending a partial netlist up to the parent. As explained above, the netlist generated by a switch is a list of all the switches known to that switch, and includes a list of all the known connections between switches. See the above explanation of the NETLIST data structure 906.

Appendix 8 contains a pseudocode representation of the routines which process and send netlists up and down the spanning tree.

When a switch claims stability and is ready to send a netlist up to its parent, the following process is used (box 1008). First, if it is at the bottom of the tree, it builds a partial netlist from the information in its port information array, and sends that partial netlist to it parent. If it is not at the bottom of the tree, it adds to the received netlist the information in its port information array, and then sends the resulting netlist to its parent.

Receiving a NETLIST. When a switch receives a netlist from one of its children (box 1010), it performs the following process. If it already has received a netlist from another child, it merges the received netlist into the previous netlist to generate a more complete netlist. It also adds any new information known from the port information array 902.

If the switch which receives the netlist is not stable, this routine simply terminates, and the netlist is stored until the switch becomes stable.

If the switch which receives the netlist is stable, and its tree position identifies itself as the root, then phase two of the reconfiguration process is complete. The reason for this is that the definition of stability prevents any switch except the root from being stable and having a tree position which identifies itself as the root.

Reconfiguration Phase Three

Generating Routing Tables

When the root switch receives the last partial netlist from its children (which it merges with the other partial netlists it has received to create a complete netlst) and is stable, it sets the COMPLETE flag 970 in the NETLIST data structure 906 to TRUE and then it performs the following procedure.

First, the root switch assigns 7-bit SHORT IDs to all the switches in the network. Generally, it tries to preserve the SHORT ID values in the received netlist so that the network addresses from the previous Epoch will still be valid. However, if a switch lost power and then is restarted, causing two successive reconfigurations, its old SHORT ID will be lost, and the switch and all the hosts coupled to that switch will probably be assigned new network addresses.

Sending a Netlist Down the Tree. Next (box 1012), it sends the complete netlist on all its spanning tree down links to the switches for which it is the parent (i.e., for which INFO[P].R_POS.UPLINK=INFO[P].R_PORT). In the example network shown in FIG. 17, the root 710 would send the complete netlist to switches 712, 714, 716, 718 and 720.

Finally the root switch calls the routine for computing the switch's routing table (1014), as will be described in more detail below.

Each switch which receives the complete netlist (box 1016) from its parent replaces its old netlist with the complete netlist, and retransmits the complete netlist to its children, if any (box 1012). Then the switch calls the routine for computing that switch's routing table (box 1014). As a result, the complete netlist is quickly sent down the entire spanning tree, and all the switches work virtually simultaneously on computing new routing tables.

Computing the Routing Table. FIG. 14 shows the structure of the routing table 422. Appendix 9 contains a pseudocode representation of the process for computing the link vectors in a routing table.

First, all the entries in the entire routing table are reset to the value for illegal network address: the broadcast bit is set equal to "1" and all link mask bits equal to "0". In addition, entries corresponding to reconfiguration messages being sent to the SCP of the switch are set up for routing those messages to the SCP. Note that there is a single predefined address for sending reconfiguration messages between neighboring switches. The link vectors for that address (i.e., for all the ALIVE input links) have a single mask bit, corresponding to the port for the SCP, set to "1".

The resetting of the routing table memory 422 is actually done at the beginning of the second phase of reconfiguration so that all host packets being processed will be purged from the switch, and to make sure that reconfiguration messages will be received.

During the third phase of reconfiguration, a new routing table is generated in the SCP's regular memory. When the new routing table is complete, it is then copied into the routing table memory 422. The starting point for computing the routing table is the reset routing table generated at the beginning of phase two.

When computing the routing table's link vectors, the following process is repeated for every alive input link for the switch which is running this process: for every network address defined in the complete netlist, a link vector is generated at the address defined by the concatenation of the 4-bit input link number and the 11-bit network address. Each mask bit in the link vector that corresponds to an alive output port is set to "1" if (1) it possible to get to the specified network address via the output link without violating the up/down routing rule, and (2) the path through the port is no longer than the shortest route to the specified network address.

Using the netlist, the routing routine determines whether each link is an up link or a down link. If the input link is an up link (which means that the received packet is traveling down the tree), the link vector can have enabled mask bits only for down links.

The computation of the routing table is done by first computing a "subnet" routing table just for sending messages between the switches, and then expanding the subnet to fill the entire routing table. See Appendix 9.

In an alternate embodiment, the allowed paths to a specified network address may include paths up to N links longer than the shortest path from the same switch, where N is a specified integer. Other criteria may be used to eliminating excessively long paths in other alternate embodiments.

Next, the link vectors for broadcast packets and reconfiguration message packets are added to the routing table. In the preferred embodiment, a single predefined 11-bit network address is used for all broadcast packets, although more than one address could be used in alternate embodiments (e.g., for partial broadcasts to a predefined subset of the hosts in the network).

For broadcast packets, a different process is used for the root switch than for the other switches. For all switches but the root, broadcast packets can travel both up and down the spanning tree, with the direction of travel depending on which input link the packet was received on. When a broadcast packet is received on a down link, it is traveling up the spanning tree to the root; when a broadcast packet is received on an up link, it is traveling down the spanning tree. Thus, for input down links, the only mask bit in the link vector which is set to "1" is the switch's up link to its parent. For input up links, the mask bits in the vector which are set to "1" are those for all the spanning tree down links coupled to that switch.

For the root node, broadcast packets are received only from down links, and are retransmitted on all the root's spanning tree down links. Therefore, for all the input down links, the mask bits in the link vector which are set to "1" are those for all the spanning tree down links coupled to that switch.

After completing computation of the routing table, the complete table is copied into the routing table memory 422. At that point the switch is "open for business" because data packets will now be forwarded according to the routing table instead of being purged.

It should be noted that the netlist in the preferred embodiment only defines the position of the switches in the network. Therefore, when generating the link vectors for network addresses that correspond to another switch, all twelve routing table entries for the other switch will be filled in with an identical value. On the other hand, when generating the link vectors for the network addresses that correspond to the switch containing the routing table, the port information array specifies which ports are ALIVE and which are DEAD. The routing table entries for the DEAD ports are set to all zeros, which will cause any packet sent to that address to be erased or dropped.

This means that it is possible that a packet with an invalid network address will be forwarded to a switch, only to have the message erased when it arrives because it addresses to a DEAD port. While there would be some small advantage in setting the routing table entries to prevent the transmission of such a packet at all, it is expected that very few packets will have illegal addresses and that no harm will be caused by transmitting such packets through a few switches. To generate routing tables which take into account all the DEAD links in the network, the netlist would need to include information on all connections to the host computers in the network as well as the connections between switches.

Suicide Pact. When and if the Epoch number overflows (i.e., reaches a value of $2^{64}$), there is a minor problem because messages with the "next" Epoch value (i.e., Epoch=0 or Epoch=1) will have a smaller Epoch value than the previous Epoch. To solve this problem, all the switches must reset the Epoch value to a predefined starting value (e.g., 0 or 1). To do this, when a switch increases its Epoch number and detects an overflow of that number, it sends a special reconfiguration message to all its neighboring switches, requiring them to reset their Epoch value. This message, called the "suicide pact" message, is then sent by those switches to all their neighbors until all the switches have received the message. After receiving and retransmitting the "suicide pact" message, all the switches wait a predefined period of time (e.g., five seconds) before beginning the standard reconfiguration process. As a result, the Epoch mechanism retains its integrity in all situations.

Multiple Network Changes. If a second network component changes during the middle of reconfiguration, what happens is as follows. If the switch which detects the change was already informed of the first change and was running the reconfiguration program, this switch "declares a new epoch" by incrementing its Epoch number, and restarting phase two of the reconfiguration process. Thus it sends new reconfiguration messages to its neighbors reporting on the Epoch. The new, higher Epoch number will prevail over the smaller Epoch number, and the reconfiguration process will proceed as before.

If the switch which detects the second change was not already informed of the first change, then it will independently start the configuration process with the same new Epoch number as is being used by the other switches. The two sets of reconfiguration messages will meet at some point in the network, and the reconfiguration process will then proceed in normal fashion.

As can be seen, any number of network changes which occur in a short period of time will be incorporated into the reconfiguration process started by the first change.

In summary, the reconfiguration procedure of the present invention is extremely fast and has the unusual property that there is a switch in the network which knows when the reconfiguration process is complete, and that switch tells all the others. As a result, all the switches in the network know when the reconfiguration process is complete. In the preferred embodiment, the longest time for reconfiguration is believed to be under 200 milliseconds, which is believed to be short enough not to negatively impact on the users of the system.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1

HARDWARE POLLING ROUTINE ()

```
**  CV: CODE VIOLATION FLAG
**  FC: FLOW CONTROL ERROR FLAG
**  RT: ROUND TRIP ERROR FLAG
**  SEND_IDHY: FLAG WHICH REQUIRES LINK UNIT
**             TO SEND IDHY ("I DON'T HEAR YOU") COMMANDS

LOOP:

CLEAR INT_CV, INT_FC, INT_RT

FOR N = 1 TO 5

DELAY (1 MILLISECOND)

READ CV, FC AND RT FLAGS
        FROM STATUS REGISTERS IN LINK UNIT

INT_CV = INT_CV + CV
            INT_FC = INT_FC + FC
            INT_RT = INT_RT + RT
    END

IF (INT_CV .GE. 3  .OR.  INT_FC .GE. 3)
        SET SEND_IDHY            ** SEND IDHY COMMANDS
        SET HW.LINK_STATUS = DEAD
```

```
    ELSE
        RESET SEND_IDHY        ** DON'T SEND IDHY COMMANDS
        IF INT_RT .GE. 3
            SET HW.LINK_STATUS = DEAD
        ELSE
            SET HW.LINK_STATUS = ALIVE
        END
    END

CALL MESSAGE_EXCHANGE (LINK_STATUS)

ENDLOOP
```

APPENDIX 2

MESSAGE_EXCHANGE ROUTINE (
```
      HW.LINK_STATUS : STATUS
)

READ HW.LINK_STATUS FROM HARDWARE POLLING ROUTINE

IF ME.LINK_STATUS = HW.LINK_STATUS = DEAD
    RETURN
ENDIF

IF ME.LINK_STATUS = ALIVE .AND. HW.LINK_STATUS = DEAD
    SET ME.LINK_STATUS = DEAD
    CALL STATUS CHANGE FILTER
    RETURN
END

IF ME.LINK_STATUS = HW.LINK_STATUS = ALIVE
   AND 5_SECOND MESSAGE TIMER HAS EXPIRED

CALL KEEP ALIVE MESSAGE
    RESTART 5_SECOND MESSAGE TIMER
    RETURN
END

IF HW.OLD_STATUS = DEAD .AND. HW.LINK_STATUS = ALIVE
    IF 15_SECOND_DEAD_TO_ALIVE TIMER HAS EXPIRED
        SET ME.LINK_STATUS = ALIVE
        CALL KEEP ALIVE MESSAGE
        IF ME.LINK_STATUS = ALIVE
            RESTART 15_SECOND_DEAD_TO_ALIVE TIMER
            CALL STATUS CHANGE FILTER
        END
    END
    RETURN
END
```

KEEP ALIVE MESSAGE SUBROUTINE

```
SEND KEEP ALIVE PACKET TO REMOTE LINK UNIT
WAIT FOR ACKNOWLEDGMENT MESSAGE
IF ACKNOWLEDGMENT MESSAGE RECEIVED
    ACKNOWLEDGE THE ACKNOWLEDGEMENT MESSAGE
    SET ME.LINK_STATUS = ALIVE
```

```
ELSE
    REPEAT ACKNOWLEDGEMENT
    MESSAGE SEVERAL TIMES

IF ACKNOWLEDGEMENT STILL NOT RECEIVED
        SET ME.LINK_STATUS = DEAD
        CALL STATUS CHANGE FILTER
    END
END MESSAGE_EXCHANGE
```

APPENDIX 3

CHANGE STATUS FILTER ROUTINE ()

```
READ ME.LINK STATUS FROM MESSAGE EXCHANGE ROUTINE

IF FILTER.STATUS = ME.LINK_STATUS = DEAD
    RETURN
END

IF FILTER.STATUS = ME.LINK_STATUS = ALIVE
    RETURN
END

IF FILTER.STATUS = ALIVE .AND. ME.LINK_STATUS = DEAD
    FILTER.STATUS = DEAD
    CALL RECONFIGURATION ROUTINE
END

IF FILTER.STATUS = DEAD .AND. ME.LINK_STATUS = ALIVE
    IF 30_SECOND_FILTER TIME HAS EXPIRED
        FILTER.STATUS = ALIVE
        RESTART 30_SECOND_FILTER TIMER
        CALL RECONFIGURATION ROUTINE
    END
END
```

APPENDIX 4

TREE POSITION DATA STRUCTURES AND SUBROUTINES

```
TreePos DATA STRUCTURE:
    root    : UID   ** UID of switch believed to be the
                    ** root
    depth   : LEN   ** believed depth of switch S in the
                    ** tree
    parent  : UID   ** UID of switch believed to be parent
                    ** of switch S
    uplink  : LPN   ** local port number that is believed
                    ** to be the uplink for switch S COMPARE_TREE_POS SUBROUTINE ( a : TreePos; b : TreePos ) :
    IF a.root < b.root      THEN RETURN "LT"; END;
    IF a.root > b.root      THEN RETURN "GT"; END;

IF a.depth < b.depth    THEN RETURN "LT"; END;
    IF a.depth > b.depth    THEN RETURN "GT"; END;
```

```
        IF a.parent < b.parent    THEN RETURN "LT"; END;
        IF a.parent > b.parent    THEN RETURN "GT"; END;

IF a.uplink < b.uplink    THEN RETURN "LT"; END;
        IF a.uplink > b.uplink    THEN RETURN "GT"; END;

RETURN "EQ";
END

DERIVE_TREE_POS SUBROUTINE (
    s2: UID         ** Switch UID of message sender
    p : LPN         ** local port number on which message
                    ** was received
    t2: TreePos     ** sender's tree position
) : TreePos;
    t1.root   = t2.root
    t1.depth  = t2.depth + 1
    t1.parent = s2
    t1.uplink = p
    RETURN t1
END
```

APPENDIX 5

PORT INFORMATION AND MESSAGE DATA STRUCTURES

INFO[P] (PORT INFORMATION) DATA STRUCTURE:
```
    TYPE    : Char      ** 'S' for switches,
                        ** 'H' for hosts
                        ** 'D' for dead links
    R_POS   : TreePos   ** tree position last reported
                        ** by neighbor on port P
    E_POS   : TreePos   ** echo of tree position
    R_STB   : Boolean   ** received stability report
    E_STB   : Boolean   ** echo of stability report
    R_UID   : UID       ** UID of neighbor on port P
    R_PORT  : Integer   ** port number of neighbor
    NEW     : Boolean   ** new info received from
                        ** neighbor
```

MESSAGE DATA STRUCTURE:
```
    EPOCH   : epoch     ** epoch number of sender
    S_UID   : UID       ** sender's UID
    TYPE    : Char      ** sender is switch/host
    S_POS   : TreePos   ** sender's current tree position
    E_POS   : TreePos   ** echo of receiver's last
                        ** reported tree position
    S_STB   : Boolean   ** sender's stability report
    E_STD   : Boolean   ** echo of receiver's last
                        ** stability report
    NEW     : Boolean   ** sender believes that message
                        ** contains new information
```

APPENDIX 6

START RECONFIGURATION ROUTINE ()

```
EPOCH = EPOCH + 1
IF EPOCH OVERFLOWS
     CALL SUICIDE_PACT ROUTINE
END

STOP ALL LINK UNITS AND PURGE ALL MESSAGE PACKETS

SET UP DEFAULT TREE POSITION AND STABILITY RECORD:
  NUL_POS : TreePos
     NUL_POS.ROOTID  = NIL_UID      ** WORST POSSIBLE UID
     NUL_POS.DEPTH   = INFINITY     ** WORST POSSIBLE DEPTH
     NUL_POS.PARENT  = NIL_UID      ** WORST POSSIBLE UID
     NUL_POS.UPLINK  = NIL_PORT     ** WORST POSSIBLE UPLINK CLEAR PORT INFORMATION RECORDS
     FOR P = ALL ALIVE LINK PORTS COUPLED TO A SWITCH
          INFO[P].R_POS   = NUL_POS
          INFO[P].E_POS   = NUL_POS
          INFO[P].R_STB   = .FALSE.
          INFO[P].E_STB   = .FALSE.
     END DEFINE CPOS : TreePos             ** CURRENT TREE POSITION
     CPOS.ROOTID  = S             ** THIS SWITCH'S UID
     CPOS.DEPTH   = 0
     CPOS.PARENT  = NIL_UID
     CPOS.UPLINK  = NIL_PORT
     CSTB = .FALSE.

*** SEND RECONFIGURATION MESSAGES:
  FOR P = ALL ALIVE LINK PORTS COUPLED TO A SWITCH
     R_MSG: MESSAGE =
          R_MSG.EPOCH = EPOCH
          R_MSG.S_UID = S = THIS SWITCH'S UID
          R_MSG.S_POS = CPOS
          R_MSG.E_POS = INFO[P].R_POS
          R_MSG.S_STB = CSTB
          R_MSG.E_STB = INFO[P].R_STB
          R_MST.NEW   = .TRUE.

SEND R_MSG ON LINK P
  END

RETURN
```

APPENDIX 7

RECEIVE_MESSAGE ROUTINE (
```
     p : LPN         ** port on which message is received
     m : Message     ** message received
)

IF NOT LIVE(p) THEN RETURN; END;

IF m.epoch > EPOCH         ** test for new epoch
     EPOCH = m.epoch
     STOP ALL LINK UNITS AND PURGE ALL MESSAGE PACKETS
```

```
            *** CLEAR PORT INFORMATION RECORDS:
            FOR x = ALL ALIVE LINK PORTS COUPLED TO A SWITCH
                INFO[x].R_POS   = NUL_POS
                INFO[x].E_POS   = NUL_POS
                INFO[x].R_STB   = .FALSE.
                INFO[x].E_STB   = .FALSE.
            END

CPOS = NUL_POS             ** CLEAR CURRENT POSITION
      END

IF m.epoch < EPOCH  THEN RETURN; END;  ** Ignore old epochs

IF m.S_POS > INFO[p].R_POS  THEN ABORT; END;
          ** (violates monotonic position improvement)

IF m.E_POS > INFO[p].E_POS  THEN ABORT; END;
          ** (violates monotonic position improvement)

INFO[p].R_POS = m.S_POS
      INFO[p].E_POS = m.E_POS
      INFO[p].R_STB = m.S_STB
      INFO[p].E_STB = m.E_STB
      INFO[p].NEW   = m.NEW          ** must reply if sender says
                                     ** this is new information
      REPLY_RQ = m.NEW               ** Indicates if Reply is Rqd XPOS = DERIVE_TREE_POS( m.S_UID, p, m.S_POS )
      IF XPOS < CPOS
          CPOS = XPOS
          REPLY_RQ = .TRUE.
      END CALL EVALUATE()     ** REPLY_RQ =.TRUE. if CSTB changes
                          ** in value

IF REPLY_RQ  THEN CALL SEND_MSG(); END;
      END RECEIVE_MESSAGE ROUTINE

EVALUATE SUBROUTINE ()
          ** SWITCH IS NOT STABLE IF:
          ** (1) THE SWITCH'S CURRENT TREE POSITION DOES NOT
          **     MATCH THE POSITION LAST ECHOED BY ANY NEIGHBOR
          ** OR
          ** (2) ANY CHILD OF THE SWITCH IS NOT STABLE

OLD_CSTB = CSTB
          CSTB = .TRUE.
          FOR P = ALL ALIVE LINK PORTS COUPLED TO A SWITCH
              IF (CPOS # INFO[P].E_POS) .OR.
                 ((INFO[P].R_POS.PARENT = S)
                 .AND. (NOT INFO[P].R_STB))
                    CSTB = .FALSE.
              END
          END
          IF CSTB # OLD_CSTB
              REPLY_RQ = .TRUE.
          END
      END
```

```
SEND_MSG ROUTINE()
    ** SEND UPDATE MESSAGES TO:
    ** (1) ALL LINKS WHICH DON'T KNOW
    **     CURRENT TREE POSITION OF SWITCH
    ** (2) ALL LINKS ON WHICH NEW INFORMATION HAS BEEN
    **     RECEIVED SINCE THE LAST UPDATE MESSAGE
    **     WAS SENT TO IT
    ** AND
    ** (3) PARENT OF SWITCH IF STABILITY OF SWITCH HAS
    **     CHANGED

M.S_POS = CPOS
    M.S_STB = CSTB

FOR P = ALL ALIVE LINK PORTS COUPLED TO A SWITCH
        M.NEW = .FALSE.

IF INFO[P].E_POS # CPOS
            M.NEW = .TRUE.
        END

IF ( P = CPOS.UPLINK ) .AND.
           ( INFO[P].E_STB # CSTB )
            M.NEW = .TRUE.
        END

IF M.NEW .OR. INFO[P].NEW
            M.E_POS = INFO[P].R_POS
            M.E_STB = INFO[P].R_STB
            SEND MESSAGE M ON PORT P
            INFO[P].NEW = .FALSE.
            IF M.NEW .AND. MSG_TIMER HAS EXPIRED
                RESTART MSG_TIMER
                ENABLE MESSAGE_TIMER ROUTINE
            END
        END

IF CSTB .AND. (P = CPOS.UPLINK) .AND.
           (INFO[P].E_STB # CSTB)
            CALL SEND_NETLIST_UP (P)
        END
    END                                  ** END OF LOOP
END SEND_MSG

MESSAGE_TIMER ROUTINE()
    ** This routine calls the SEND_MSG routine
    ** periodically (e.g., every 2 milliseconds) to make
    ** sure that all messages containing new information
    ** are acknoweldged IF MSG_TIMER IS RUNNING
        WAIT UNTIL MSG_TIMER EXPIRES
        CALL SEND_MSG()
    END
END MESSAGE_TIMER
```

APPENDIX 8

NETLIST DATA STRUCTURE AND ROUTINES

NETLIST (NETWORK TOPOLOGY) DATA STRUCTURE:

```
COMPLETE : Boolean   ** True when netlist of entire
                     ** network
NN       : Int       ** Number of network members
                     ** in netlist
NODES    : list      ** sorted list of UIDs and
                     ** ShortIDs of network members
                     ** in netlist
CNCT[1]  : list      ** list of network members
                     ** connected to each port of first
                     ** network member in netlist.
...
CNCT[NN] : list      ** list of network members
                     ** connected to each port of last
                     ** network member in netlist.

SEND_NETLIST_UP(
    p : LPN
)
    **   Note:
    **   An initial Netlist "nlst" is built using data in
    **   INFO[] at the beginning of Phase 2
    **   of the Reconfiguration Process.

SEND nlst ON PORT p
END SEND_NETLIST_UP

SEND_NETLIST_DOWN
    **  SEND NETLIST TO ALL SWITCHES FOR WHICH SWITCH S
    **  IS THE PARENT

FOR P = ALL ALIVE PORT LINKS COUPLED TO A SWITCH
        IF INFO[P].R_POS.UPLINK = INFO[P].R_PORT
            SEND nlst ON PORT P
        END
    END
END SEND_NETLIST_DOWN RECEIVE_NETLIST(
    n : NETLIST
)
    ** If the received netlist is incomplete,
    ** generate new netlist nlst combining the
    ** information in nlst and the received netlist IF .NOT. n.COMPLETE
        MERGE n into nlst
    END

*** If this switch is the root, and is stable,
    *** Phase 2 of Reconfiguration is done,
    *** Netlist is Complete,
    *** and Phase 3 begins.
```

```
IF CSTB .AND. CPOS.root = S
    ASSIGN SHORTIDs TO NETWORK MEMBERS IN nlst
    SET nlst.COMPLETE = .TRUE.
    CALL SEND_NETLIST_DOWN()
    CALL COMPUTE_ROUTE_TABLE
    RETURN
END IF n.COMPLETE                    *** Complete Netlist
    REPLACE nlst WITH n          *** is sent down the
    CALL SEND_NETLIST_DOWN        *** tree and is also
    CALL COMPUTE_ROUTE_TABLE      *** used to compute
    RETURN                       *** routing table
END

END RECEIVE_NETLIST
```

APPENDIX 9

ROUTING TABLE DATA STRUCTURES AND ROUTINE

```
ROUTING TABLE:
    BC[0:32767]           : BINARY ** BROADCAST BIT
    LINKV[0:32767, 1:13)  : BINARY ** 13 BIT LINK VECTOR

SUBNET TABLE:
    SUBNET[0:15, 0:127]   : BINARY ** SUBNET OF SWITCHES

COMPUTE_ROUTE_TABLE()

*** FIRST COMPUTE LEGAL ROUTES BETWEEN SWITCHES:

SET ALL SUBNET[] = 0
    FOR I = ALL LINKS OF SWITCH
        FOR J = ALL SHORTIDS IN THE NETWORK
            IF ( IT IS POSSIBLE TO GET TO SWITCH J VIA
                 LINK I WITHOUT VIOLATING THE UP/DOWN
                 ROUTING RULE, ON A PATH NO MORE THAN N
                 LINKS LONGER THAN SHORTEST PATH TO
                 SWITCH J)
                 SUBNET[I,J] = 1
            END
        END
    END

** EXPAND SUBNET TO FILL ROUTING TABLE

RESET ENTIRE ROUTING TABLE WITH BC[*]=1, LINKV[*]=0

FOR L = ALL ALIVE INPUT LINKS                ** 4-BITS
        FOR M = ALL LINK NUMBERS
            FOR J = ALL SHORTIDS IN NETWORK       ** 11-BITS

IF J = SHORTID OF THIS SWITCH
                    LINKV[L,M,J] = 1 IF LINK M IS ALIVE
```

```
            ELSE
                IF LINK L IS A DOWN LINK OR A HOST
                    LINKV[L,M,J] = SUBNET[M,J]

ELSE        ** LINK L IS AN UP LINK
                    IF LINK J IS A DOWN LINK
                        LINKV[L,M,J] = SUBNET[M,J]
                    END
                END
            END
        END
    END

** COMPUTE BROADCAST ROUTING ENTRIES:

FOR EVERY PREDEFINED BROADCAST ADDRESS

** HANDLING FOR ALL BUT ROOT NODE:

IF CPOS.ROOT # S

** DOWN LINKS ARE LINKS TO HOSTS AND LISKS FOR
        ** WHICH   INFO[LINK].PARENT = S

** SET LINK VECTORS FOR BC PACKETS
        ** GOING UP THE TREE:

FOR EVERY DOWN LINK
            ADR = CONCATENATE( LINK_NUMBER,
                        BROADCAST ADDRESS)
            BC[ADR] = 0
            LINKV[ADR, CPOS.UPLINK] = 1
        END

** SET LINK VECTORS FOR BC PACKETS
        ** GOING DOWN THE TREE:

ADR = CONCATENATE( CPOS.UPLINK,
                    BROADCAST ADDRESS)
        BC[ADR] = 1
        FOR D = EVERY SPANNING TREE DOWN LINK
            LINKV[ADR, D] = 1
        END

ELSE

** SPECIAL TREATMENT FOR ROOT NODE

FOR EVERY DOWN LINK
            ADR = CONCATENATE( LINK_NUMBER,
                        BROADCAST ADDRESS)
            BC[ADR] = 1
            FOR D = EVERY SPANNING TREE DOWN LINK
                LINKV[ADR](D) = 1
            END
        END
    END
END
```

```
** SPECIAL PREDEFINED ADDRESS FOR SENDING
** RECONFIGURATION MESSAGES TO NEIGHBORING SWITCHES

WRITE PREDEFINED LINK VECTOR
FOR PREDEFINED 'NEIGHBORING SWITCH SCP ADDRESS'

END COMPUTE_ROUTE_TABLE
```

What is claimed is:

1. A mesh connected local area network for interconnecting a multiplicity of hosts, said network comprising:
   a multiplicity of switch means for simultaneously routing a multiplicity of data packets between hosts in the network; each switch means including a multiplicity of port means for coupling the switch means to other switch means and hosts, and a nonblocking crossbar switch for simultaneously coupling and routing data packets between a multiplicity of selected pairs of said port means; said hosts and switch means together comprising network members; and
   a multiplicity of point to point link means for interconnecting said switch means and the hosts in said network, each point to point link means providing a communication channel between two of said network members;
   each said port means including buffer means for buffering data packets received by said switch means at said port means and cut-through means for beginning to retransmit received data packets through said nonblocking crossbar switch before the end of said received data packets have been received.

2. The mesh connected local area network of claim 1,
   each said data packet having a specified host to which said data packet is being sent,
   each of said switch means including routing means for defining in accordance with predefined criteria, legal data packet transmission routes through said network; said routing means defining a subset of said port means of said switch means through which a received data packet can be retransmitted, wherein said subset of port means is selected by said routing means in accordance with the port means of said switch which receives said data packet and the host to which said data packet is being sent.

3. The mesh connected local area network of claim 1,
   said multiplicity of link means including spanning tree links and a multiplicity of additional links;
   said multiplicity of switch means and said spanning tree links together comprising a spanning tree in which one of said switch means is designated the root of said spanning tree;
   each said data packet having a specified host to which said data packet is being sent;
   each said switch means including routing means for defining legal data packet transmission routes through said network; said routing means including switch ordering means for defining which of two specified switch means has a better position in said spanning tree and which has a worse position;
   said routing means further including configuring means, coupled to said switch ordering means, for denoting each link means coupling a host to said switch means as an up link, for denoting each link means coupling said switch means to another switch means with a better position in said spanning tree as an up link, and for denoting each link means coupling said switch means to another switch means with a worse position in said spanning tree as a down link;
   said routing means further including means for forwarding data packets received on any of said up links on a selected one of said up and down links, and means for forwarding data packets received on any of said down links on a selected one of said down links;
   whereby said routing means provides deadlock free routing of data packets through said mesh connected local area network.

4. The mesh connected local area network of claim 1,
   said multiplicity of link means including spanning tree links and a multiplicity of additional links;
   said multiplicity of switch means and said spanning tree links together comprising a spanning tree in which one of said switch means is designated the root of said spanning tree;
   said network further including switch ordering means for defining, for any two specified ones of said switch means, which of said specified switch means has a better position in said spanning tree and which has a worse position;
   each said link means which interconnects two of said switch means including an up channel and a down channel which transmit data packets in opposite directions between said switch means; said up channel transmitting data packets from a switch means in a worse position to a switch means in a better position;
   each said switch means including routing means for forwarding a data packet toward a specified one of said network members so that the path by which said data packet is transmitted through said network comprises zero or more up channels followed by zero or more down channels;
   whereby said routing means provides deadlock free routing of data packets through said mesh connected local area network.

5. The mesh connected local area network of claim 4,
   said switch means including port status means for denoting which of said port means is currently available for retransmitting data packets;
   said routing means including route selection means for comparing said subset of said port means of said switch means through which each received data packet can be retransmitted with said port status means and for routing each said received data packet through a port means which is included in said subset of said port means and which is currently available for retransmitting data packets.

6. The mesh connected local area network of claim 5, said route selection means including means for periodically comparing said subset of said port means of said switch means through which each received data packet can be retransmitted with said port status means until one of the port means denoted as available matches one of said subset of said port means, and then routing said received data packet through the matching port means;

whereby said switch means provides low latency retransmission of data packets.

7. The mesh connected local area network of claim 1, said multiplicity of link means including spanning tree links and a multiplicity of additional links;

said multiplicity of switch means and said spanning tree links together comprising a spanning tree in which one of said switch means is designated the root of said spanning tree;

said data packets including non-broadcast data packets which are sent to a single specified one of said hosts in said network and broadcast data packets which are to be sent to all said hosts in said network;

each said switch means including routing means for defining legal data packet transmission routes through said network; said routing means including configuring means for denoting two broadcast packet transmission routes, including means for designating as an uplink port one port means of said switch means which couples said switch means to another switch means that is closed to said root of said spanning tree, in accordance with predefined criteria, and for denoting as downlink ports each port means which is coupled to the uplink port of other ones of said switch means;

said routing means of each said switch means, except said switch means designated as said root of said network, further including route selection means for routing broadcast data packets received by said uplink port to all of said downlink ports, and for routing to said uplink port broadcast data packets received by any of said port means other than said uplink port.

8. The mesh connected local area network of claim 7, said routing means of said switch means designated as said root of said network further including a root node route selection means for routing all broadcast data packets received by said switch means to all of said downlink ports.

9. The mesh connected local area network of claim 7, wherein each said switch means includes means for simultaneously retransmitting received broadcast data packets through all of said downlink ports.

10. The mesh connected local area network of claim 1, said data packets including data packets which are sent to a single specified one of said hosts in said network and broadcast data packets which are to be sent to all said hosts in said network; said broadcast data packets having a predefined maximum size;

said buffer means having more than sufficient room to store an entire broadcast data packet of said predefined maximum size and means for indicating when said buffer means has sufficient room to receive an entire broadcast data packet;

said port means including flow control means coupled to said buffer means for sending flow control signals to a network member coupled to said port means, said flow control signals including stop flow signals requiring said network member to stop transmitting data packets to said port means and start flow signals allowing said network member to resume sending data packets to said port means; said flow control means including means for sending start flow signals only when said buffer means has sufficient room to receive an entire broadcast data packet.

11. The mesh connected local area network of claim 10, said port means including means for receiving said flow control signals sent by a network member coupled to said port means, and means for stopping the transmission of a data packet when a stop flow signal is received from said network member, unless said data packet is a broadcast packet.

12. A mesh connected local area network for interconnecting a multiplicity of hosts, said network comprising:

a multiplicity of switch means for simultaneously routing a multiplicity of data packets between hosts in the network; each switch means including a multiplicity of port means for coupling the switch means to other switch means and hosts, and a nonblocking crossbar switch for simultaneously coupling and routing data packets between a multiplicity of selected pairs of said port means; said hosts and switch means together comprising network members; and a multiplicity of point to point link means for interconnecting said switch means and the hosts in said network, each point to point link means providing a communication channel between two of said network members;

each said data packet having a specified host to which said data packet is being sent;

each said switch means including routing means for defining, in accordance with predefined criteria, legal data packet transmission routes through said network; said routing means defining a subset of said port means of said switch means through which a received data packet can be retransmitted, wherein said subset of port means is selected by said routing means in accordance with the port means of said switch which receives said data packet and the host to which said data packet is being sent.

13. The mesh connected local area network of claim 12, said multiplicity of link means including spanning tree links and a multiplicity of additional links;

said multiplicity of switch means and said spanning tree links together comprising a spanning tree in which one of said switch means is designated the root of said spanning tree;

said routing means including configuring means for denoting as an up port each port means of said switch means which couples said switch means to another switch means that is closer to said root of said spanning tree, in accordance with predefined criteria, and for denoting as down ports all the other port means of said switch means;

said routing means further including routing table means for defining a subset of said port means of said switch means through which a received data packet can be retransmitted, wherein said subset of port means includes only selected ones of said port means denoted by said configuring means as down ports when said port means which receives said data packet is denoted as a down port;

whereby said routing means provides deadlock free routing of data packets through said mesh connected local area network.

14. The mesh connected local area network of claim 12, said multiplicity of link means including spanning tree links and a multiplicity of additional links;

said multiplicity of switch means and said spanning tree links together comprising a spanning tree in which one of said switch means is designated the root of said spanning tree;

said network further including switch ordering means for defining, for any two specified ones of said switch means, which of said specified switch means has a better position in said spanning tree and which has a worse position;

each said link means which interconnects two of said switch means including an up channel and a down channel which transmit data packets in opposite directions between said switch means; said up channel transmitting data packets from a switch means in a worse position to a switch means in a better position;

each said switch means including routing means for forwarding a data packet toward a specified one of said network members so that the path by which said data packet is transmitted through said network comprises zero or more up channels followed by zero or more down channels;

whereby said routing means provides deadlock free routing of data packets through said mesh connected local area network.

15. The mesh connected local area network of claim 13, said switch means including port status means for denoting which of said port means is currently available for retransmitting data packets;

said routing means including route selection means for comparing said subset of said port means of said switch means through which each received data packet can be retransmitted with said port status means and for routing each said received data packet through a port means which is included in said subset of said port means and which is currently available for retransmitting data packets.

16. The mesh connected local area network of claim 15, said route selection means including means for periodically comparing said subset of said port means of said switch means through which each received data packet can be retransmitted with said port status means until one of the port means denoted as available matches one of said subset of said port means, and then routing said received data packet through the matching port means;

wherein said switch means provides low latency retransmission of data packets.

17. The mesh connected local area network of claim 12, said multiplicity of link means including spanning tree links and a multiplicity of additional links;

said multiplicity of switch means and said spanning tree links together comprising a spanning tree in which one of said switch means is designated the root of said spanning tree;

said data packets including non-broadcast data packets which are sent to a single specified one of said hosts in said network and broadcast data packets which are to be sent to all said hosts in said network;

said routing means including configuring means for denoting two broadcast packet transmission routes, including means for designating as an uplink port one port means of said switch means which couples said switch means to another switch means that is closer to said root of said spanning tree, in accordance with predefined criteria, and for denoting as downlink ports each port means which is coupled to the uplink port of other ones of said switch means;

said routing means of each said switch means, except said switch means designated as said root of said network, further including route selection means for routing broadcast data packets received by said uplink port to all of said downlink ports, and for routing to said uplink port broadcast data packets received by any of said port means other than said uplink port.

18. The mesh connected local area network of claim 17, said routing means of said switch means designated as said root of said network further including a root node route selection means for routing all broadcast data packets received by said switch means to all of said downlink ports.

19. The mesh connected local area network of claim 18, wherein each said switch means includes means for simultaneously retransmitting received broadcast data packets through all of said downlink ports.

20. The mesh connected local area network for interconnecting a multiplicity of hosts, said network comprising:

a multiplicity of switch means for simultaneously routing a multiplicity of data packets between hosts in the network; each switch means including a multiplicity of port means for coupling the switch means to other switch means and hosts, and a nonblocking crossbar switch for simultaneously coupling and routing data packets between a multiplicity of selected pairs of said port means; and a multiplicity of point to point link means for interconnecting said switch means and the hosts in said network, each point to point link means providing a communication channel between two of said network members selected from the set consisting of the switch means in said network and the hosts in said network;

said multiplicity of link means including spanning tree links and a multiplicity of additional links;

said multiplicity of switch means and said spanning tree links together comprising a spanning tree in which one of said switch means is designated the root of said spanning tree;

each said data packet having a specified host to which said data packet is being sent, each of said switch means including routing means for defining legal data packet transmission routes through said network; said routing means including configuring means for denoting as an up port each port means of said switch means which couples said switch means to another switch means that is closer to said root of said spanning tree, in accordance with predefined criteria, and for denoting as down ports all the other port means of said switch means;

said routing means further including routing table means for defining a subset of said port means of said switch means through which a received data packet can be retransmitted, wherein said subset of port means is selected by said routing means in accordance with the port means of said switch means which receives said data packet and the host to which said data packet is being sent, wherein said subset of port means includes only selected ones of said port means denoted by said configuring means as down ports when said port means which receives said data packet is denoted as a down port;

whereby said routing means provides deadlock free routing of data packets through said mesh connected local area network.

21. The mesh connected local area network of claim 20, each said data packet including address data specifying a network address;

said routing table means including means for denoting for each of multiplicity of predefined network addresses a subset of said port means of said switch means through which a received data packet can be retransmitted;

said routing means further including means for discarding data packets with address data specifying a network address other than one of said predefined network addresses;

wherein data packets with illegal or corrupted network address values are discarded.

22. A mesh connected local area network for interconnecting a multiplicity of hosts, said network comprising:

a multiplicity of switch means for simultaneously routing a multiplicity of data packets between hosts in the network; each switch means including a multiplicity of port means for coupling the switch means to other switch means and hosts, and a nonblocking crossbar switch for simultaneously coupling and routing data packets between a multiplicity of selected pairs of said port means; and a multiplicity of point to point link means for interconnecting said switch means and the hosts in said network, each point to point link means providing a bidirectional communication channel between two network members selected from the set consisting of the switch means in said network and the hosts in said network;

said multiplicity of link means including spanning tree links and a multiplicity of additional links;

said multiplicity of switch means and said spanning tree links together comprising a spanning tree in which one of said switch means is designated the root of said spanning tree;

means for assigning each said link means an up direction and a down direction; and routing means for transmitting a data packet from a first specified network member to a second specified network member, including means for transmitting said data packet on at least one of said link means in said up direction and then transmitting said data packet on at least one of said link means in said down direction to said second specified network member;

whereby said routing means provides deadlock free routing of data packets through said mesh connected local area network.

23. The mesh connected local area network of claim 22, said data packets including non-broadcast data packets which are sent to a single specified one of said hosts in said network and broadcast data packets which are to be sent to all said hosts in said network; said broadcast data packets having a predefined maximum size;

each said port means including buffer means for buffering data packets received by said switch means at said port means; said buffer means having more than sufficient room to store an entire broadcast data packet of said predefined maximum size and means for indicating when said buffer means has sufficient room to receive an entire broadcast data packet;

said port means including flow control means coupled to said buffer means for sending flow control signals to a network member coupled to said port means, said flow control signals including stop flow signals requiring said network member to stop transmitting data packets to said port means and start flow signals allowing said network member to resume sending data packets to said port means; said flow control means including means for sending start flow signals only when said buffer means has sufficient room to receive an entire broadcast data packet.

24. The mesh connected local area network of claim 23, said port means including means for receiving said flow control signals sent by a network member coupled to said port means, and means for stopping the transmission of a data packet when a stop flow signal is received from said network member, unless said data packet is a broadcast packet.

25. A mesh connected local area network for interconnecting a multiplicity of hosts, said network comprising:

a multiplicity of switch means for simultaneously routing a multiplicity of data packets between hosts in the network; each switch means including a multiplicity of port means for coupling the switch means to other switch means and hosts, and a nonblocking crossbar switch for simultaneously coupling and routing data packets between a multiplicity of selected pairs of said port means; said hosts and switch means together comprising network members; and a multiplicity of point to point link means for interconnecting said switch means and the hosts in said network, each point to point link means providing a communication channel between two of said network members;

said multiplicity of link means including spanning tree links and a multiplicity of additional links;

said multiplicity of switch means and said spanning tree links together comprising a spanning tree in which one of said switch means is designated the root of said spanning tree;

said data packets including non-broadcast data packets which are sent to a single specified one of said hosts in said network and broadcast data packets which are to be sent to all said hosts in said network;

each said switch means including routing means for defining in accordance with predefined criteria, legal data packet transmission routes through said network; said routing means including means for designating as an uplink port one port means of said switch means which couples said switch means to another switch means that is closer to said root of said spanning tree, in accordance with predefined criteria, and for denoting as downlink ports each port means which is coupled to the uplink port of other ones of said switch means;

said routing means of each said switch means, except said switch means designated as said root of said network, further including route selection means for routing broadcast data packets received by said uplink port to all of said downlink ports, and for routing to said uplink port broadcast data packets received by any of said port means other than said uplink port.

26. The mesh connected local area network of claim 25, said routing means of said switch means designated as said root of said network further including route selection means for routing all broadcast data packets received by said switch means to all of said downlink ports.

27. The mesh connected local area network of claim 26, wherein each said switch means includes means for simultaneously retransmitting received broadcast data packets through all of said downlink ports.

28. A mesh connected local area network for interconnecting a multiplicity of hosts, said network comprising:

a multiplicity of switch means for simultaneously routing a multiplicity of data packets between hosts in the network; said hosts and switch means together comprising network members;

a multiplicity of point to point link means for interconnecting said switch means and the hosts in said network, each point to point link means providing a communication channel between two of said network members;

switch means coupled to one another by said link means comprising neighboring switch means;

said multiplicity of link means including spanning tree links and a multiplicity of additional links;

said multiplicity of switch means and said spanning tree links together comprising a spanning tree in which one of said switch means is designated the root of said spanning tree;

each switch means including reconfiguration means for determining the position of said switch means in said spanning tree, said reconfiguration means including:

position denoting means for denoting a tree position within said spanning tree;

epoch denoting means for denoting an epoch value associated with said tree position;

configuration change detection means for detecting a change in the configuration of said network, including means for detecting the existence of a new connection between said switch means and another one of said network members and for detecting the breaking of a connection between said switch means and another one of said network members;

said configuration change detection means including means for incrementing said epoch value when a change in the configuration of said network is detected;

message sending means coupled to said position denoting means for sending a configuration message to each switch means neighboring said switch means; said configuration message including said tree position and said epoch value;

message receiving means for receiving configuration messages from neighboring switch means, for generating a derived tree position which is a function of the tree position in each received configuration message, and for replacing the tree position denoted by said position denoting means with said derived tree position when said derived tree position is better than the tree position denoted by said position denoting means;

said message receiving means including means for replacing said tree position with said derived tree position and replacing said epoch value with the epoch value in said received configuration message when said epoch value in said received configuration message is larger than the epoch value denoted by said epoch denoting means;

said message sending means including means for sending a configuration message to said neighboring switch means when said tree position denoted by said position denoting means is replaced by said derived tree position;

whereby changes in the configuration of the network automatically cause the switch means in said network to redetermine their relative tree positions in said spanning tree.

29. A mesh connected local area network for interconnecting a multiplicity of hosts, said network comprising:

a multiplicity of switch means for simultaneously routing a multiplicity of data packets between hosts in the network; said hosts and switch means together comprising network members;

a multiplicity of point to point link means for interconnecting said switch means and the hosts in said network, each point to point link means providing a communication channel between two of said network members;

said multiplicity of link means including spanning tree links and a multiplicity of additional links;

said multiplicity of switch means and said spanning tree links together comprising a spanning tree in which one of said switch means is designated the root of said spanning tree;

each switch means including reconfiguration means for determining the position of said switch means in said spanning tree, said reconfiguration means including:

position denoting means for denoting a tree position within said spanning tree;

epoch denoting means for denoting an epoch value associated with said tree position;

configuration change detection means for detecting a change in the configuration of said network, including means for detecting the existence of a new connection between said switch means and another one of said network members and for detecting the breaking of a connection between said switch means and another one of said network members;

said configuration change detection means including means for incrementing said epoch value when a change in the configuration of said network is detected;

message sending means coupled to said position denoting means for sending a configuration message to each switch means neighboring said switch means; said configuration message including said tree position and said epoch value;

message receiving means for receiving configuration messages from neighboring switch means, for generating a derived tree position which is a function of the tree position in each received configuration message, and for replacing the tree position denoted by said position denoting means with said derived tree position when said derived tree position is better than the tree position denoted by said position denoting means;

said message receiving means including means for replacing said tree position with said derived tree position and replacing said epoch value with the epoch value in said received configuration message when said epoch value in said received configuration message is larger than the epoch value denoted by said epoch denoting means;

said message sending means including means for sending a configuration message to said neighboring switch means when said tree position denoted by said position denoting means is replaced by said derived tree position;

said configuration change detection means including epoch value overflow detecting means for detecting epoch value overflow when said epoch value is incremented to a predefined overflow value, and for sending a predefined epoch value reset message to said neighboring switch means and for resetting said epoch value to a predefined initial value when epoch value overflow is detected;

said message receiving means including means for responding to the receipt of an epoch value reset message by resetting said epoch value to said predefined initial value, sending said predefined epoch value reset message to said neighbor switch means, ignoring all subsequent epoch value reset messages received from said neighboring switch means for a predefined period of time, and then sending configuration messages to said neighboring switch means;

whereby changes in the configuration of the network automatically cause the switch means in said network to redetermine their relative tree positions in said spanning tree.

30. A mesh connected local area network for interconnecting a multiplicity of hosts, said network comprising:

a multiplicity of switch means for simultaneously routing a multiplicity of data packets between hosts in the network; said hosts and switch means together comprising network members;

a multiplicity of point to point link means for interconnecting said switch means and the hosts in said network, each point to point link means providing a communication channel between two of said network members; said multiplicity of link means including spanning tree links and a multiplicity of additional links;

said multiplicity of switch means and said spanning tree links together comprising a spanning tree in which one of said switch means is designated the root of said spanning tree;

each switch means including reconfiguration means for determining the position of said switch means in said spanning tree, said reconfiguration means including:

position denoting means for denoting a tree position within said spanning tree;

configuration change detection means for detecting a change in the configuration of said network, including means for detecting the existence of a new connection between said switch means and another one of said network members and for detecting the breaking of a connection between said switch means and another one of said network members;

reconfiguration initiation means, coupled to said configuration change detection means, for sending a reconfiguration initiation message to switch means neighboring said switch means when a change in the configuration of said network is detected by said configuration change detection means;

reconfiguration computation means, coupled to said position denoting means, for redetermining the tree position of said switch means in said spanning tree, said reconfiguration computation means including means for (A) sending and receiving configuration messages to and from switch means neighboring said switch means and (B) storing in said position denoting means a derived tree position derived from said received configuration messages;

said multiplicity of switch means including means for transmitting to all of said switch means network configuration data indicating the tree positions of all said switch means in said spanning tree;

each switch means including route selection means for routing received data packets to specified network members in accordance with said network configuration data and predefined route selection criteria;

whereby changes in the configuration of the network automatically cause the switch means in said network to redetermine their tree positions in said spanning tree.

31. The mesh connected local are network of claim 30, wherein said reconfiguration initiation means sends said reconfiguration initiation message to said neighboring switch means whenever said configuration change detection means detects the breaking of a connection between said switch means and another one of said network members;

said reconfiguration initiation means including status filter means, coupled to said configuration change detection means, for preventing said sending of reconfiguration initiation messages to said neighboring switch means, whenever said configuration change detection means detects a new connection between said switch means and another one of said network members, until passage of a defined time interval;

whereby disruption of said network by an intermittently operative connection is limited.

32. The mesh connected local area network of claim 30, wherein said defined time interval is a time interval that begins when one of said point to point link means, corresponding to said new connection detected by said configuration change detection means, becomes operative.

* * * * *

UNITED STATES PATENT AND TRADEMARK OFFICE
CERTIFICATE OF CORRECTION

PATENT NO. : 5,088,091
DATED : February 1, 1992
INVENTOR(S) : Michael D. Schroeder et al.

It is certified that error appears in the above-identified patent and that said Letters Patent is hereby corrected as shown below:

Column 71,
Line 31, delete "closed" and insert therefor -- closer --

Column 75,
Line 42, delete "wherein" and insert thererfor -- whereby --

Signed and Sealed this

Twenty-first Day of June, 2005

JON W. DUDAS
*Director of the United States Patent and Trademark Office*